(12) United States Patent
Heath

(10) Patent No.: US 10,127,564 B2
(45) Date of Patent: Nov. 13, 2018

(54) SYSTEM AND METHOD FOR USING IMPRESSIONS TRACKING AND ANALYSIS, LOCATION INFORMATION, 2D AND 3D MAPPING, MOBILE MAPPING, SOCIAL MEDIA, AND USER BEHAVIOR AND INFORMATION FOR GENERATING MOBILE AND INTERNET POSTED PROMOTIONS OR OFFERS FOR, AND/OR SALES OF, PRODUCTS AND/OR SERVICES

(76) Inventor: Stephan Heath, Littleton, CO (US)

(*) Notice: Subject to any disclaimer, the term of this patent is extended or adjusted under 35 U.S.C. 154(b) by 1681 days.

(21) Appl. No.: 13/543,871

(22) Filed: Jul. 8, 2012

(65) Prior Publication Data

US 2013/0073388 A1    Mar. 21, 2013

Related U.S. Application Data

(63) Continuation-in-part of application No. 13/359,498, filed on Jan. 27, 2012, now Pat. No. 10,102,546, and a continuation-in-part of application No. 13/233,352, filed on Sep. 15, 2011, now abandoned, and a continuation-in-part of application No. 13/337,271, filed on Dec. 26, 2011, and a continuation-in-part of application No. 13/377,275, filed on Dec. 26, 2011, and a continuation-in-part of application No. 13/369,244, filed on Feb. 8, 2012, and a
(Continued)

(51) Int. Cl.
*G06Q 30/02* (2012.01)
*G06Q 50/00* (2012.01)

(52) U.S. Cl.
CPC ............. *G06Q 30/02* (2013.01); *G06Q 50/01* (2013.01)

(58) Field of Classification Search
CPC ...................................................... G06Q 30/02
USPC .......................................................... 705/14
See application file for complete search history.

(56) References Cited

U.S. PATENT DOCUMENTS 6,073,124 A     6/2000   Krishnan et al.
7,630,936 B2   12/2009   Kumar et al.
(Continued)

OTHER PUBLICATIONS

Q. Huang and Y. Liu, "On Geo-social network services," 2009 17th International Conference on Geoinformatics, Fairfax, VA, 2009, pp. 1-6; date of conference: Aug. 12-14, 2009; date added to IEEE Xplore Oct. 23, 2009 (Year: 2009).*
(Continued)

*Primary Examiner* — Eric R Netzloff
*Assistant Examiner* — Michael R Stibley
(74) *Attorney, Agent, or Firm* — Peter B. Scull; Hamilton DeSanctis & Cha LLP

(57) ABSTRACT

A method, apparatus, computer readable medium, computer system, network, or system, is provided for using impressions tracking and analysis, location information, 2D and 3D mapping, social media, and user behavior and information for generating mobile and internet posted promotions or offers for, and/or sales of, products and/or services, for example, through an advertising application programming interfaces (APIs) on mobile devices, tablets, or computers, that provides mobile and web based promotions or offers that connect information and user behavior data to a user or related demographic location or user specified or predicted demographic location(s), such as through the use of as social networking, user or demographic profiles, behavior, and/or relationships, for targeted promotions or offers for products and/or services.

12 Claims, 25 Drawing Sheets

Related U.S. Application Data continuation-in-part of application No. 13/430,600, filed on Mar. 26, 2012, and a continuation-in-part of application No. 13/439,761, filed on Apr. 4, 2012, now Pat. No. 10,096,033, and a continuation-in-part of application No. PCT/US2012/036896, filed on May 8, 2012, and a continuation-in-part of application No. 13/439,735, filed on Apr. 4, 2012.

(56) References Cited

U.S. PATENT DOCUMENTS

| | | | |
|---|---|---|---|
| 7,756,756 | B1 | 7/2010 | Lifson |
| 7,831,476 | B2 | 11/2010 | Foster et al. |
| 7,860,852 | B2 | 12/2010 | Brunner et al. |
| 7,908,263 | B1 | 3/2011 | Palz et al. |
| 7,933,897 | B2 | 4/2011 | Jones et al. |
| 7,970,665 | B1 | 6/2011 | Lifson |
| 7,980,466 | B2 | 7/2011 | Lee et al. |
| 8,209,220 | B2 | 1/2012 | Yoshikawa et al. |
| 8,725,399 | B2 | 5/2014 | Nonaka |
| 2002/0055924 | A1 | 5/2002 | Liming et al. |
| 2002/0094868 | A1 | 7/2002 | Tuck et al. |
| 2003/0158796 | A1 | 8/2003 | Balent |
| 2005/0027705 | A1 | 2/2005 | Sadri et al. |
| 2005/0288959 | A1 | 12/2005 | Eraker et al. |
| 2006/0170670 | A1 | 8/2006 | Burke |
| 2006/0238380 | A1* | 10/2006 | Kimchi ............ G01C 21/26 340/995.1 |
| 2006/0265197 | A1 | 11/2006 | Peterson et al. |
| 2007/0043766 | A1 | 2/2007 | Nicholas et al. |
| 2007/0143345 | A1 | 6/2007 | Jones et al. |
| 2007/0174259 | A1 | 7/2007 | Amjadi |
| 2007/0219712 | A1 | 9/2007 | Abhyanker |
| 2007/0265006 | A1 | 11/2007 | Washok et al. |
| 2008/0028341 | A1 | 1/2008 | Szeliski et al. |
| 2008/0307003 | A1 | 2/2008 | O'Donnell et al. |
| 2008/0086356 | A1 | 4/2008 | Glassman et al. |
| 2008/0172288 | A1 | 7/2008 | Pilkalns et al. |
| 2008/0177603 | A1 | 7/2008 | Muthugopalakrishnan et al. |
| 2008/0201156 | A1 | 8/2008 | Abhyanker et al. |
| 2008/0214148 | A1* | 9/2008 | Ramer ............ G06F 17/30749 455/414.1 |
| 2008/0222295 | A1 | 9/2008 | Robinson et al. |
| 2008/0300979 | A1 | 12/2008 | Abhyanker et al. |
| 2008/0307498 | A1 | 12/2008 | Johnson |
| 2009/0070129 | A1 | 3/2009 | Inbar et al. |
| 2009/0070204 | A1 | 3/2009 | Clancy et al. |
| 2009/0144144 | A1 | 6/2009 | Grouf et al. |
| 2009/0163187 | A1 | 6/2009 | Terrell et al. |
| 2009/0187486 | A1 | 7/2009 | Lefenfeld et al. |
| 2009/0198607 | A1 | 8/2009 | Badger et al. |
| 2010/0042923 | A1 | 2/2010 | Barcay et al. |
| 2010/0094752 | A1 | 4/2010 | Heath |
| 2010/0119053 | A1 | 5/2010 | Goeldi |
| 2010/0145800 | A1 | 6/2010 | Eraker et al. |
| 2010/0169161 | A1 | 7/2010 | Sacco |
| 2010/0198684 | A1 | 8/2010 | Eraker et al. |
| 2010/0226535 | A1 | 9/2010 | Kimchi et al. |
| 2010/0306066 | A1 | 12/2010 | Binnewies et al. |
| 2010/0325563 | A1 | 12/2010 | Goldthwaite et al. |
| 2011/0004515 | A1 | 1/2011 | Mesaros |
| 2011/0029360 | A1 | 2/2011 | Gollapalli |
| 2011/0035284 | A1 | 2/2011 | Moshfeghi |
| 2011/0041168 | A1 | 2/2011 | Murray |
| 2011/0066615 | A1 | 3/2011 | Pradhan et al. |
| 2011/0082736 | A1 | 4/2011 | Goldman et al. |
| 2011/0173066 | A1 | 7/2011 | Simmons et al. |
| 2011/0191417 | A1 | 8/2011 | Rathord |
| 2011/0191432 | A1 | 8/2011 | Layson et al. |
| 2011/0196776 | A1 | 8/2011 | Rash et al. |
| 2011/0208724 | A1 | 8/2011 | Jones et al. |
| 2011/0208822 | A1 | 8/2011 | Rathod |
| 2011/0231363 | A1 | 9/2011 | Rathod |
| 2011/0238762 | A1 | 9/2011 | Soni et al. |
| 2011/0246305 | A1 | 10/2011 | Brazeau et al. |
| 2011/0258073 | A1 | 10/2011 | Lifson et al. |
| 2011/0270701 | A1 | 11/2011 | Black et al. |
| 2011/0276396 | A1 | 11/2011 | Rathod |
| 2011/0276628 | A1 | 11/2011 | Pell |
| 2011/0313781 | A1 | 12/2011 | Ho |
| 2012/0036015 | A1 | 2/2012 | Sheikh |
| 2012/0054014 | A1 | 3/2012 | Cho et al. |
| 2012/0066037 | A1 | 3/2012 | Glen |
| 2012/0158471 | A1 | 6/2012 | Jain et al. |
| 2012/0245990 | A1 | 9/2012 | Agarwal |
| 2012/0254804 | A1 | 10/2012 | Sheha et al. |
| 2013/0073336 | A1 | 3/2013 | Heath |
| 2013/0073366 | A1 | 3/2013 | Heath |
| 2013/0073374 | A1 | 3/2013 | Heath |
| 2013/0073376 | A1 | 3/2013 | Heath |
| 2013/0073377 | A1 | 3/2013 | Heath |
| 2013/0073387 | A1 | 3/2013 | Heath |
| 2013/0073389 | A1 | 3/2013 | Heath |
| 2013/0073400 | A1 | 3/2013 | Heath |
| 2013/0073473 | A1 | 3/2013 | Heath |
| 2013/0268357 | A1 | 10/2013 | Heath |
| 2014/0006129 | A1 | 1/2014 | Heath |
| 2016/0189174 | A1 | 6/2016 | Heath |

OTHER PUBLICATIONS

International Search Report and Written Opinion of the International Searching Authority. International Application No. PCT/US2012/036896, issued by the United States Patent Office, dated Jul. 20, 2012, Alexandria Virginia.

Google Earth, ShowCase Mars, URL: http://www.google.com/earth/explore/showcase/mars.html capture data of Sep. 13, 2010, Internet Archive WayBack Machine.

Trademark Electronic Search System (TESS ), Android, Oct. 1, 2014, United State Patent and Trademark Office.

Trademark Electronic Search System (TESS ), Apple, Oct. 1, 2014, United State Patent and Trademark Office.

Trademark Electronic Search System (TESS ), Blackberry, Oct. 1, 2014, United State Patent and Trademark Office.

Trademark Electronic Search System (TESS ), Buy With Me, Oct. 1, 2014, United State Patent and Trademark Office.

Trademark Electronic Search System (TESS ), Coca-Cola, Oct. 1, 2014, United State Patent and Trademark Office.

Trademark Electronic Search System (TESS ), Coupon Cabin, Oct. 1, 2014, United State Patent and Trademark Office.

Trademark Electronic Search System (TESS ), Coupons.Com, Oct. 1, 2014, United State Patent and Trademark Office.

Trademark Electronic Search System (TESS ), Cyworld, Oct. 1, 2014, United State Patent and Trademark Office.

Trademark Electronic Search System (TESS ), Eversave, Oct. 1, 2014, United State Patent and Trademark Office.

Trademark Electronic Search System (TESS ), Gilt City, Oct. 1, 2014, United State Patent and Trademark Office.

Trademark Electronic Search System (TESS ), Homerun, Oct. 1, 2014, United State Patent and Trademark Office.

Trademark Electronic Search System (TESS ), Intel, Oct. 1, 2014, United State Patent and Trademark Office.

Trademark Electronic Search System (TESS ), IPAD, Oct. 1, 2014, United State Patent and Trademark Office.

Trademark Electronic Search System (TESS ), IPOD Touch, Oct. 1, 2014, United State Patent and Trademark Office.

Trademark Electronic Search System (TESS ), KGB Deals, Oct. 1, 2014, United State Patent and Trademark Office.

Trademark Electronic Search System (TESS ), Linkedin, Oct. 1, 2014, United State Patent and Trademark Office.

Trademark Electronic Search System (TESS ), Linkshare, Oct. 1, 2014, United State Patent and Trademark Office.

Trademark Electronic Search System (TESS ), Linux, Oct. 1, 2014, United State Patent and Trademark Office.

Trademark Electronic Search System (TESS ), Macintosh, Oct. 1, 2014, United State Patent and Trademark Office.

Trademark Electronic Search System (TESS ), Microsoft, Oct. 1, 2014, United State Patent and Trademark Office.

(56) References Cited

OTHER PUBLICATIONS

Trademark Electronic Search System (TESS ), Mixi, Oct. 1, 2014, United State Patent and Trademark Office.
Trademark Electronic Search System (TESS ), Multiply, Oct. 1, 2014, United State Patent and Trademark Office.
Trademark Electronic Search System (TESS ), Old Navy, Oct. 1, 2014, United State Patent and Trademark Office.
Trademark Electronic Search System (TESS ), Orkut, Oct. 1, 2014, United State Patent and Trademark Office.
Trademark Electronic Search System (TESS ), Renren, Oct. 1, 2014, United State Patent and Trademark Office.
Trademark Electronic Search System (TESS ), Retail Me Not, Oct. 1, 2014, United State Patent and Trademark Office.
Trademark Electronic Search System (TESS ), Scoutmob, Oct. 1, 2014, United State Patent and Trademark Office.
Trademark Electronic Search System (TESS ), Skyrock, Oct. 1, 2014, United State Patent and Trademark Office.
Trademark Electronic Search System (TESS ), Smart Source, Oct. 1, 2014, United State Patent and Trademark Office.
Trademark Electronic Search System (TESS ), Starbucks, Oct. 1, 2014, United State Patent and Trademark Office.
Trademark Electronic Search System (TESS ), Superbowl, Oct. 1, 2014, United State Patent and Trademark Office.
Trademark Electronic Search System (TESS ), Victoria's Secret, Oct. 1, 2014, United State Patent and Trademark Office.
Trademark Electronic Search System (TESS ), Windows Vista, Oct. 1, 2014, United State Patent and Trademark Office.
Trademark Electronic Search System (TESS ), Windows XP, Oct. 1, 2014, United State Patent and Trademark Office.
Trademark Electronic Search System (TESS ), Woot!, Oct. 1, 2014, United State Patent and Trademark Office.
Trademark Electronic Search System (TESS ),Badoo, Oct. 1, 2014, United State Patent and Trademark Office.
Trademark Electronic Search System (TESS ),Bebo, Oct. 1, 2014, United State Patent and Trademark Office.
Trademark Electronic Search System (TESS ),HI5, Oct. 1, 2014, United State Patent and Trademark Office.
Trademark Electronic Search System (TESS ),Nexopia, Oct. 1, 2014, United State Patent and Trademark Office.
Trademark Electronic Search System (TESS ),Tagged, Oct. 1, 2014, United State Patent and Trademark Office.
Trademark Electronic Search System (TESS ),Tuenti, Oct. 1, 2014, United State Patent and Trademark Office.
Trademark Electronic Search System (TESS), Amazon, Oct. 1, 2014, United State Patent and Trademark Office.
Trademark Electronic Search System (TESS), Facebook, Oct. 1, 2014, United State Patent and Trademark Office.
Trademark Electronic Search System (TESS), Google, Oct. 1, 2014, United State Patent and Trademark Office.
Trademark Electronic Search System (TESS), Groupon, Oct. 1, 2014, United State Patent and Trademark Office.
Trademark Electronic Search System (TESS), IPhone, Oct. 1, 2014, United State Patent and Trademark Office.
Trademark Electronic Search System (TESS), Livingsocial, Oct. 1, 2014, United State Patent and Trademark Office.

* cited by examiner

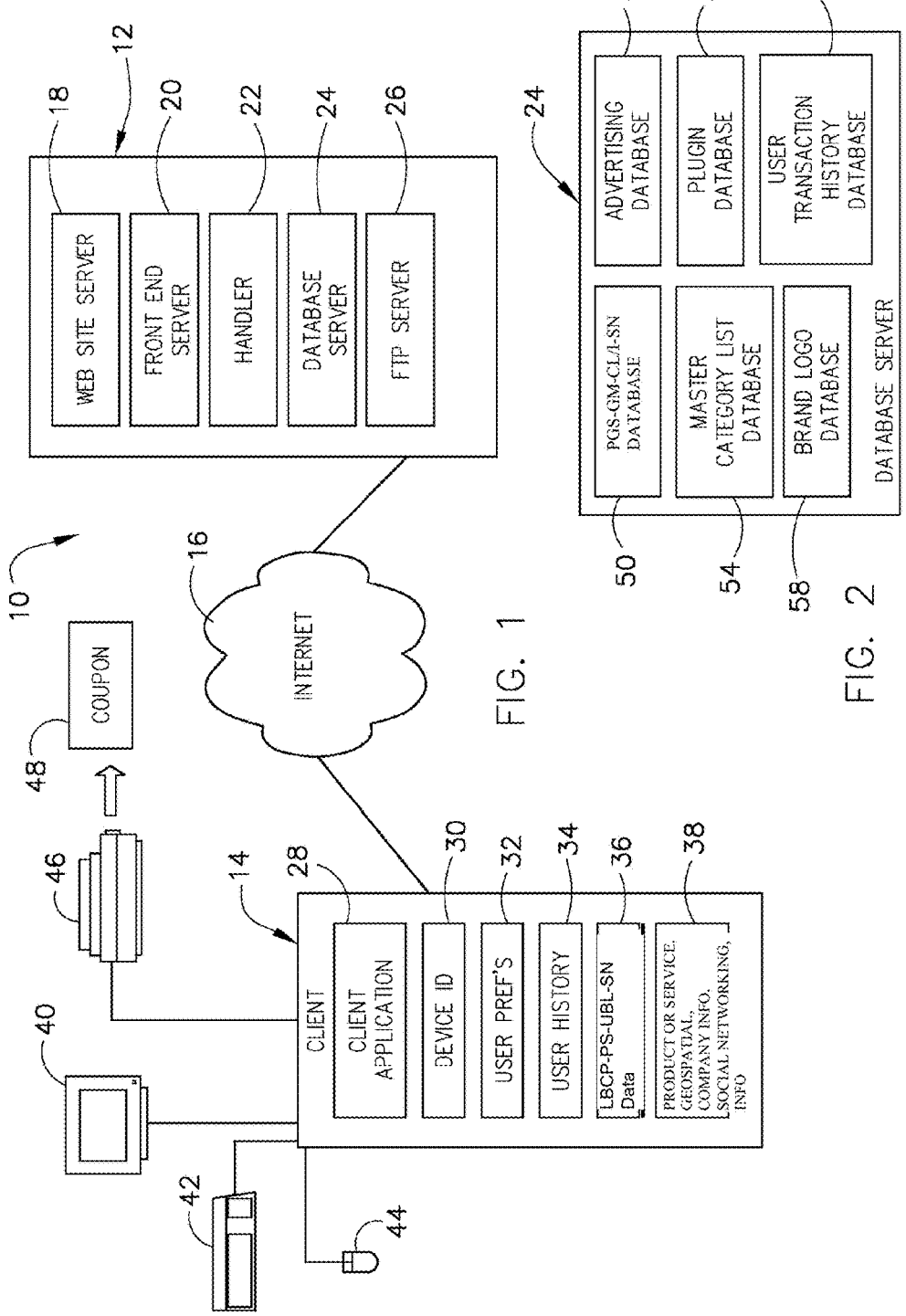

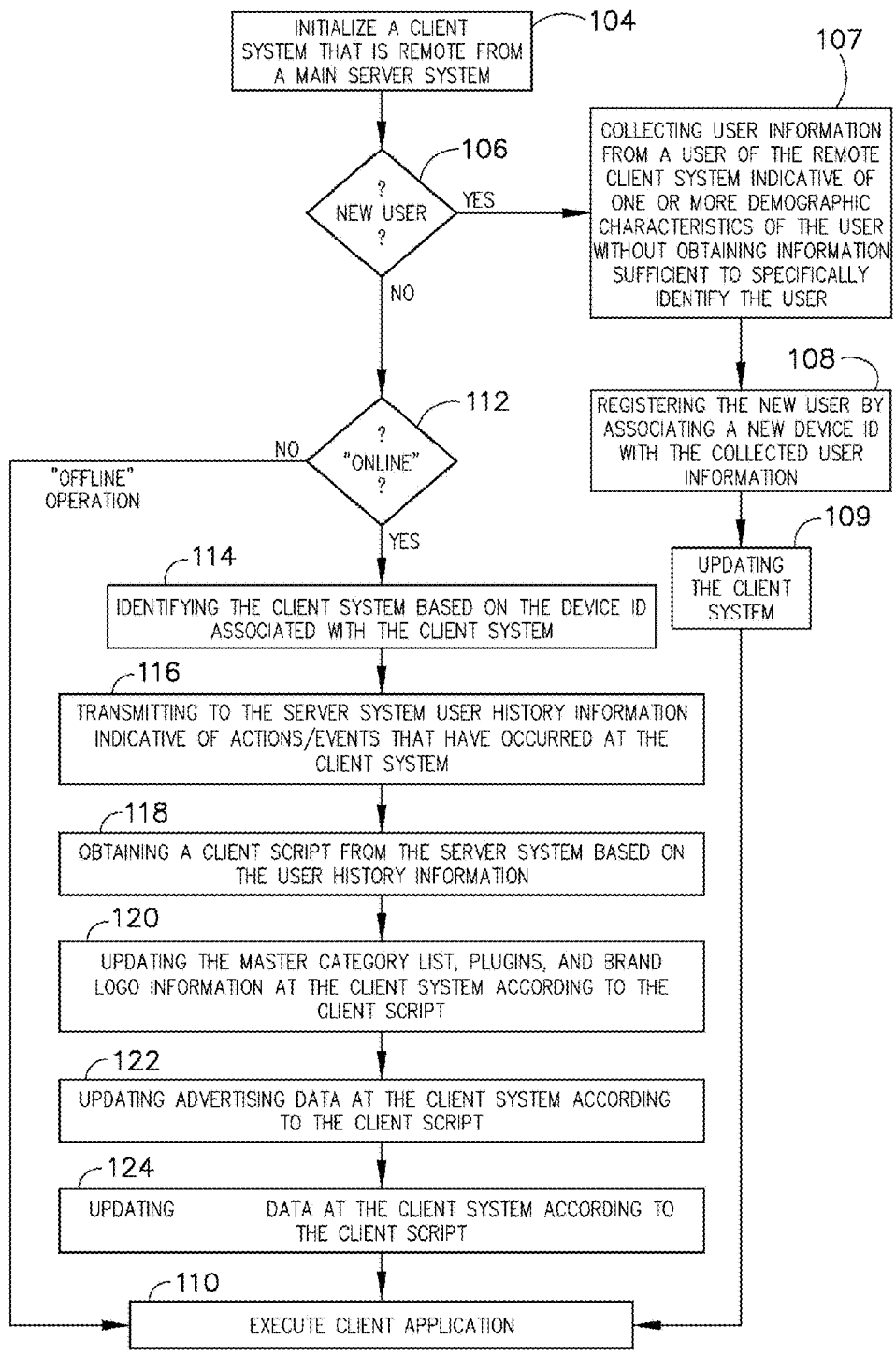

FIG. 9
FIG. 10
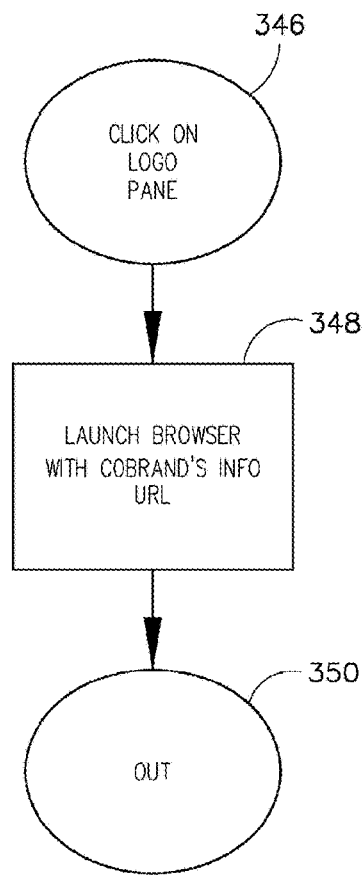
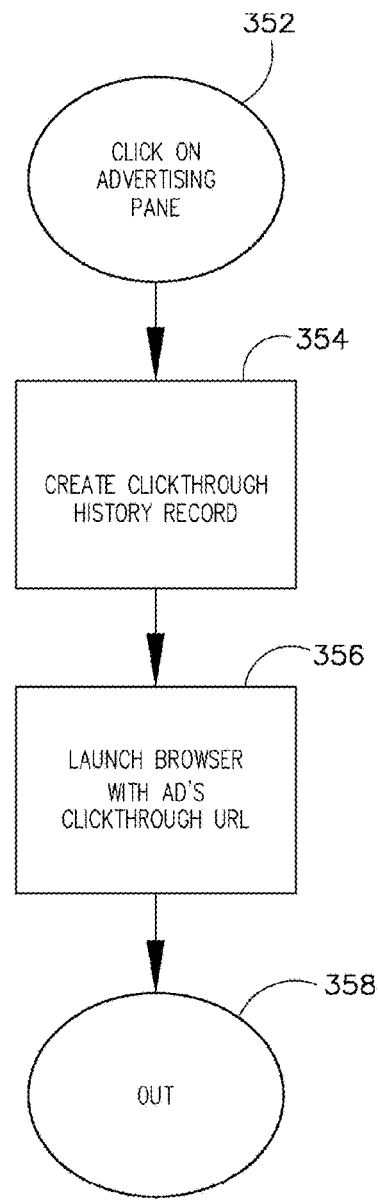

SOCIAL EARTH MOBILE AND ONLINE PRODUCT AND SERVICE ONLINE USER CUSTOMIZED LOCATION BASED PROMOTIONS AND OFFERS

IMPRESSION BASED PROMOTIONS

Consumer, Business, Government,
Sports, Gambling, or Educational
Related Ads/Coupons FOR:

MOBILE SERVICES,
PRODUCTS, (AND S, SERVICES,
ENTERTAINMENT SHOPPING,
PENNY AND ONLINE AUCTIONS,
ADVERTISEMENTS AND AFFILIATE ADVERTISING,
E-COMMERCE,
SPORTS,
PERSONAL AND FINANCIAL NETWORK,
TRAVEL AND HOSPITALITY SERVICES,
REAL ESTATE, EDUCATIONAL SERVICES,
ANCILLARY SERVICES, SERVICE PROVIDERS,
ONLINE DATING,
GAMING, RETAIL STORES,
VIRTUAL COMMUNITIES AND GOODS

WITH:

LOCATION BASED SERVICES

2D AND 3D MAPPING DATA FOR USER, TARGET MARKET OR DEMOGRAPHIC DATA

LOCAL, GLOBAL & COMPANY INFORMATION

SOCIAL NETWORKING

USER INTERNET ACTIVITY DATA RELATING TO SEARCHING, BROWSING, PURCHASES, AND INTERESTS

FIG. 19

SYSTEM AND METHOD FOR USING IMPRESSIONS TRACKING AND ANALYSIS, LOCATION INFORMATION, 2D AND 3D MAPPING, MOBILE MAPPING, SOCIAL MEDIA, AND USER BEHAVIOR AND INFORMATION FOR GENERATING MOBILE AND INTERNET POSTED PROMOTIONS OR OFFERS FOR, AND/OR SALES OF, PRODUCTS AND/OR SERVICES

PRIORITY

This application is a continuation in part of, and claims priority to each of: U.S. application Ser. No. 13/233,352, filed 15 Sep. 2011; Ser. No. 13/337,271, filed 26 Dec. 2011; Ser. No. 13/337,275, filed 26 Dec. 2011; Ser. No. 13/359,498, filed 27 Jan. 2012; Ser. No. 13/369,244, filed Feb. 8, 2012; Ser. No. 13/430,600, filed Mar. 26, 2012; Ser. No. 13/439,735, filed Apr. 4, 2012; and Ser. No. 13/439,761, filed Apr. 4, 2012; and PCT application PCT/US2012/36896, filed 8 May, 2012, each of which applications are entirely incorporated herein by reference.

FIELD OF THE INVENTION

The invention relates to a method, apparatus, computer readable medium, computer system, network, or system provided method, apparatus, computer readable medium, computer system, network, or system, is provided for using impressions tracking and analysis, location information, 2D and 3D mapping, social media, and user behavior and information for generating mobile and interne posted promotions or offers for, and/or sales of, products and/or services.

BACKGROUND

The Geospatial Revolution examines the world of social mapping, digital mapping, and how it is changing the way we think, behave and interact. Geospatial information influences nearly everything. Seamless layers of satellites, surveillance, and location-based technologies create a worldwide geographic knowledge base vital to the interconnected global community. The Geospatial Revolution explores compelling human stories that explain the history, applications, related privacy issues, and impact of location-based technologies including GPS and GIS. The video episodes are useful for teaching history, social studies, geography, environment, and ecology, science and technology and for learning about career development.

Time and resources are wasted in the marketing of online products and services. User/consumers waste time shopping in person or attempting to search for products or services online where they lack control or create suitable preferences for access to the search results. One approach taken in response to these and other shortcomings involves providing for products or services over the Internet, e.g., a system for shopping online over public computer networks such as the Internet. However, users or members of such systems stem usually must be registered, wherein registration and/or subscription by the user can provide information sufficient to identify the user, such as the users or members name, address, Internet e-mail address, and/or an identification number, using an Internet server and a user display terminal in communication therewith. There are, however, numerous shortcomings to such a system. Group buying sites leverage the power of collective bargaining, providing local product or services deals that offer savings for user/consumers while delivering improved sales numbers to participating merchants.

SUMMARY OF THE INVENTION

The present invention relates to a one or more of method, apparatus, computer readable medium, computer system, network, or system provided method, apparatus, computer readable medium, computer system, network, or system, is provided for using impressions tracking and analysis, location information, 2D and 3D mapping, social media, and user behavior and information for generating mobile and internet posted promotions or offers for, and/or sales of, products and/or services.

The present invention provides one or more of a method, apparatus, computer readable medium, computer system, wireless or wired network, or system to provide a delivery system for advertisers, brands and/or other third parties to conduct advertising using mobile or internet promotions' or offers' impressions tracking and analysis, location information, 2D and 3D mapping, social media, and user behavior and information for generating mobile and internet posted promotions or offers for, and/or sales of, products and/or services.

The present invention can provide a method for generating mobile, wireless, and internet posted, location based, customized promotions or offers for products or services, using (i) impressions data, (ii) location information data, (iii) 2D and 3D mapping data, (iv) user internet activity data; and (v) social networking interaction data, the method comprising:

(a) electronically assigning, on an electronic computing system via a processor, a unique identifier to a user of a client mobile device or client computer receiving a request from said user, through a client application operating on the client mobile device or computer, to access a location based, customized, promotions website, the request including the identifier assigned to the user or the client;

(b) electronically providing to said user, via a mobile or wireless device or computer, mobile and internet posting of said location based, customized, promotions on said promotions website for products or services, wherein said location based, customized, promotions or offers are selected for said user based on data comprising:

(i) impressions data comprising tracking and analysis of website access of said user's, target markets' users, demographic groups and/or geographic data; (ii) location information data relating to selected (a) users, target markets, demographic groups or geographic data; (b) product or service or service providers; and (c) points of interest near said users, target markets, demographic groups or geographic data, or product or service or service providers; (iii) 2D and 3D mapping data of selected: (a) user, target market or demographic group locations; or (b) product or service or service provider locations; (iv) user internet activity data relating to searching, browsing, purchases, location, interactions, and interests; and (v) social networking data of interactions between said user and other users, target markets, and demographics groups.

The invention can provide wherein said selection of said for said user comprises electronically collecting and analyzing behavior information of said user, said behavior information comprising: (a) said impressions tracking and analysis; (b) said location information; (c) said 2D and 3D mapping; (d) said user internet activity; and (e) said social networking interactions. The invention can provide wherein said location based, customized, promotions or offers are selected from the group consisting of a coupon, an advertisement, a location-based promotion, a location-based offer, a location-based discount, a daily deal ad, location-based advertising, a location-based ad, a location-based deal or offer, a mobile ads, a mobile ad network, mobile advertising, mobile location-based advertising, a customer loyalty card, a discounts, a promotion, an offer, a location-based promotion, location-based offer, an online or mobile coupon or promotion, mobile location-based advertising, a promotions or offers associated with a location or a map in a social network or website online or mobile device, a location-based mobile coupon, a mobile grocery coupon, a mobile ad products, a targeted mobile ad, a mobile advertising network, and a mobile coupon.

The invention can provide wherein said mobile device or wireless device is selected from the group consisting of a smart phone, a tablet device, a cell phone, a mobile internet device, a netbook, a notebook, a personal digital assistant, an internet phone, a holographic device, a holographic phone, a cable internet device, a satellite internet device, an internet television, a DSL internet device, and a portable internet access device or computer.

The invention can provide wherein said first promotional data set further comprises one selected from statistics regarding donations, humanitarian aid and sustainable gifts made by the end users or members or other end users or members.

The invention can provide wherein said method further comprises providing said first promotional data set to said end users or members, other end users or members, or advertisers, third parties, and wherein said impressions include social impressions.

The invention can provide wherein said method further comprises (a) said user designating a portion of a purchase of said product or service, or providing links; or (b) providing said user with websites for organizations or companies that provide charitable contributions, humanitarian aid, sustainable gifts or loans.

The invention can provide wherein said product or service is a brand merchant or retailer for user/consumer, products, e-commerce, retail, media & entertainment, business, government, sports, travel & hospitality, real estate, educational services, sport services, entertainment shopping services, online gambling services, online penny and online auction services, service provider services, business center services, or affiliate services.

The invention can provide wherein said access in step (a) is subject to identity verification.

The invention can provide wherein social networking is provided as one selected from social shopping, social networking interactions, access to social networking websites or third party websites or applications, social plugins, social or business applications, SSLs, cookie and mobile cookie, browser cookie, advertising cookie, cookie-based targeting, flash cookie, location-based cookie and other third party cookie, and embedded advertisements.

The invention can provide wherein said promotion or offer or service comprises job or employment services, or educational services.

The invention can provide wherein said method further behavior information further comprises behavior tracking social media communications online or mobile with other social networks online or mobile, ad click impressions, profile targeting impressions, profiles of users, open source impressions, engagement impressions, media, search, video, mobile, cross-media and e-commerce impressions and mobile searches.

The invention can provide wherein said promotions or offers are paid for by mobile or internet based payments from users or members, publishers, marketers, user/consumers and other third parties.

The invention can provide wherein selected promotions or offer automatically give users discounts on their purchases at participating merchants that generate marketing and mapping relationships between members of a social network or website and third party websites or applications.

The invention can provide wherein selected promotions or offers, coupons, products or services automatically populate a social network, a user page or website based upon the user's profile and/or lifestyle preferences.

The invention can provide wherein said media used in said promotions is selected from the group consisting of live or pre-recorded audio or video media and wherein purchase of a product or service automatically give users discounts on their purchases at participating merchants.

The invention can provide a method for providing social shopping in combination with 2D and 3D geospatial map interactive displays and social networking, said method comprising:

(a) collecting and analyzing initial end user or member data via a processor on a computer or mobile device to provide initial end user or member data sets, said initial end user or member data sets comprising: (1) initial end users' or members' impressions data comprising tracking and analysis of website access of users, target markets, demographic groups or geographic data, (2) user or member profile data; (3) location information data relating to selected (a) users, members, target markets, demographic groups or geographic data; (b) product or service or service providers; and (c) points of interest near said users, members, target markets, demographic groups or geographic data, or product or service or service providers; (4) 2D and 3D mapping data of selected: (a) user, member, target market or demographic group locations or location interests; or (b) product or service provider locations; (5) user or member internet activity data relating to searching, browsing, purchases, location, interactions, and interests; (6) social networking data of interactions between users or members through networking interests or connections or channels, target markets, and demographics groups; and (7) generate marketing and mapping relationships between members of a social network or website.

(b) generating, via a processor on a computer system or mobile device or wireless device, first promotional data sets from said initial end user data sets, said first promotional data sets comprising first sets of customized promotions or offers that are provided as 2D or 3D geospatial map interactive displays, said first set of location based, customized, promotions relating to products or services of said product or service or service providers, or related products or services, for each of (i) said initial end users or members, (ii) additional end users or members, and (iii) target end user groups; wherein said generating comprises electronically monitoring, collecting, and analyzing behavior information accessed by the user, said behavior information comprising: (1) said initial end users' or members' impressions data; (2) said user or member profile data; (3) said location information data; (4) said product or service providers; and (5) said points of interest; (6) said 2D and 3D mapping data; (7) said user or member internet activity data; (8) said social networking data; and (9) generate marketing and mapping relationships between members of a social network or website.

(c) electronically displaying to said users, members, target markets, or demographics groups, on said 2D or 3D geospatial map interactive display, said first set of location based, customized, promotions or offers that are displayed as ad links, promotion or offer information, or promotional media, wherein said first set is provided as part of a first social/geo/promo link category for a first position of a social/geo/promo link promotional data set; and (d) electronically identifying via a computer processor one or more second social/geo/promo link categories of said location based, customized, promotions using one or more correlation criteria, at least one second social/geo/promo link category having one or more correlation criteria associated with said first social/geo/promo link category, wherein said second social/geo/promo links can be provided to additional 2D or 3D geospatial map interactive displays provided to one or more of said users, members, target markets, or demographics groups.

The invention can provide wherein said generating step (b) further comprises: generating, via a processor on a computer system or mobile device or wireless device, second promotional data sets from said first promotional data sets, said second promotional data sets comprising second sets of location based, customized, promotions or offers that are provided as 2D or 3D geospatial map interactive displays, said second set of customized promotions or offers relating to products or services of said product or service or service providers, or related products or services, for each of (i) said initial end users or members, (ii) additional end users or members, and (iii) target end user groups;

The invention can provide wherein selected online coupons, position-based services, ad links, location-based promotions, location-based offers, location-based coupons, promotions or offers in connection with an online or mobile news feed.

The invention can provide wherein said displaying step (c) further comprises: electronically displaying to said users, members, target markets, or demographics groups, on said 2D or 3D geospatial map interactive display, said second set of location based, customized, promotions or offers that are displayed as ad links, promotion or offer information, or promotional media, wherein said second set is provided as part of said first social/geo/promo link category for said first position of a social/geo/promo link promotional data set.

The invention can provide wherein said promotions or offers comprise or are displayed as one selected from the group consisting of social media advertising impressions, text impressions, or tweet ad impressions, online marketplace ad impressions, online marketplace video impressions, online auction ad impressions, share ad impressions, online print media ad impressions, telecommunication ad impressions, online coupons, position-based services, ad links, location-based services, location-based promotions, location-based offers, location-based coupons, promotions or offers in connection with an online or mobile news feed, location-based discounts or daily deal ads, location-based advertising, location-based ads, location-based marketing, location-based commerce, location-based deals and offers, mobile ads, mobile ad network, mobile advertising, mobile commerce, mobile location-based advertising and promotions or offers, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, discount ad impressions, impressions, social media web impressions or similar types of position-based services, ad links, location-based promotions, location-based offers, location-based coupons, promotions or offers in connection with an online or mobile news feed, discount ad impressions, merchant ad impressions, email coupon impressions, merchant ads, video clip ads, video upload or presentations site ads or links, B2B ad impressions, B2C ad impressions, B2B social medial communication impressions, gambling ad impressions, gambling site impressions, sports or sports related ad impressions, sports gambling ads, multiplayer online game ads, virtual ads, digital ads or virtual billboard ads or virtual ad impressions through the use of digital technology to insert virtual advertising images on a virtual landscape or into a social network, social networking websites or third party websites or applications, live or pre-recorded television show or video or sporting event and online or mobile coupons and promotions or offers for products or services, operating through credit cards or other payment services, automatically giving users discounts on their purchases at participating merchants, virtual or digital advertisements, banner ads, graphic color ads; promotions or offers inserted or overlays on images in a social network or website online or mobile device, social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, virtual world ad impressions, video game impressions, in-game advertising impressions, location-based ads, mobile browser ad impressions, mobile web ad impressions, widgets or widget ad impressions, bookmark ad impressions, tab impressions, web feed impressions, tabbed browsing ad impressions, page zooming ad impressions, ad-sponsored link impressions, auction impressions, multiple platform website ads, interactive content marketing impressions via a mobile device or other similar device or android device or tablet device or mobile internet devices or holographic devices or mercatot cell phones, (e.g. holographic phone) or other non-phone connected device or computer ads, context syncing, across one or multiple platforms, stream search ad impressions, communications, monetization, monetize mobile usage online media business impressions, video or voice chat ad impressions, social hang out impressions, demographic impressions, name impressions, age impressions, gender impressions, relationship status impressions, country and city impressions, location impressions, education related and/or services impressions, social tracking impressions, work impressions, interests & topics impressions, email ad impressions, photo blogging impressions, floating ad impressions, expanding ad impressions, polite ad impressions, wallpaper ad impressions, trick banner impressions, pop-up impressions, pop-under impressions, social video sharing impressions, video ad impressions, audio-video & photography impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, map ad impressions, mobile ads, mobile ad network, mobile advertising for mobile publishers and advertisers and mobile commerce, mobile location-based advertising and promotions or offers associated with location or maps in a social network or website online or mobile device, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, superstitials impressions, interstitial ad impressions, e-mail advertising impressions, display advertising impressions, social media behavior marketing impressions, social media shopping impressions, social media ad impressions, social brand recognition impressions, social media shopping, e-mail marketing impressions referral marketing impressions, referral marketing impressions, affiliate marketing impressions, inbound marketing, video marketing, one-to-one marketing impressions, niche marketing impressions, behavior impressions, affiliate marketing impressions, semantic advertising impressions with two or three dimensional images on geospatial platform using cloud-type configuration and using cloud services in combination with geo-mapping, web mapping, 2D and 3D mapping, GPS, location mapping, social mapping, digital mapping, 3D holographic mapping or mobile mapping technologies, in conjunction with social networking, a social networking environment, social networking interactions between members, to generate marketing and mapping relationships between members of a social network or website, social networking websites, or third party websites or applications.

The invention can provide wherein said third party is selected from a government agency, a credit reporting agency, a social network, an auction site, a company, an educational or financial institution, bank, a lender or mortgage company, an auto company, or a regulatory agency according to applicable laws and regulations.

The invention can provide wherein said company is selected from the group consisting of a financial services company, a product company, a services company, a social network, an auction site, a company, a brand merchant or retailer, a real estate company or related services, an educational or financial institution or bank, an entertainment company, an online penny or online auction, or other type of service company.

The invention can provide wherein the method further comprises: selecting a third social/geo/promo link category for a second position of the social/geo/promo link promotional data set, where the third social/geo/promo link category is different from the one or more identified second social/geo/promo link categories.

The invention can provide wherein: the social/geo/promo link promotional data set is associated with a web page; and the social/geo/promo link categories are ordered by capturing, processing, analyzing and filtering relevance, social content marketing, social contextual ads and connections among said users, members, or their friends, family, acquaintances, classmates, or business associates; user-contributed information, mood recording impressions & updating, friend communications and blog impressions and focused marketing and those interactions are used to select targeted location-based promotions, location-based offers, location-based coupons, promotions or offers in connection with an online or mobile news feed for the user or member of a social network, and connecting them with the brand or advertiser to the web page.

The invention can provide wherein identifying one or more second social/geo/promo link categories using one or more correlation criteria further comprises: identifying one or more social/geo/promo link categories having a correlation measure that is less than a correlation threshold.

The invention can provide wherein at least one second social/geo/promo link category has a separate correlation measure for at least one pair-wise combination of a category identifier associated with the at least one second social/geo/promo link category and a category identifier associated with the first social/geo/promo link category.

The invention can provide wherein promotions, offers, products, or services, are paid for by mobile or interne based payments from users, members, publishers, marketers, user/consumers or third parties, optionally further comprising clicking on a web based promotion link, banner, coupon, offer, discount, window, or pop-up.

The invention can provide wherein a selected promotions or offers automatically give users discounts on their purchases at participating merchants that generate marketing and mapping relationships between members of a social network or website and third party websites or applications.

The invention can provide wherein said media used in said promotions or offers are selected from the group consisting of live or pre-recorded audio or video media, and wherein the purchase of a product or service by a user or member automatically gives users or members discounts on additional purchases at participating merchants.

The invention can provide wherein a selected promotions or offers, coupons, products or services automatically populate a social network website display, a user page, web page, or website, based upon the user's or member's location or geographic location of a mobile device, wireless device, tablet or other electronic device or geographic location of a mobile device, wireless device, tablet or other electronic device, user's or member's profile, or user's or member's preferences.

The invention can provide wherein a selected online payment system is displayed when a user or member clicks on a displayed coupon, promotion, offer, product, or service, based upon the user's or member's location or geographic location of a mobile device, wireless device, tablet or other electronic device or geographic location of a mobile device, wireless device, tablet or other electronic device, profile, or lifestyle preferences.

The invention can provide wherein a selected online payment system is displayed when a user or member clicks on a displayed virtual ad, digital ad, virtual billboard ad, or virtual ad impression, optionally further comprising a display of a virtual advertising image on a virtual landscape or integrated into the background of a social networking websites, third party website or application, live or pre-recorded video.

The invention can provide wherein a selected online coupons, position-based services, ad links, location-based promotions, location-based offers, location-based coupons, promotions or offers, are displayed in connection with an online or mobile news feed.

The invention can provide wherein a selected user's or member's location or geographic location of a mobile device, wireless device, tablet or other electronic device or geographic location of a mobile device, wireless device, tablet or other electronic device, search results, maps in relationship to points of interest, user generated content, online coupons, position-based services, ad links, location-based promotions, location-based offers, location-based coupons, promotions or offers, are displayed in connection with a social network, website, or online or mobile commerce.

The invention can provide wherein a selected user or publisher data across one or multiple applications, platforms, mobile and internet websites, promotions or offers, and generatied user behavior data are provided as cloud-type configuration using cloud services storing and handling.

The invention can provided wherein a user or member or advertiser can select or generate a coupon, promotion or offer that is shared with other users or members of a social network or website and is redeemable at a selected physical location, online, or via a mobile device.

The invention can provided wherein a user's or member's computer, mobile device, wireless device, tablet or other electronic device receives a video or audio alert or text message in connection with a mobile, wireless and internet posted, location based, customized promotions or offers for products or services are displayed in connection with a social network, website or online or mobile commerce based upon the user's or member's location or geographic location of a mobile device, wireless device, tablet or other electronic device, profile, or lifestyle preferences.

The invention can provide the method further comprises collecting and analyzing social tracking data and impressions data of a user's or member's location or geographic location of a mobile device, wireless device, tablet or other electronic device or geographic location of a mobile device, wireless device, tablet or other electronic device, maps in relationship to points of interest, online channels, likes or dislikes, social networking interactions, clicks, sharing links or updates, in order to generate mobile, wireless, and internet posted, location based, customized promotions or offers for products or services, using (i) impressions data, (ii) location information data, (iii) 2D and 3D mapping data, (iv) user internet activity data; and (v) social networking interaction data, to provide coupons, promotions, or offers in a social network or website or online or via a mobile device.

The invention can provide wherein said location-based, customized, promotions or offers include or are related to one are selected from the group consisting of user's or member's location or geographic location of a mobile device, wireless device, tablet or other electronic device, search results, maps in relationship to points of interest, user generated content, mobile location-based advertising, promotions or offers and marketing impressions, real-time user/consumer data with user's location, impressions for advertisers selected from user's or member's preferences, preferred locations, interests, networking interests or connections, channels; location-based services, location-based promotions, location-based offers, location-based coupons, promotions or offers in connection with an online or mobile news feed, location-based discounts or daily deal ads, location-based advertising, location-based ads, location-based marketing, location-based commerce, location-based deals and offers, mobile ads, mobile ad network, mobile advertising, mobile location-based advertising and promotions, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products or services, location-based geo-targeted or geo-tagged advertisements, location-based promotions, location-based offers, location-based coupons, promotions or offers in connection with an online or mobile news feed, location-based advertising, location-based deals and offers, position-based services, ad links, location-based promotions, location-based offers, location-based coupons, promotions or offers in connection with an online or mobile news feed, discount ad impressions, merchant ad impressions, email coupon impressions, online coupons, position-based services, ad links, location-based promotions, location-based offers, location-based coupons, promotions or offers in connection with an online or mobile news feed, location-based advertising, mobile location-based advertising, geo-targeted or geo-tagged advertisements, processing, analyzing and filtering impressions based upon people, places and things, content, audience, geographical area, delivery modes, data sets and ad markers; distribution of location-based promotions, location-based offers, location-based coupons, promotions or offers in connection with an online or mobile news feed, position-based services, advertisements or mobile coupons, mobile grocery coupons, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, targeted mobile ad impressions, mobile user's location, location-based deals and offers, daily deal coupons, last minute deals, free or discounted printable coupons, business directories, SMS marketing.

Accordingly, it is an object of the present invention to provide a new mechanism for tracking social behavior and profiling a user during the marketing of digital content, by any means known in the art, e.g., as disclosed in U.S. application Ser. No. 09/797,647, filed Mar. 1, 2001, which is entirely incorporated herein by reference.

Another object of the invention is to provide cloud-type configuration and using cloud services storing and handling user or publisher data across one or multiple applications, platforms, including mobile and websites, promotions or offers and generating user behavior data.

And another object of the invention is to provide such a mechanism which operates continuously, whenever user/consumers want and without need for the actual physical availability of vendor and financial intermediary parties.

BRIEF DESCRIPTION OF THE DRAWINGS

FIG. 1 is a diagrammatic and block diagram view of a method or system for Mapping Display of Location Based Customized Promotions or Offers for Products or Services based on User Behavior and Location and Social Networking, ("LBCP-PS-UBL-SN") system, according to an exemplary embodiment;

FIG. 2 is a simplified block diagram showing, in greater detail, a database server portion of the main server system shown in FIG. 1;

FIG. 3 is a simplified flowchart diagram view illustrating interactions between the client system, and the main server system, according to an exemplary embodiment;

FIGS. 9-10 are simplified flowchart diagram views showing alternate actions taken by the client system in response to selection by the user of a logo pane and an advertising pane, respectively, according to exemplary embodiments;

FIG. 19 are tables showing the use of delivering advertising search impressions to advertisers brands and other third parties for online marketing of location-based promotions, location-based offers, location-based coupons, promotions or offers in connection with an online or mobile news feed, position-based services, location-based advertising, mobile location-based advertising and promotions or offers and marketing impressions including lists of representative user/consumer, e-commerce, retail, media & entertainment, business, government, sports, or education related and/or services products and services that can be provided in combination with geospatial, web mapping, 2D and 3D mapping, GPS, location mapping, social mapping, digital mapping, 3D holographic mapping and/or mobile mapping technologies with socially responsible information, local, global and company information, user's or member's profile preferences and preferred locations, interests, preferences or networking interests or connections or channels, location-based promotions, location-based offers, location-based coupons, promotions or offers in connection with an online or mobile news feed, position-based services, location-based advertisements, location-based deals and offers, and/or location-based deals and offers and location-based services in real-time via mobile device or wireless device or electronic device or other similar device or android device or tablet device or mobile internet devices or holographic devices or holographic phone or non-phone connected device or computer online coupons, position-based services, ad links, location-based promotions, location-based offers, location-based coupons, promotions or offers in connection with an online or mobile news feed, location-based advertisements impressions, in real time, using in the location-based promotions, location-based offers, location-based coupons, promotions or offers in connection with an online or mobile news feed, position-based services, location-based advertising, mobile location-based advertising and promotions or offers and marketing impressions and online or mobile coupons and promotions or offers for online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies with in real time, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications and charity/humanitarian aid or sustainable gift, according to the present invention.

DETAILED DESCRIPTION

Figure 4:
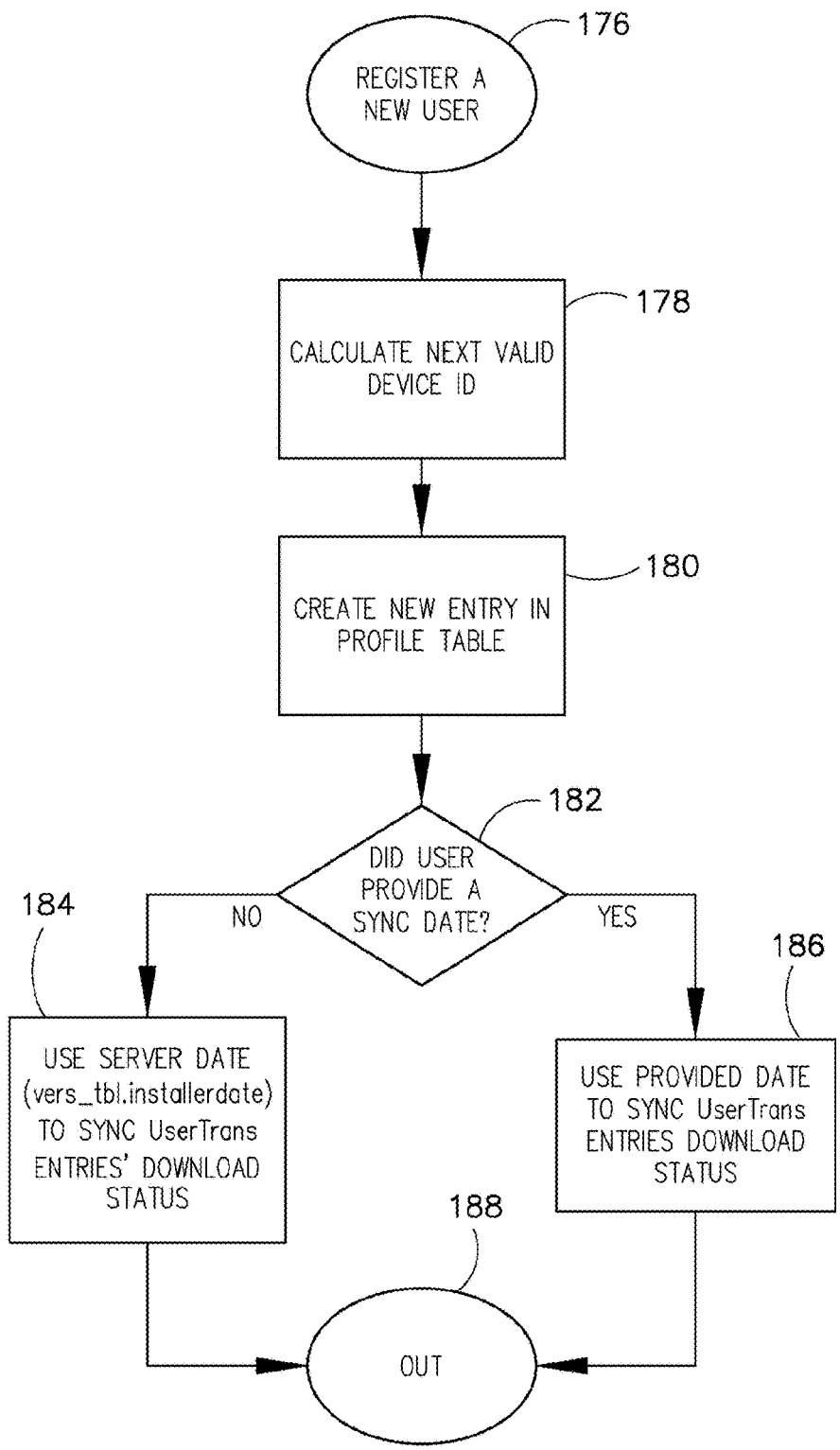
FIG. 4 is a simplified flowchart diagram view showing the steps for registration of a new user on the main server system, according to an exemplary embodiment.

The present invention relates to a one or more of method, apparatus, computer readable medium, computer system, network, or system provided method, apparatus, computer readable medium, computer system, network, or system, is provided for using impressions tracking and analysis, location information, 2D and 3D mapping, social media, and user behavior and information for generating mobile and internet posted promotions or offers for, and/or sales of, products and/or services.

The present invention provides one or more of a method, apparatus, computer readable medium, computer system, wireless or wired network, or system to provide a delivery system for advertisers, brands and/or other third parties to conduct advertising using mobile or internet promotions' or offers' impressions tracking and analysis, location information, 2D and 3D mapping, social media, and user behavior and information for generating mobile and internet posted promotions or offers for, and/or sales of, products and/or services.

Definitions 2D and 3D Mapping, refers to any type of mapping of any user, product provider, service provider, target market, or demographic group location, e.g., but not limited to GPS, GIS, mapping, holographic mapping, 2D mapping, 3D mapping, triangulation, digital mapping, social mapping, position based mapping, web mapping, location mapping, mapping technologies, mobile mapping, and the like, as defined herein and/or as known in the art.

2D Mapping, non-limiting examples of 2D mapping, include a variety of map types that are viewable or visible when displayed directly or via clickable anchors on top of 2D maps. A 2D map browser capable of continuous scrolls and zoom of an arbitrarily large sheet of 2D information (which can be used according to the present invention further including the use of 2D, 3D, GPS, mobile mapping, and location mapping).

3D Holographic Mapping, non-limiting examples of 3D holographic mapping, include any method of mapping three-dimensional points to a two-dimensional plane using holographic mapping technology (which can be used according to the present invention further including the use of 2D, 3D, GPS, mobile mapping, and location mapping).

3D Mapping, non-limiting examples of 3D mapping, include any method of mapping three-dimensional points to a two-dimensional plane (which can be used according to the present invention further including the use of 2D, 3D, GPS, mobile mapping, and location mapping).

Ad Click Impressions can include an Internet advertising model used to direct traffic to websites, where advertisers pay the publisher when the ad is clicked. With search engines, advertisers typically bid on keyword phrases relevant to their target market.

Ad Coverage Impressions can include the percentage of time the advertiser was found on the first page of sponsored listings for a keyword.

Ad Impressions can include a measurement of responses from an ad delivery system to an ad request from the user's browser. Impression Share includes the percentage of searches on all keyword impressions, revenue or revenue sharing impressions in the keyword group that the advertiser was found on the first page of sponsored listings. Ad Impressions include the count of ads, which are served to a user. Ads can be requested by the user's browser, (referred to as pulled ads) or they can be pushed, such as e-mail ads. Ad impressions are a measurement of responses from an ad delivery system to an ad request from the user's browser, which is filtered for robotic activity and is recorded at a point at late as possible in the process of delivery. Advertising Network is a company that connects advertisers to web sites that want to host advertisements online or via a mobile device.

Advertising Network, an online advertising network or ad network is a company that connects advertisers to web sites that want to host advertisements. The key function of an ad network is aggregation of ad space supply from publishers and matching it with advertiser demand. The phrase "ad network" by itself is media-neutral in the sense that there can be a "Television Ad Network" or a "Print Ad Network" or a "Social Ad Network," but is increasingly used to mean "online ad network" as the effect of aggregation of publisher ad space and sale to advertisers is most commonly seen in the online space. The fundamental difference between traditional media ad networks and online ad networks is that online ad networks use a central Ad server to deliver advertisements to user/consumers, which enables targeting, tracking and reporting of impressions in ways not possible with analog media alternatives.

Ad Network, ad networks (advertising network, banner network, online ad network) are advertising companies, which administer ad sales, billing, serving and collection for web sites. Ad networks often aggregate sites into specific categories or demographic groups or geographic data, then sell ad inventory to advertisers either to specific sites within the networks, specific categories or demographics, or via run of network buys, which target sites within the network. Ad networks can sell ad inventory on CPM, CPC, CPA and other revenue models.

Ad Server, can include ad servers for publishers that are designed to maximize ad revenue for the publisher. There are ad servers for advertisers, marketers and agencies that help advertisers in campaign management. There are ad servers for ad networks, which are similar to ad servers for publishers with the additional feature on which publishers are making money and which ones are not.

Ad Server, can include a third-party system composed of powerful server hardware, ad-serving software, and a powerful Internet connection, used by advertisers and web publishers for rapid and reliable display of online advertisements.

Ad Rotation can include the practice of showing multiple advertisements in a single location a web page.

Ad-Sponsored Link Impressions can include or paid link advertisements and the three main service providers are Google™, Yahoo™ and Microsoft™. Google AdWords™, Yahoo Search Marketing™ and Microsoft Line Search™ listings allow a business to pay for ads that are displayed when certain key word terms are used in searches. The ads can be restricted to a specific search engine.

Advertisements or Advertising, advertisements can include any type of Promotion of Offer in any form of any online or mobile coupons and promotions or offers for products and/or services.

Ad Click Impressions, non-limiting examples include, but are not limited to, include the number of ad click impressions, profile targeting impressions, unique behavioral profile of users or members, open source impressions, engagement impressions, media, search, video, mobile, cross-media and e-commerce impressions that ads for the advertiser received.

Advertising Application Programming Interfaces (APIs) in a Cloud-Type Configuration and Using Cloud Services, non-limiting examples include, but are not limited to, include is a specification intended to be used as an interface by software components to communicate with each other.

Affiliate Marketing Impressions include is a type of performance-based marketing in which a business rewards one or more affiliates for each visitor customer brought about by the affiliate's own marketing efforts.

Aggregator, people consume content through socially powered aggregators and curators.

Banner Ads, non-limiting examples include, but are not limited to, is a form of advertising on the world wide web delivered by an Ad server. This form of online advertising entails embedding into a web page.

Behavior Information means any information relating to, the activity of (including online activity), interests of, preferences of, browsing or purchasing information of, relationships of, Impressions, locations or preferred locations, social networking information of, and the like, of one or more of a user, a group of users, member or group of members, target markets, demographic groups or geographic data, social networking group, and the like.

Behavioral Targeting, In addition to contextual targeting, online advertising can be targeted based on a user's online behavior. This practice is known as behavioral targeting.

Buying Behavior Impressions, can include the study of when, why, how and where people do or do not buy a product. Purchase decision impressions making pattern is complex amalgam of needs and desires and is influenced by factors such as the 1) user/consumer's societal role, (parent, spouse, workers, etc.), 2) social and cultural environment and 3) aspirations and inhibitions.

Blogs, Blogs, short for web logs, are online journals for a particular person. The owner can post a message periodically, allowing others to comment.

Brand Ads, it is advertising with a strong emphasis on the company brand (logo and/or company name) also known as integrated marketing communications (IMC). Brands use social channels to deliver customer service driven activities.

Brand Advertising Impressions, can include advertising with a strong emphasis on the company brand, (logo and/or company name) also known as integrated marketing communications. Advertising is a paid form of communication tool to communicate with the mass people.

Business2business ("B2B") Ad Impressions, non-limiting examples include, but are not limited to, a business that markets and sells products or services to other businesses. B2B companies do not sell to end user/consumers or individuals. B2B is the practice of individual organizations, including commercial businesses, governments and institutions advertising the sale of their products or services to other company's organizations that in turn resell them, use them as a component in products or services they offer, or use them to support their operations. Business2User/consumer ("B2C") Ad Impressions, A business that markets and sells products or services to individuals or end user user/consumers. The term B2C is generally used to describe businesses that sell their products or services online. Business2business ("B2B") Social Media Communication Impressions, B2B companies who embrace social media to connect with prospects and customers need to understand storytelling as a means for communication told in words, images, audio and video, depending on their use.

Caching Impressions, non-limiting examples include, but are not limited to, include the caching impressions, peer-to-peer impressions, peer-to-peer recommendations, facial recognition technology impressions, affective impressions and recognition impressions at which ads for the advertiser have been served.

Celebrity or Entertainment News, refers to the communication or presentation of any information about any aspect or activity relating one or more celebrities or the entertainment industry.

Channels, a distributed social network channel is an Internet social network service that is decentralized and distributed across different providers. The emphasis of the distribution is on portability a, interoperability and federation capability. It contrasts with social network aggregation services, which are used to manage accounts and activities across multiple discrete social networks.

Cloud-Type Configuration, cloud computing is the delivery of computing and storage capacity as a service to a heterogeneous community of end-recipients. The name comes from the use of a cloud-shaped symbol as an abstraction for the complex infrastructure it contains in system diagrams. Cloud computing entrusts services with a user's data, software and computation over a network.

Cloud Services or Cloud Computing is the delivery of computing and storage capacity as a service to a heterogeneous community of end-recipients over a network. The three types of cloud computing are Infrastructure as a Service (IaaS), Platform as a Service (PaaS), and Software as a Service (SaaS).

Communications, social media communications online includes web-based and mobile-based technologies, which are used to turn communications into interactive dialogue among organizations, communities, and individuals that allow the creation and exchange of user-generated content.

Computer Surveillance, Computer surveillance is the act of performing surveillance of computer or mobile activity and of data stored on a hard drive or being transferred over the Internet.

Cost per Click, the cost for each click an ad receives.

Cost per Impression, or CPI or CPM, are terms used in online advertising and marketing impressions related to web traffic.

Cost Per Impression, often abbreviated to CPI or CPM (Cost per mille) are terms used in online advertising and marketing related to web traffic. They refer to the cost of interne marketing campaigns where advertisers pay for every time their ad is displayed, usually in the form of a banner ad on a website, but can also refer to advertisements in Email advertising. An impression is the display of an ad to a user while viewing a web page. A single web page may contain multiple ads. In such cases, a single page view would result in one impression for each ad displayed. In order to count the impressions served as accurately as possible and prevent fraud, an ad server may exclude certain non-qualifying activities such as page-refreshes or other user actions from counting as impressions. When advertising rates are described as CPM or CPI, this is the amount paid for every thousand qualifying impressions served.

Coupon, in marketing, a coupon is a ticket or document that can be exchanged for a financial discount or rebate when purchasing a product.

CPA, or cost per action, is an ad payment model in which advertisers pay only when an ad display leads to a completed sale, registration, download, etc.

Cost per Thousand (CPM), is a dollar comparison that shows the relative cost of various media or vehicles; the figure indicates the dollar cost of advertising exposure to a thousand households or individuals.

Customer Loyalty Cards, and Payment System for Coupons, Location-Based Promotions, Location-Based Offers, Location-Based Coupons, Promotions or Offers in Connection with an Online or Mobile News Feed and Online or Mobile Coupons and Promotions or Offers for Products and/or Services, a customer loyalty card, in marketing generally and in retailing more specifically, a loyalty card, rewards card, points card, advantage card, or club card is a plastic or paper card, visually similar to a credit card or debit card, that identifies the card holder as a member in a loyalty program. Loyalty cards are a system of the loyalty business model. In the United Kingdom it is typically called a loyalty card, in Canada a rewards card or a points card, and in the United States either a discount card, a club card or a rewards card. Cards typically have a barcode or magnetic stripe that can be easily scanned, and some are even chip cards. Small key ring cards (also known as key tags) which serve as key fobs are often used for convenience in carrying and ease of access. Customer loyalty cards include a payment system for coupons, location-based promotions, location-based offers, location-based coupons, promotions or offers in connection with an online or mobile news feed and online or mobile coupons and promotions or offers for products and/or services, operating through credit cards or other payment services, automatically give users discounts on their purchases at participating merchants. The merchants also have access to data on when customers purchase their goods and their personal information (which can be used according to the present invention further including the use of 2D, 3D, GPS, mobile mapping, and location mapping).

Daily Deal Ads Impressions, is a view of a type of ecommerce in which a website offers a single product for sale for a period of 24 to 36 hours. Members of deal of the day website receive online offers and invitations in postal mail, email and social networks.

Demographic Group means any group for promotions or offers, networking, or any communication that is based on selected criteria, e.g., but not limited to, one or more of age, gender, location, associated attributes, interests, profile, buying or browsing activity or behavior, and the like.

Device Type Ads, are target ads based on the user's device type.

Digital Mapping, is the process by which a collection of data is compiled and formatted into a virtual image. The primary function of this technology is to produce maps that give accurate representations of a particular area, detailing major road arteries and other points of interest (which can be used according to the present invention further including the use of 2D, 3D, GPS, mobile mapping, and location mapping).

Digital Promotions or Offers, is a form of promoting that uses the Internet and world wide web to deliver marketing messages via the web or mobile to attract customers.

Display Advertising, Display advertising appears on web pages in many forms, including web banners.

Education related product and/or services refers to anything that can be included in one or more educational related activities, e.g., education related and/or services products, goods or services that can include any known or potential educational related activity, institution, company, agency, entity, and the like, at any level, e.g., pre-school, elementary school, middle school, a high school, prep school, boarding school, a college, a business, a non-profit company or any other group of people who may desire to association with each other, a university, recreational, professional, local, city, county, state, region, Provence, country, union, league, associated, or group of countries, continental, hemisphere, or any other grouping of any of the above, e.g., company, collegiate or professional. Educational related refers to any type or educational related endeavor.

Facebook, is a social networking service and website launched in February 2004. Users or members must register before using the site, after which they may create a personal profile, add other users or members as Friends and exchange messages, including automatic notifications when they update their profile.

Facial Recognition Technology Impressions or Facial Recognition System, is a computer application for automatically identifying or verifying a person from a digital image or a frame from a video source. One of the ways to do this is by comparing selected facial features from the image and a facial database. It is typically used in security systems and can be compared to other biometrics such as fingerprint or eye iris recognition systems.

Filtering, is the number of keyword impressions, revenue or revenue sharing impressions in the keyword group that the advertiser was found on the first page of sponsored listings across the World Wide Web on a computer, mobile device or other devices.

Gambling, the terms "gaming," "gambling" or the like, refers to either land-based or online events, activities, games, sessions, rounds, hands, rolls and operations etc., including video games, Web games, online casino, casino games, card games, poker, dice games, online sports betting, sporting events and/or any other gaming or gambling events. In addition, the word "bet," "bid," or the like, refer to any type of wagers, bets or gaming ventures that are placed on random events, whether of monetary or non-monetary value, as known in the art, and/or as presented herein and below and delivery system for providing and using location-based promotions, location-based offers, location-based coupons, promotions or offers in connection with an online or mobile news feed and other products, including location-based advertising, mobile location-based advertising and promotions or offers and marketing impressions across the world wide web on a computer, mobile device or other devices.

Game Impressions, refers to advertising in computer, video games and social games.

Geo-Coding, geo-coding refers to a process of taking non-coordinated based geographical identifiers, such as a street address and finding associated geographic coordinates across the world wide web on a computer, mobile device or other devices. Geo-Location, (IP) Ads, are targeted ads based on the user's location as defined by their device IP address.

Geocoding, Geocoding refers to a process of taking non-coordinated based geographical identifiers, such as a street address and finding associated geographic coordinates.

Geo-Fencing, geo-fencing is a term utilized primarily in the corporate world that refers to the practice of limiting mobile employees to a specific geographic location by tracking their whereabouts via the technology of global positioning system, ("GPS"). With geo-fencing, as a mobile user enters a pre-defined geography, their mobile device tags them as incoming. Merchant's servers keyed to corresponding apps could be able to send coupons and prompts to new arrivals in the area across the World Wide Web on a computer, mobile device or other devices.

Geofencing, Geofencing refers to the practice of limiting mobile employees to a specific geographic location by tracking their whereabouts via the technology of global positioning system ("GPS").

Geographic Data, data created in a social network in connection with a location or map.

Geo-Location, (Key Value) Ads, are target ads based on the user's location as defined by registration data passed from the app in the ad call.

Geolocation, Geolocation is the identification of the real-world geographic location of an object such as a radar, mobile phone or an Internet connected computer terminal, online coupons, promotions or offers, in real time. Geolocation may refer to the practice of assessing the location or the actual assessed location.

Geospatial Analysis is an approach to applying statistical analysis and other informational techniques to geographically based data. Such analysis employs spatial software and analytical methods with terrestrial or geographic datasets, including geographic information systems and geomatics.

Geotagging, Geotagging is the process of adding geographic identification metadata to various media such as a geo-tagged photograph or video, website, SMS message QR codes or RSS feeds and is a form of geospatial metadata. These data usually consist of latitude and longitude coordinates, though they can also include altitude, bearing, distance, and accuracy data and place names.

Giving Back, Social Shoppers can optionally be able to help those who have been impacted by a natural disaster, live in impoverished conditions or are less fortunate in the world, such as to provide microloans or microcredit, humanitarian aid and sustainable gifts to those in need and support other worldly causes in developing countries and charities in their communities and local and global causes around our planet and other relief efforts for natural and man-made disasters.

Geo-Targeted Ads, is a method of determining the geo-location of a website visitor and delivery different content marketing impressions or ads to that visitor based on his or her location impressions, such as country, region/state, city, metro code/zip code, organization, IP address, ISP or other criteria across the world wide web on a computer, mobile device or other devices.

GIS Technologies, is a system designed to capture, store, manipulate, analyze, manage and present all types of geographical data.

Global Brand Ads, A brand is a "Name, term, design, symbol, or any other feature that identifies one seller's good or service as distinct from those of other sellers." Branding began as a way to tell one person's cattle from another by means of a hot iron stamp. A modern example of a global brand is Coca Cola™, which belongs to the Coca-Cola Company™.

Google Earth, the application of geospatial analysis is where it provides a virtual globe, map and geographical information program. Google Earth™ is a virtual globe, map and geographic information program that layered with geographic information. Google Earth™ is available for Android, Windows 2000, XP, Vista 7, Mac OS X, Blackberry Storm, iOS and Linux. Google Earth™ provides a wealth of topographical information about our planet Earth on a variety of subjects. Google Earth™ lets you fly anywhere to view satellite imagery, maps, terrain, 3D buildings, galaxies in outer space, and the depths of the ocean.

GPS Technologies, is a space-based satellite navigation system that provides location and time information in all weather, anywhere on or near the Earth, where there is an unobstructed line of sight to four or more GPS satellites.

Groupware, groupware software allows subjects to share data such as files, photos, text, etc.

Hit or Visit Impressions, a hit or visit impressions is a single file request in the access log of a web server.

Impression(s), also called a view or an ad view, is a term that refers to the point in which an ad is viewed once by a visitor, or displayed once on a web page. The number of impressions of a particular advertisement is determined by the number of times the particular page is located and loaded. It is a measurement of how many times an advertising placement would be served up on a web site on a computer, mobile device or other device. Impression refers to any type of Impression as described or defined herein, or as known in the art.

Instant Messaging, an instant messaging application or client allows one to communicate with another person over a network in real time, in relative privacy. One can add friends to a contact or buddy list by entering the person's email address or messenger ID.

Interactive Advertising, uses online or offline interactive media to communicate with user/consumers and to promote products, brands, services and public service announcements, corporate or political group.

Internet Forums, Internet forums allow users or members to post a "topic" for others to review. Other users or members can view the topic and post their own comments in a linear fashion, one after the other.

Internet Marketing, also known as web marketing, online marketing, advertising or e-marketing is referred to as the marketing, (general promotion) of products or services over the Internet.

Keyword Impressions, is the percentage of keyword impressions in the keyword group that the advertiser was found on the first page of sponsored listings at least once.

Language, may refer either to the specifically human capacity for acquiring and using complex systems of communication, or to a specific instance of such a system of complex communication. The scientific study of language in any of its senses is called linguistics. There are approximately 3,000 to 6,000 languages that are spoken by humans today are the most salient examples, but natural languages can also be based on visual rather than auditory stimuli, for example in sign languages and written language. Codes and other kinds of artificially constructed communication systems such as those used for computer programming can also be called languages. A language in this sense is a system of signs for encoding and decoding information.

Legal Ad Impressions, is an impression from an advertising by lawyers (attorneys at law) and law firms. Legal marketing is a broader term referring to advertising and other practices, such as client relations and public relations.

Like or Dislike Impressions, in online communities (social networking or media sharing experiences across a broader range of devices, create and maintain user engagement portals, e.g., Facebook™ or YouTube™), dedicated visual GUI elements (icons, buttons, etc.) provide for users or members the options to "like" certain persons, groups, pages, status, posts, comments, published links, videos, photos, etc., thus displaying their personal attraction, acknowledgement or sympathy with the "liked" object and this "liked" status will be constantly displayed. Sometimes communities apply a "dislike" option (as opposed to "like"), some even make possible to withdraw one's "like."

Location-Based Advertising, non-limiting examples of location-based advertising include a new form of advertising that integrates mobile advertising with location-based services (which can be used according to the present invention further including the use of 2D, 3D, GPS, mobile mapping, and location mapping) and online or mobile payment system for coupons, location-based promotions, location-based offers, location-based coupons, promotions or offers in connection with an online or mobile news feed and online or mobile coupons and promotions or offers for products and/or services. The technology is used to pinpoint user/consumer's location and provide location specific geotargeted or geotagged advertisements on their mobile device.

Location-Based Commerce, (L-Commerce) refers to the localization of products and services through mobile commerce and context aware computing technologies. L-commerce revolves around 5 key service areas: a) Location: determining the basic position of a person or a thing; b) Navigation: plotting a route from one location to another; c) Tracking: monitoring the movement of a person or a thing; d) Mapping: creating maps of specific geographical locations; e) Timing: determining the precise time at a specific location; f) Providing location-based services involves several technologies; g) Position Determining Equipment (PDE)—identifies location of mobile device. h) Mobile Positioning Center (MPC)—a server that manages the location info from PDE; i) Geographic Information System (GIS)—geographic contents consists of streets, road maps, addresses, and points of interest; and j) Location-specific content—used in conjunction with geographic content to provide the location of particular services.

Location-Based Deals and Offers, non-limiting examples of location-based deals and offers are based upon where you are and online or mobile payment system for coupons, location-based promotions, location-based offers, location-based coupons, promotions or offers in connection with an online or mobile news feed and online or mobile coupons and promotions or offers for products and/or services. The technology is used to pinpoint user/consumer's location and provide location specific geo-targeted or geo-tagged advertisements and/or location-based promotions, location-based offers, promotions or offers in connection with an online or mobile news feed across the web and on mobile device (which can be used according to the present invention further including the use of 2D, 3D, GPS, mobile mapping, and location mapping).

Location-Based Discounts or Daily Deals, non-limiting examples of location-based discounts or daily deals are based upon where you are and online or mobile payment system for coupons, location-based promotions, location-based offers, location-based coupons, promotions or offers in connection with an online or mobile news feed and online or mobile coupons and promotions or offers for products and/or services. The technology is used to pinpoint user/consumer's location and provide location specific geo-targeted or geo-tagged advertisements and/or location-based discounts or daily deals across the World Wide Web and on mobile device (which can be used according to the present invention further including the use of 2D, 3D, GPS, mobile mapping, and location mapping). Location-Based Promotions, Location-Based Offers, Location-Based Coupons, Promotions or Offers in Connection with an Online or Mobile News Feed, non-limiting examples of location-based promotions, location-based offers, location-based coupons, promotions or offers in connection with an online or mobile news feed include location-based promotions, location-based offers, location-based coupons, promotions or offers in connection with an online or mobile news feed, location-based advertising, location-based ad impressions, mobile location-based advertising and marketing across the web and on mobile device or computer (which can be used according to the present invention further including the use of 2D, 3D, GPS, mobile mapping, and location mapping) and online or mobile payment system for coupons, location-based promotions, location-based offers, location-based coupons, promotions or offers in connection with an online or mobile news feed and online or mobile coupons and promotions or offers for products and/or services.

Location-Based Services, can include but are not limited to, a general class of computer program level services used to include specific controls for location and time data as control features in computer programs and online or mobile promotions or offers and/or payment systems for location-based promotions, location-based offers, location-based coupons, promotions or offers in connection with an online or mobile news feed and online or mobile coupons and promotions or offers for products and/or services (which can be used according to the present invention further including the use of 2D, 3D, GPS, mobile mapping, and location mapping). Non-limiting examples include, but are not limited to, Recommending product, service, or social events in a city; Requesting the nearest business or service, such as an ATM or restaurant; Turn by turn navigation to any address; Locating people on a map displayed on the mobile phone; Receiving alerts, such as notification of a sale on gas or warning of a traffic jam; Location-based mobile advertising; Asset recovery combined with active RF to find, for example, stolen assets in containers where GPS would not work; Games where your location is part of the game play, for example your movements during your day make your avatar move in the game or your position unlocks content; Real-time Q&A revolving around restaurants, services, and other venues; Resource tracking with dynamic distribution (e.g., taxis, service people, rental equipment, doctors, fleet scheduling.); Resource tracking (e.g., objects without privacy controls, using passive sensors or RF tags, such as packages and train boxcars); Finding someone or something (e.g., Person by skill (doctor), business directory, navigation, weather, traffic, room schedules, stolen phone, emergency calls); Proximity-based notification (push or pull) (e.g., Targeted advertising, buddy list, common profile matching (dating)); Proximity-based actuation (push or pull) (e.g., Payment based upon proximity (EZ pass, toll watch), automatic airport check-in). Examples include Google Latitude™ and Apple™'s Find My Friends™. Both allow ones permissioned "friends" to track one's location in real time. Each functions in the same way at a high level, but with differing functions and features:

mapping) but in fact it is not mapping because a map is created through some cartographic works (i.e. determining the scale/level of detail and content of geographic or cartographic database, entry criteria and symbol specification for geospatial objects, generalization, layout design etc.). In other words, the acquisition of data with (geographic) coordinates directly from terrain or imagery does not mean mapping but surveying.

Massively Multiplayer Online Games (MMOGs), MMOG's are virtual worlds that add various sorts of point systems, levels, competition and winners and losers to virtual world simulation.

| Function | Google Latitude | Find My Friends |
|---|---|---|
| Operating systems supported | iOS, Android, BlackBerry OS, Windows Mobile, Symbian S60 | iOS only |
| Web application available | Yes | No |
| User identification | Google Account | Apple ID |
| Update frequency of location | Dynamically periodic | On demand by remote user |
| Stale location behavior | Last reported location | Unknown location |
| Location history | Optional, visible only to tracked user | No |
| Temporary location sharing | No | Yes, multiple users, expiry date/time |
| Bilateral sharing of location with friends | Yes by default | No by default |
| Precision levels configurable on a per-friend basis | Best location, city-level or hidden | Best location only |
| Manually configure location | Yes | No |
| Check into nearby place | Yes | No |
| Custom location labels | No | Yes |
| Source of friends' names and photos | Friends' Google profiles | User's own contacts from local iOS device |
| Maximum distance calculated to friends' locations | 5,000 miles | 99 km or 99 miles |

Location-Based Offers, Location-Based Coupons, Promotions or Offers in Connection with an Online or Mobile News Feed, location-based offers, location-based coupons, promotions or offers in connection with an online or mobile news feed are a special kind of offer, a kind of sales promotion in a general class of computer program-level services used to include specific controls for location and time data as control features in computer programs. As such (LBO or LBS) is an information and has a number of uses in Social Networking today as an entertainment service, which is accessible with mobile devices through the mobile network and which uses information on the geographical position of the mobile device. This has become more and more important with the expansion of the smartphone and pad markets as well.

Location Mapping is the place or point that something is at and closely related to location-based services and includes a check-in feature that ties in social networking integration and location-based services (which can be used according to the present invention further including the use of 2D, 3D, GPS, mobile mapping, and location mapping).

Location Information means any information relating to current, prior, preferred, desired, interested, or future location of one or more of a user, a group of users, member or group of members, target markets, demographic groups or geographic data, social networking group, product provider, service provider, or related thereto.

Mapped Ads, includes a form of advertising in which information or products or services are added to online mapping services.

Mapping, Mapping usually refers to map-making and often used instead of cartography. Mapping term is also sometimes used for geospatial data collection (e.g. LIDAR Media Impressions, web-based and mobile-based technologies, which are used to turn communication into interactive dialogue between organizations, communities and individuals.

Merchant Ads, includes users or members will be able to advertise their business on Social Earth. When someone clicks on your ad, they will land on your page where they can learn more about your business or make a purchase.

Microloans or Microcredit Market, is an extension of very small loans to those in poverty designed to spur entrepreneurship.

Mobile Ads with Location or Maps in a Social Network or Website Online or Mobile Device, a form of advertising via mobile or wireless device or electronic device or mobile devices or computer relating to mobile advertising through a mobile ad network, mobile advertising for mobile publishers and advertisers and mobile commerce, mobile location-based advertising and promotions or offers associated with location or maps in a social network or website online or mobile device.

Mobile Banking or Mobile Wallet Services, mobile payment services operated under financial regulation and performed from or via a mobile device. Mobile payment or mobile wallet services is an alternative payment method.

Mobile Browser, also called a micro-browser, mini-browser or wireless Internet browser is a web browser designed for use on mobile devices or computer such as a mobile phone or PDA.

Mobile Coupons, is an electronic ticket or coupon that can be searched for and then delivered to a mobile device, which can be exchanged for a financial discount or rebated when purchasing a product or service or groceries.

Mobile Device Communication Standards: Global System for Mobile Communications (GSM) and IS-95. In 3G, can be UMTS with CDMA-2000. All radio access technologies divide the finite RF spectrum among multiple users or members as efficiently as possible. GSM uses TDMA and FDMA for user and cell separation. UMTS, IS-95 and CDMA-2000 use CDMA. WIMAX and LTE use OFDM.

Mobile Device Network Operators. The term mobile device network operator includes any company, agency, administrator, network, system, provider, marketer, distributor, developer, and the like, for any mobile or wireless provider, or related hardware, software, server, infrastructure, network, switching, routing, maintenance, or service provider. Non-limiting examples include one or more of, but are not limited to, international, national, regional, provincial, state, county or local mobile network operators.

Mobile Geotagging, Mobile geotagging identifying people, objects and data by their geographical location. One way to identify the data and object by their physical location is by geotagging them.

Mobile Location-Based Advertising & Services, location-based services are a general class of computer program-level services used to include specific controls for location and time data as control features in computer programs. As such (LBS) is an information and has a number of uses in Social Networking today as an entertainment service, which is accessible with mobile devices through the mobile network and which uses information on the geographical position of the mobile device. This has become more and more important with the expansion of the smartphone and pad markets as well.

Mobile Mapping, includes the process of collecting geospatial data from a mobile device typically fitted with a range of photographic, radar, laser, LiDAR or any number of remote sensing systems (which can be used according to the present invention further including the use of 2D, 3D, GPS, mobile mapping, and location mapping).

Mobile Messaging: Messaging, especially SMS, has been used in combination with various LBS applications, such as location-based mobile promotions or offers for products or services/mobile coupons/discounts to mobile subscribers, and the like, such as those who are near to advertising restaurants, cafes, movie theatres, and the like.

Mobile Search, is an evolving branch of information retrieval services that is centered on the convergence of mobile platforms and mobile phones and other mobile devices or computer. Web search engine and SEO ability in a mobile form allows users or members to find mobile content marketing impressions in a social network or on websites, which are available to mobile devices or computer on mobile networks. Mobile Search Impressions, is a measure of the number of times an ad is displayed on a via a mobile device or wireless device or electronic device, whether it is clicked on or not.

Mobile Social Networks, Mobile Social Networking is social networking where individuals with similar interests converse and connect with one another through their mobile phone and/or tablet. Much like web-based social networking, mobile social networking occurs in virtual communities.

Mobile Web, refers access to the World Wide Web i.e. the use of browser-based Internet services, from a handheld mobile device, such as a smartphone, a feature phone or a tablet computer connected to a mobile network or other wireless device.

Network Surveillance, the vast majority of computer surveillance involves the monitoring of data and traffic on the Internet.

News feed, A web feed (or news feed) is a data format used for providing users with frequently updated content. Content distributors syndicate a web feed, thereby allowing users to subscribe to it. Making a collection of web feeds accessible in one spot is known as aggregation, which is performed by an aggregator. A web feed is also sometimes referred to as a syndicated feed. A typical scenario of web feed use is: a content provider publishes a feed link on their site which end users can register with an aggregator program (also called a feed reader or a news reader) running on their own machines; doing this is usually as simple as dragging the link from the web browser to the aggregator. When instructed, the aggregator asks all the servers in its feed list if they have new content; if so, the aggregator either makes a note of the new content or downloads it. Aggregators can be scheduled to check for new content periodically. Web feeds are an example of pull technology, although they may appear to push content to the user. A news feed in connection with a location-based coupon, promotion or offer for products or services.

Offer, a special offer, a kind of sales promotion or offer.

Online Advertising means any form of promotion or offer that uses the Internet and World Wide Web to deliver marketing messages to attract customers.

Online Advertising, non-limiting examples include, but are not limited to, includes a form of promotion or offer that uses the Internet and world wide web to deliver marketing messages to attract customers. Examples, of online advertising include contextual ads on search engine result pages, banner ads or graphic color ads, sponsored video ads, digital promotions or offers, online classified ads, yellow page ads, white page ads, text message ads, interactive advertising, post blogs, rich media ads, social networking ads, ad products for advertisers and users or members, interstitial ad impressions, online classified advertising, advertising network, affiliate marketing impressions and e-mail marketing impressions referral marketing impressions, including e-mail spam. An Ad server delivers many of these types of ads across the World Wide Web on a computer, mobile device or other devices. Online Marketing Channels, non-limiting examples include, but are not limited to, includes the process of placing ads on third-party websites with the goal of creating branding awareness and/or generating traffic. Examples include banner ads or graphic color ads, sponsored video ads, digital promotions or offers, online classified ads, yellow page ads, white page ads, text message ads, interactive advertising, social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, sports ad impressions, mobile social video sharing impressions, video ad impressions, audio-video & photography impressions, interactive ads, overlays, interstitials, etc. Online Advertising means any form of promotion or offer that uses the Internet and World Wide Web to deliver marketing messages to attract customers. Examples of online advertising include contextual ads on search engine results pages, banner ads or graphic color ads, sponsored video ads, digital promotions or offers, online classified ads, yellow page ads, white page ads, text message ads, interactive advertising, post blogs, Rich Media Ads, Social network advertising, interstitial ad impressions, online classified advertising, advertising network, affiliate marketing impressions and e-mail marketing impressions referral marketing impressions, including e-mail spam. Many of these types of ads are delivered by an Ad server. Online Advertisements: Online advertisements can include various forms of animation. In its most common use, the term "online advertising" comprises all sorts of banner, e-mail, in game, and keyword advertising. Web-related advertising has a variety of sites to publicize and pay per view impressions a niche audience to focus its attention to a specific group. Revenue or revenue sharing models: Compensation Methods: The three most common ways in which online advertising is purchased are CPM, CPC, and CPA. CPM, (Cost Per Mille) or CPT, (Cost Per Thousand Impressions) is when advertisers pay for exposure of their message to a specific audience. "Per mille" means per thousand impressions, or loads of an advertisement. However, some impressions may not be counted, such as a reload or internal user action. CPV, (Cost Per Visitor) is when advertisers pay for the delivery of a Targeted Visitor to the advertisers website. CPV, (Cost Per View) is when advertisers pay for each unique user view of an advertisement or website, (usually used with pop-ups, pop-under and interstitial ad impressions). CPC, (Cost per click) or PPC, (Pay Per Click) is when advertisers pay each time a user ad click impressions, profile targeting impressions, unique behavioral profile of users or members, open source impressions, engagement impressions, media, search, video, mobile, cross-media and e-commerce impressions on their listing and is redirected to their website. They do not actually pay for the listing, but only when the listing is clicked on. This system allows advertising specialists to refine searches and gain information about their market. Under the Pay per click pricing system, advertisers pay for the right to be listed under a series of target rich words that direct relevant traffic to their website, and pay only when someone ad click impressions, profile targeting impressions, unique behavioral profile of users or members, open source impressions, engagement impressions, media, search, video, mobile, cross-media and e-commerce impressions on their listing which links directly to their website. CPC differs from CPV in that each click is paid for regardless of whether the user makes it to the target site. CPA, (Cost Per Action or Cost Per Acquisition) or PPF, (Pay Per Performance) advertising is performance based and is common in the affiliate marketing impressions sector of the business. In this payment scheme, the publisher takes all the risk of running the ad, and the advertiser pays only for the amount of users or members who complete a transaction, such as a purchase or sign-up. This model ignores any inefficiency in the seller's web site conversion funnel. The following are common variants of CPA: CPL, (Cost Per Lead) advertising is identical to CPA advertising and is based on the user completing a form, registering for a newsletter or some other action that the merchant feels will lead to a sale. CPS, (Cost Per Sale), PPS, (Pay Per Sale), or CPO, (Cost Per Order) advertising is based on each time a sale is made. eCPM: Effective CPM or eCPM calculated through other conversion events such as Cost per ad click impressions, profile targeting impressions, unique behavioral profile of users or members, open source impressions, engagement impressions, media, search, video, mobile, cross-media and e-commerce impressions, Cost per Downloads, Cost per Leads etc. for example when an advertiser getting $2 per download and for 100,000 impressions you received 10 downloads worth $20, in this case your effective CPM or eCPM will be 2*20*1000/100,000=$0.4. Fixed Cost: Advertiser paying fixed cost for delivery frame by campaign flight dates without and capturing, processing, analyzing and filtering relevance, social content marketing, social contextual ads and connections among users or members, their friends, family and others, (e.g. acquaintances, close friends, family, peer groups, classmates, business associates and others, etc.), user-contributed information, mood recording impressions & updating, friend communications and micro blog impressions and focused marketing and those interactions are used to select targeted location-based promotions, location-based offers, location-based coupons, promotions or offers in connection with an online or mobile news feed for the user or member of a social network and the like, and connecting them with the brand or advertiser to performance.

Cost per conversion describes the cost of acquiring a customer, typically calculated by dividing the total cost of an ad campaign by the number of conversions. The definition of "Conversion" varies depending on the situation: it is sometimes considered to be a lead, a sale, or a purchase. Other Types of Online Advertising: Floating Ad: An ad which moves across the user's screen or floats above the content marketing impressions. Expanding Ad: An ad, which changes size and which may alter the content marketing impressions of the webpage. Polite Ad: A method by which a large ad will be downloaded in smaller pieces to minimize the disruption of the content marketing impressions being viewed. Wallpaper Ad: An ad, which changes the background of the page being viewed. Trick Banner: A banner ad that looks like a dialog box with buttons. It simulates an error message or an alert. Pop-up: A new window, which opens in front of the current one, displaying an advertisement, or entire webpage. Pop-under: Similar to a Pop-Up except that the window is loaded or sent behind the current window so that the user does not see it until they close one or more active windows. Video Ad: similar to a banner ad, except that instead of a static or animated image, geographic location actual moving video clips are displayed. This is the kind of advertising most prominent in television, and many advertisers will use the same clips for both television and online advertising. Map Ad: text or graphics linked from, and appearing in or over, a location an electronic maps such as on Google Maps™. Mobile Ad: an SMS text or multimedia message sent to a cell phone. Superstitial: An animated ad on a Web page from Enliven Marketing Technologies. It uses video, 3D content marketing impressions or Flash to provide a TV-like advertisement. Interstitial Ad: a full-page ad that appears before a user pay per view impressions their original destination. In addition, ads containing streaming video or streaming audio are becoming very popular with advertisers. E-mail Advertising: Legitimate Email advertising or E-mail marketing impressions referral marketing impressions is often known as "opt-in e-mail advertising" to distinguish it from spam.

Online Classified Ads, Yellow Page Ads, White Page Ads, Text Message Ads, include a form of advertising which is particularly common in newspapers online and other periodicals which may be sold or distributed free of charge.

Online media of online advertising is a measure of the number of times a media ad is displayed and whether it is clicked on or not.

Online or Mobile Coupons and Promotions or Offers for Products and/or Services means any Products, Goods, Gambling or Service described herein, or as known in the art.

Online Payment System, online or mobile payment and advertising network infrastructure that enables product or service providers, advertisers, networks, brands, and/or other third parties associated with a promotion or offer can be compensated in the form or payment (e.g., using a debit or credit account, or any other means), barter, or exchange, in any local or national or multinational currency, loan, and the like, from users or members, publishers, marketers, user/consumers and other third parties online or mobile for products or services (e.g., but not limited to, merchandise, charity, services, gambling, financial products, loans, property, and the like), or promotions or offers, online communities, government, or education related and/or services (which can be used according to the present invention further including the use of 2D, 3D, GPS, mobile mapping, and location mapping). Automatic population of a coupon, promotion, offer, ad, product and/or service based upon user profile and/or lifestyle preferences. Online payment system wherein a user or member clicks on a coupon, promotion, offer, product and/or service based upon user profile and/or lifestyle preferences. Such payments can include any form, e.g., but not limited to a bank or financial account, and can be generated in any form, e.g., but not limited to clicking on a link, coupon, promotion, offer, ad, discount, icon, location, building, product, service, person, name, avatar, etc., on a map or a web page, which can include but it not limited to, a banner, pop-up, link, one click or more than one click, for account, personal, company, governmental, registered or unregistered users, and/or any payment system, e.g., but not limited to, online payment systems, a credit or debit card, PayPal, and the like, using the same or different browser, program, operating system, computer, interne access device, mobile device, smart phone, and the like.

Online Print Media or Book Ads, advertising in a print media arena. The two most common forms of print advertising are newspapers and magazines. Print media also includes outdoor billboards, posters on buses, subways, trains, bathrooms, ads in phone books or directories, direct mail and social media.

Page Impressions, non-limiting examples include, but are not limited to, informs site owners how many times their sites were visited. Paid Search Impressions, non-limiting examples include, but are not limited to, includes a form of advertising where the advertiser has to pay for ads of products or services displayed, when a searcher types keyword impressions, revenue sharing impressions related to those products or services into a search engine. Pay per click is one way an advertiser only pays for ads when someone ad click impressions, profile targeting impressions, unique behavioral profile of users or members, open source impressions, engagement impressions, media, search, video, mobile, cross-media and e-commerce impressions on the ad.

Penny Auctions or Online Auctions Impressions, includes the number of penny or online auction impressions in an auction where bidders pay-per-bid for an item and the time increase with each bid.

Position-Based Services, non-limiting examples of position-based services include a typical position based service that provides information based on the current position of the user (which can be used according to the present invention further including the use of 2D, 3D, GPS, mobile mapping, and location mapping).

Prediction Markets, many predictions market tools have become available that make it easy to predict and bet on future events. This is a more formal version of social interaction, although it qualifies as a robust type of social software.

Predicting Future Behavior, or behavior is the study of when, why, how, and where people do or do not buy a product. It blends elements from psychology, sociology, social anthropology and economics. It attempts to understand the buyer decision making process, both individually and in groups. It studies characteristics of individual consumers such as demographics and behavioral variables in an attempt to understand peoples wants. It also tries to assess influences on the consumer from groups such as family, friends, reference groups, and society in general.

Product means any Product described herein, or as known in the art: Non-limiting examples of Products provided through Promotions or Offers by the present invention, can include, but are not limited to: merchandise, retail products, wholesale products, virtual products, electronics, clothing, food, water, beverages, household, commercial products, household or housing products, cleaning products, footwear, appliances, autos, trucks, motorcycles, boats, airplanes, commercial and residential construction products, music, audio, and video products, books, computers, hardware, systems, operating systems, software, products relating to mobile banking and mobile wallet services, products relating to entertainment, shopping, products relating to penny auctions or online auctions, products relating to affiliate services, products relating to e-commerce, products relating to sports, products relating to media and entertainment, musical instruments, educational products, personal & financial network products, travel & hospitality products, real estate products, educational products, sports and sporting events, products by service providers, online dating, online gambling, gaming, retail stores, virtual communities, real estate products, information on market trends and predictions, mortgage quotes, loans, auto loans, insurance, home equity loans; mortgage rates, lender quotes, real estate properties products, advertising, auto quotes, messaging, news feeds, weather, news, financial products, real estate products (e.g. leasing, buying or selling of vacant land, residential, commercial, recreational, retail, shopping malls, hotels, motels, golf courses, casinos, resorts, marinas, industrial, vacation, time shares, condominiums, multifamily, and other types of real estate, etc.), educational products, brokers, agents, relocation products, internet marketing, concierge, transportation, entertainment, travel and hospitality products, lenders, appraisers, developers, contractors, inspectors, home improvements/remodeling (home warranties, insurance, indoor and outdoor furniture, fixtures, windows, siding, roofing, heating/cooling, solar, plumbing, electrical, mechanical, and similar types) or other products, merchandizing, cleaning, transportation, financial, banking, travel, residential, commercial, governmental, auctions, estate planning, food, grocery, livestock, husbandry, veterinary, medical, cosmetic, spa, hair, resort, moving, relocation, floor coverings, furniture, copying, office, management, filing, accountant, beverage, and the like.

Product Provider means any provider (in any form, e.g., but not limited to a discover, inventor, developer, manufacturer, co-developer, marketer, distributor, wholesaler, retailer, importer, exporter, seller, reseller, auctioneer, bidder, agent, representative, and the like of any Product.

Profile Targeting Impressions, User or member profile targeting involves a target ads based on a user's profile information, which is stored during the registration process. Advertisers can choose the delivery limitation by targeting to the specific peoples. For instance, on collecting the gender, you can serve unique ads to males and females.

Product Review Impressions, non-limiting examples include, but are not limited to, a view or impression of a product review. Product Reviews are ranked in the major search engines and continue to make sales for years! Survey statistics show that approximately 83% of user/consumers say that product reviews influence their online purchasing decisions; Approximately 70% of online shoppers actively seek out product reviews before they buy; More than half of US online shoppers surveyed, read user reviews as part of their product research; Nearly 9 of 10 U.S. online buyers read reviews at least "some of the time" before making a purchase. Price Comparison Impressions, a view or impression of a price comparison "allows people to see different lists of prices for specific products." Basically it is a way to see similar products from different companies so that you can compare the price and save money.

Promotions/Promoting, as used herein the term "promotion," or "promotions," or "promoting," or "offer," "offers," or "offering," means providing any type of information in any language or translated into any language or scripting social media content in any language or translated into any language relating to any product or service for the purpose of promoting that product or service, and includes, but is not limited to, any type of Advertisement, Advertising, Ad, marketing, coupon, discount, offer, daily deal, auction, or Impression used for promotion or offer, and the like.

Online Promotion(s) means any type of Promotion or Offer in any form provided over the Internet, such as a social network or website, blog, pop up and the like, including mobile or wireless devices, as well as any Internet accessing device, including any type of computing device or computer.

Real-Time Bidding (RTB), Real-time bidding (RTB) is a relatively new method of selling and buying online display advertising in real time one ad impression at a time.

Real-Time Geo-Tagging, include real-time geo-tagging is a name given to the automatic technique of acquiring media, (such as photos, audio or video), associating a specific location with the media, transferring the media to an online map and publishing the media in real-time.

Real-Time Geotagging, Real-time geotagging is a name given to the automatic technique of acquiring media, associating a specific location with the media, transferring the media to an online map and publishing the media in real-time.

Reference or Book Impressions, include a point of view or opinion about a particular subject or topic or book.

Semantic Advertising, Semantic advertising applies semantic analysis techniques to web pages. The process is meant to accurately interpret and classify the meaning and/or main subject of the page and then populate it with targeted advertising spots. By closely linking content to advertising, it is assumed that the viewer will be more likely to show an interest (i.e., through engagement) in the advertised product or service.

Served Impressions, ad networks like "served impressions" as it lets them record more impressions and charge more money to advertisers.

Service means any service described herein, or as known in the art: Non-limiting examples of Services provided through Promotions or Offers by the present invention, can include, but are not limited to: search engines or search requests; social, local, mobile search, mobile services, mobile banking and mobile wallet services, entertainment shopping, penny auctions or online auctions, affiliate services, e-commerce, sports, media and entertainment, educational, personal & financial network, travel & hospitality services, real estate, educational services, sports and sporting events, services by service providers, online dating, online gambling, gaming, retail stores, virtual communities, real estate services, information on market trends and predictions, mortgage quotes, loans, auto loans, insurance, home equity loans; mortgage rates, lender quotes, real estate properties service advertising, auto quotes, messaging, news feeds, weather, news, financial services, real estate services (e.g. leasing, buying or selling of vacant land, residential, commercial, recreational, retail, shopping malls, hotels, motels, golf courses, casinos, resorts, marinas, industrial, vacation, time shares, condominiums, multifamily, and other types of real estate, etc.), educational services, brokers, agents, relocation services, internet marketing, concierge, transportation, entertainment, travel and hospitality services, lenders, appraisers, developers, contractors, inspectors, home improvements/remodeling (home warranties, insurance, indoor and outdoor furniture, fixtures, windows, siding, roofing, heating/cooling, solar, plumbing, electrical, mechanical, and similar types) or other services, merchandizing, cleaning, transportation, financial, banking, travel, residential, commercial, governmental, auctions, estate planning, food, grocery, livestock, husbandry, veterinary, medical, cosmetic, spa, hair, resort, moving, relocation, floor coverings, furniture, copying, office, management, filing, accountant, beverage, and the like.

Service Provider means any provider (in any form, e.g., but not limited to a discover, inventor, developer, manufacturer, co-developer, marketer, distributor, wholesaler, retailer, importer, exporter, seller, reseller, auctioneer, bidder, agent, representative, and the like of any Service.

Shared Revenue or Revenue Sharing Business Model, include in business, revenue or revenue sharing refers to the sharing of profits among different groups. On the Internet, revenue or revenue sharing is also known as cost per sale and accounts for about 80% of affiliate compensation programs. Companies such as Groupon™, eBay™, Living Social™ all use the shared revenue or revenue sharing business model.

Shared Search Results, the now-conventional strategy of harnessing links and keywords to climb higher in search results has been fading for a while. Social media emerged as an alternative referral source. Google™ tweaked its quality signals to reduce the impact of strategies that manipulate search results.

Shared Servers, a shared web hosting service or virtual hosting service or derive host refers to a web hosting service is where many websites reside on one web connected to the Internet. Each site "sits" on its own partition, or section/place on the server, to keep it separate from other sites. This is generally the most economical option for hosting, as many people share the overall cost of server maintenance. Shared Source Software, shared source software is an umbrella term covering some of Microsoft's legal mechanisms for software source code distribution. Microsoft's Shared Source Initiative, launched in May 2001, includes a spectrum of technologies and licenses. Most of its source code offerings are available for download after eligibility criteria are met. The licenses associated with the offerings range from being closed-source, allowing only viewing of the code for reference, to allowing it to be modified and redistributed for both commercial and non-commercial purposes. Shared Storage Shared storage typically refers to a shared network drive that many people can access. Shared storage can be engineered with the existing ethernet in a motherboard, and allows anyone on the network to access files from the server. Shared Networks, A shared network is also known as hubbed network, which is connected with a hub. Hubs are commonly used to connect segments of a LAN. When a packet arrives at one port, it is copied to the other ports so that all segments of the LAN can see all packets. A passive hub serves simply as a conduit for the data, enabling it to go from one device (or segment) to another. So-called intelligent hubs include additional features that enable an administrator to monitor the traffic passing through the hub and to configure each port in the hub. Intelligent hubs are also called manageable hubs. A third type of hub, called a switching hub, actually reads the destination address of each packet and then forwards the packet to the correct port.

Social Advertising Impressions, an impression (in the context of online advertising) is a measure of the number of times an ad is displayed, whether it is clicked on or not. Each time an ad displays is counted as one impression. Counting impressions is the method by which most Web advertising is accounted and paid for, and the cost is quoted in CPM (cost per thousand impressions). (Contrast CPC, which is click- and not impression-based.) Because of the possibility of click fraud, robotic activity is usually filtered and excluded, and a more technical definition is given for accounting purposes by the IAB, a standards and watchdog industry group: Impression—a measurement of responses from a Web server to a page request from the user browser, which is filtered from robotic activity and error codes, and is recorded at a point as close as possible to opportunity to see the page by the user.

Social Bookmarking, some web sites allow users or members to post their list of bookmarks or favorite website for others to search and view them.

Social Cataloging, social cataloging is software aimed towards academics. It allows the user to post a citation for an article found on the Internet or a website, online.

Social Cataloging, Social cataloging is software aimed towards academics. It allows the user to post a citation for an article found on the Internet or a website, online database like Academic Search Premier or LexisNexis.

Social Content Marketing, includes recommendations of friends have a powerful influence on user/consumer interest and purchase decision impressions, shopping ad impressions, promoted trend impressions. Advertisers will include "social contextual ad impressions" with their marketing messages.

Social Distribution Channels, over time people are consuming and creating more kinds of information at a faster pace across a broader range of mobile and wireless devices.

Social Engine, Social engine refers to a web based framework and platform for developing custom social apps as well as hosting them. A social engine acts as a web operating system for developing all kinds of social networking services and projects.

Social Experiences, is where users or members engage with friends and share experiences across the world wide web on a computer, mobile device or other devices.

Social Functionality, (e.g. the Like button) is spreading from host platforms to the wider web.

Social Graph Impressions, represents the connections between people, their friends and family and interests with user/consumer data, location and map data connecting the user/consumer and their friends with the brand or advertiser for a more interactive shopping experience.

Social Guides, a social guide recommending places to visit or contains information about places in the real world such as coffee shops, restaurants and wi-fi hotspots, etc.

Social Layers, Includes Internet or mobile access to seamless layers of location-based promotions, location-based offers, location-based coupons, promotions or offers in connection with an online or mobile news feed and online or mobile coupons and promotions or offers for products and/or services (which can be used according to the present invention further including the use of 2D, 3D, GPS, mobile mapping, and location mapping)

Social Mapping, Social mapping can include, but is not limited to, is the digital profile that social mapping (which can be used according to the present invention further including the use of 2D, 3D, GPS, mobile mapping, and location mapping) creates on people based on their Internet usage and social networks. Digital profiles can be created in many different ways and may contain a variety of data, including it blends both historic and current data to show what has been done and what will likely be done in the future in similar situations.

Social Network, is a social structure made up of individuals (organizations) called "nodes," which are tied (connected) by one or more specific types of interdependency and filtering of user's or member's profile and/or lifestyle preferences and preferred locations, interests, preferences or networking interests or connections or channels, social, local, mobile search, mobile services, mobile location-based advertising and promotions, mobile banking and mobile wallet services, customer loyalty cards, discounts and promotions or offers and online or mobile payment system, which can include but is not limited to use for location-based promotions, location-based offers, location-based coupons, promotions or offers in connection with an online or mobile news feed and online or mobile coupons and promotions or offers for products and/or services.

Social Networking Websites or Third Party Websites or Applications, a social network community represents and connects people in any language or translated into any language. Members of social network communities manage their identity through their profile, they meet new friends and like-minded people in the community, and they connect with each other, rate peers and objects, ask questions, get answers and discuss topics. Connection between one or more plurality of other users of a social networking website or user preferences.

Social Networking Integration, includes social networking links, tracking, collection and/or analysis, including integrated social plugins, to interact and share the latest product or services deals with their friends, family, business associates, acquaintances and others.

Social Networking Services, Social networking services allow people to come together online around shared interests, hobbies or causes.

Social Online Storage, a social online storage applications allow their users or members to collaboratively create file archives containing files of any type, including cloud storage. Files can either be edited online or from a local computer which has access to the storage system.

Social Plug-Ins, a button placed on a website and post blogs that members can click to share their interests in a site with their friends.

Social Shopping, is a method of e-commerce where shoppers' friends become involved in the shopping experience. Social shopping attempts to use technology to mimic the social interactions found in physical malls and stores.

Social Software Applications, Social software applications include communication tools and interactive tools. Communication tools typically handle the capturing, storing and presentation of communications, usually written but increasingly including audio and video as well, which can also include tracking and predicting of online communications via a mobile device or tablet device or computer with respect to third party applications and outside social networks.

Social Plug-ins, A button placed on a website and blogs that members can click to share their interests in a site with their friends. A "Like Box" can also be added to a web page that provides a scrolling window into the organization's Facebook™ page. The "Like Button" and "Like Box" are called "social plugins."

Social Shopping, is a method of e-commerce where shoppers' friends become involved in the shopping experience.

Social Tracking, a method of tracking social interactions.

Sponsored Video Ads, video offers a rich and engaging way to connect with an audience, tell a story and grow a business. When someone runs a sponsored video ad with Google™, they'll reach potential customers on YouTube™ and the Google Display Network™, and receive measurable results on their ads' performance.

Sports Ads, sports are a major part of today's society and as you will see, advertising plays a big role in this, with creative ads everywhere from billboards to bags, the Internet and parking garages.

Sports and Sporting Events that can be included in one or more of Sports related products, goods or services, players and player profiles, include any known or potential sport or sporting event.

Sports related Online or Mobile Coupons and Promotions or Offers for Products, Goods, Gambling, and/or Services means any sports related or sporting event related product, goods or service described herein, or as known in the art.

Tags, non-limiting examples include, but are not limited to, an assigned to a piece of information such as an Internet bookmark, digital image or computer file.

Target Group or Target Marketing Group means any group for which promotions or offers are analyzed, generated or provided for.

Text Chat, Internet Relay Chat (IRC) and other online chat technologies allow users or members to join and communicate with many people at once, publicly, or in groups.

Third Party Click-Throughs, third party click-throughs counts are also used by the Internet advertising industry at large to determine the effectiveness of a banner ad (its location, design, etc.). Often the click-throughs rate (i.e., the percentage of users or members who clicked on the banner after seeing it) is used as a metric to determine the cost of placing the banner ad on a particular Web page.

Third Party Tracking Impressions, non-limiting examples include, but are not limited to, the ability for advertisers to track their ads using third party advertising tags. Tracking Billable Impressions, non-limiting examples include, but are not limited to, how 3rd party ad serving works, because Publisher ad servers and Marketer ad servers count an impression at a different point in the technical process, there is always a variance in the numbers, and reconciling those figures to cut an invoice is a manual, time-consuming process, and a huge administrative cost on the industry. Tracking billable impressions and discrepancies are typically around 10%, but can often exceed this, especially if there is a technical problem with the ad. Third Party Impressions, non-limiting examples include, but are not limited to, an impression that is captured in a Publisher ad server and/or Marketer ad server. Third Party App Impressions, non-limiting examples include, but are not limited to, the number of impressions from third party app platforms such as Virtue™, HootSuite™, ArgyleSocial™ and the like, that include track able brand page posts impressions. Third party apps can also simultaneously update Facebook™, Twitter™, LinkedIn™, a blog, etc. that can load content marketing impressions and advertising.

Third Party Websites or Applications, the term third-party websites or applications can also refer to web-based technologies or applications that are not exclusively operated or controlled by a government entity, and that do not involve significant participation of a nongovernment entity.

Unique Behavioral Profile of Users or Members, non-limiting example of a unique behavior profile of users or members is one involving special interests, shopping, sports, etc.

Unique Behavioral Profile of Users or Members, profile user's web browsing behavior for the purpose of user identification.

User Comment Impressions, User comment impressions gives a user control over their comments on a social networking site. With this module users or members can administer, approve, and delete comments on nodes they create. Permissions are on a per node type basis, so its a great way to, e.g., allow users or members to manage comments on their own blogs.

User Demographics, includes such as age, geographic location, employment, gender, educational history, interests, etc.

User Generated Content, (UGC) covers a range of media content available in a range of modern communications technologies. It entered mainstream usage during 2005, having arisen in web publishing and new media content production circles. Its use for a wide range of applications, including problem processing, news, gossip and research, reflects the expansion of media production through new technologies that are accessible and affordable to the general public. All digital media technologies are included, such as question-answer databases, video, blogging, podcasting, forums, review-sites, social networking, mobile phone photography and wikis. In addition to these technologies, user-generated content may also employ a combination of open source, free software, and flexible licensing or related agreements to further reduce the barriers to collaboration, skill-building and discovery.

User Interactions, user or member interactions with media content in a social network.

User or Member Profile, user or member profile originated with the first social portal, Shared Network subscribers. The network provided an infrastructure featuring shared servers, shared source software, shared storage and shared networks for online making connections, search analytics, data analytics, web analytics, marketing and selling products and services.

User Registration Data Ads, target ads based on any data that is entered by the user and passed from the app in the ad call.

Virtual Ad Impressions, non-limiting examples include, but are not limited to, a view of a virtual advertisement with the use of digital technology to insert the virtual advertising images into a background.

Vertical Impressions, a view of an ad relating to vertical content including shopping, the autos industry, legal information, medical information and travel.

Vertical Search, includes the focuses on a specific segment of online content. The vertical content area may be based on topicality, media type or genre of content. Common verticals including shopping, the autos industry, legal information, medical information and travel.

Video or Voice Chat Ad Impressions, a video or voice chat with your friends, family and colleagues right form your Android phone. A video or voice chat button will appear in the friends list next to your contacts. While video chatting, any text chats from that person will also appear over laid on the video. When switching to a different application while video chatting, video will be paused while audio will continue to run in the background. Video Upload or Presentation Site Ads or Links, a type of video ad that is uploaded to a site such as YouTube™, which supports a wide variety of range of video and audio formats such as WebM files, .MPEG4 and MOV files, .AVI, .MPEGPS, .WMV and .FLV.

Video Clip Ads, video clips are short clips of video, usually part of a longer recording. Video clip ads are viewed by tens of millions of people every day. YouTube uses banner ads or graphic color ads, sponsored video ads and video clip ads.

Viral Impressions, are impressions on stories that get created when someone engages with a social networking page somehow. There are four types of viral impressions: fans, user post, page post and mention.

Virtual Ad Impressions, a view of a virtual advertisement with the use of digital technology to insert the virtual advertising images into a background.

Virtual Ads, Digital Ads or Virtual Billboard Ads or Virtual Ad Impressions, includes the use of digital technology to insert virtual advertising images on a virtual landscape (which can be used according to the present invention further including the use of 2D, 3D, GPS, mobile mapping, and location mapping) or integrated into the background of a social network, social networking websites or third party websites or applications, live or pre-recorded television show or video or sporting event and online or mobile payment system for coupons, coupons and promotions or offers for products and/or services, operating through credit cards or other payment services, automatically give users discounts on their purchases at participating merchants.

Virtual Worlds Virtual worlds are services where it is possible to meet and interact with other people in a virtual environment reminiscent of the real world. Thus, the term virtual reality. Typically, the user manipulates an avatar through the world, interacting with others using chat or voice chat.

Web Bot, web bot is a software program that is claimed to be able to predict future events by tracking keyword impressions, revenue or revenue sharing impressions entered on the Internet. Internet bots monitor articles, post blogs, forums and other forms of Internet chatter. Words in the lexicon are assigned numeric values for emotional quantifiers such as duration, impact, immediacy, intensity and others.

Web Feeds, or news feed is a data format used for providing users or members with frequently updated content marketing impressions.

Web Impressions, the term impression is sometimes used as a synonym for view, as in ad view.

Web Mapping, non-limited examples of web mapping include the process of designing, implementing, generating and delivering maps in the World Wide Web and its products (which can be used according to the present invention further including the use of 2D, 3D, GPS, mobile mapping, and location mapping).

Widgets, is a software widget for the web. A stand along application that can be embedded into third party sites by any user on a page where they have rights of authorship, (e/g. webpage blog or profile on a site).

Wikis, a wiki is a web page whose content marketing impressions can be edited by its visitors Wikis, a wiki is a web page whose content can be edited by its visitors.

For example, such a system of method of the invention can use promotion or offer application programming interfaces (APIs) in a server, computer or cloud-type configuration for providing mobile and web based promotions or offers that connect user information and internet activity with location based information targeting location-based promotions, location-based offers, location-based coupons, promotions or offers in connection with an online or mobile news feed in a social networking environment or across the web and online marketing and mobile advertising network for mobile publishers and advertisers providing communications of data between multiple browsers and cross channel media over heterogeneous database, mobile ad servers and mobile networks, which allows advertisers to communicate with ad servers and users or members between multiple browsers to create more engaging brand experiences through mobile and web mapping technologies for advertisers and brands to search, filter, analyze, sort and target information, updates and impressions on people, places and things.

This can be done based on analysis of users' behavior information, e.g., user's search requests and information needs in relation to the user's or publisher's location and objects, their friends and other criteria for capturing user/consumer, user or member data, tracking contact location and map integration and generating marketing and mapping relationships between members of social networking and connecting them with the target brand or advertiser for a more interactive shopping experience and the distribution and delivery of targeted impressions, mobile ads, mobile ad network, mobile advertising for mobile publishers and advertisers and mobile commerce, mobile location-based advertising and promotions, mobile location-based information, location-based advertising and promotions, mobile location-based promotions, location-based offers, location-based coupons, promotions or offers in connection with an online or mobile news feed and other products.

Such location based promotions or offers of products and services can be based in part, and/or optionally, on analyzing user behavior including internet activity and social networking for generating social/geo/promo link promotional data sets to provide user customized displays of interactive location-based, customized, promotions or offers, such as, but not limited to, one or more of location-based promotions, location-based offers, location-based coupons, promotions or offers in connection with an online or mobile news feed, ("LBP"), location-based discounts or daily deal ads, ("LBDDD"), ("LBA"), location-based deals and offers, ("LBDO") and location-based services, ("LBS"), and other types of promotions or offers, and can optionally include user targeting, audience targeting, mobile brand advertising, data mining & analyzing information, analyzing and filtering such information, user/consumer data and impressions with location context, mapping data, behavior targeting and other data and delivering advertising search impressions to advertisers brands and other third parties for online marketing using mobile or internet promotions or offers.

Such promotions or offers can be provided in combination with 2D and 3D mapping data, e.g., but not limited to: geospatial, web mapping, 2D and 3D mapping, GPS, location mapping, social mapping, digital mapping, 3D holographic mapping, mobile mapping, and the like.

Other information or behavior data that can be used in the invention can include, but is not limited to, one or more of user, member, target market, demographic group or publisher (e.g., product or service provider) data, authentic user identity, user demographics, (e.g., but not limited to, name, age, geographic location, employment, gender, relationship status, country and city, educational history, interests & topics, and the like), profiles, or lifestyle preferences, user's social media communications online or mobile with social media content available in a social networking environment, user's or publisher's location and objects, their friends and other criteria for the purposes of user tracking technologies and generate marketing and mapping relationships between members of a social network or website, their friends, businesses and other points of interest impressions, friends' impressions, buying patterns impressions or behavior impressions, user/consumer interest and purchase decision impressions, shopping ad impressions, promoted trend impressions, social media impressions, capturing, processing, analyzing and filtering relevance, social content marketing, social contextual ads and connections among users or members, their friends, family and others, (e.g. acquaintances, close friends, family, peer groups, classmates, business associates and others, etc.), user-contributed information, mood recording impressions & updating, friend communications and micro blog impressions and focused marketing. Such behavior information and interactions can be used to select targeted location-based and customized promotions or offers for the user, member, target market, or demographic group.

Location-based promotions, location-based offers, location-based coupons, promotions or offers in connection with an online or mobile news feed for products and/or services, operating through credit cards or other payment services, can optionally provide users discounts on their purchases at participating merchants (the merchants also have access to data on when customers purchase their goods and their personal information) and the like, and connecting them with the brand or advertiser based upon location-based information, data, location context, map and specific interests impressions, demographic factors, sharing life experiences, information and real-time data relation to the user's position in geographical space, connecting users as user/consumers, their friends and family with their location and map with advertisers and brands and user's friends and family and other connections and follower data, user's friends' connections with a particular brand, advertiser or business, places and geographic data, media, search, video, mobile, cross-media and e-commerce impressions, click-throughs ad impressions, mobile location-based advertising and promotions' or offers' impressions associated with maps or location, mobile advertising markets, impressions, wi-fi network impressions, feature phone impressions, and the like.

Hologram promotions or offers can include but are not limited to, hologram advertising, hologram mobile advertising, social media hologram ad impressions, interactive hologram communications, hologram video ad impressions, and the like.

Promotions value, revenue or cost analysis or optimization can optionally include, but is not limited to, COST PER MILLE ("CPM"), COST PER DAY ("CPD"), COST PER CLICK ("CPC"), inventory optimization, campaign optimization, yield optimization, friendly campaign manager, mobile conversations, conversion tracking, engagement mapping, custom targeting, revenue or revenue sharing, mobile ad network use, mobile ad server use, smart phone, mobile banner, semantic web, contextual targeting, behavior targeting, audience segmentation.

The present invention provides in one aspect a system and method for providing combined technologies for interactions using tracking, predicting, and implementing online user/consumer behavior information or internet activity across the web or in conjunction with social networking, for promoting or selling products or services, on a 2D or 3D mapping display, to provide Mapping Display of Location Based Customized Promotions or Offers for Products or Services based on User Behavior and Location, and Social Networking ("LBCP-PS-UBL-SN").

Users or members or social shoppers and/or active users or members of the present invention can do one or more of the following: Use the present invention after installing Google Earth™ or similar plug-ins; View Social Earth or computer for location-based advertising, mobile location-based advertising and promotions or offers and marketing impressions across the world wide web on a computer, mobile device or other devices and online or mobile coupons and promotions or offers for online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies with social networking, optional information about microloans or microcredit, humanitarian aid and supporting other worldly causes. The invention can also optionally include unique Live View of the planet; View "live social feeds" and/or "chats" from social networking sites such as Facebook™ and Twitter™ and "live communications" via Skype; Zoom to birds-eye and human scale view and navigate around stunning 3D satellite images of the virtual Earth; Type in an address and fly directly to the location the platform in an instant by using the zoom technology; and/or Watch breaking news and videos from RSS links. The present invention provides a unique interactive user experience; view live links to places and events knowing that a portion of the dollars spent on the present invention are going to help those in impoverished conditions around the world.

The delivery system for a host geospatial website, (accessible via mobile devices or computer) that can provide for a multidimensional representation of information and/or sealable version of web content marketing impressions for an infrastructure and global platform that provides users or members and businesses of all types and sizes with access to broad markets for the delivery system and method for providing the use of LBP, LBDDD, LBA, LBDO & LBS impressions across the world wide web on a computer, mobile device or other devices and combined social behavior tracking, online surveillance and web bot software technologies via mobile devices or computer for tracking online on behavior and data, embedded geo-targeted advertisements, maps or geo-tagged advertisements and/or location-based promotions, location-based offers, location-based coupons, promotions or offers in connection with an online or mobile news feed and affiliate advertising, user's or member's profile or lifestyle preferences and preferred locations, interests, preferences or networking interests or connections or channels, LBP, LBDDD, LBA, LBDO & LBS, position-based services, ad links, location-based promotions, location-based offers, location-based coupons, promotions or offers in connection with an online or mobile news feed, discount ad impressions, merchant ad impressions, email coupon impressions, and the like, in online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies with social networking impressions, social interactions impressions, social communities impressions on a three dimensional images on geospatial platform using geospatial technologies and delivery system for delivering advertising search impressions to advertisers brands and other third parties for online marketing of location-based promotions, location-based offers, location-based coupons, promotions or offers in connection with an online or mobile news feed, location-based advertising, mobile location-based advertising and promotions or offers and marketing impressions and the like, and behavior targeting and filtering of user's or member's profile and/or lifestyle preferences and preferred locations, interests, preferences or networking interests or connections or channels.

The use of geospatial, web mapping, 2D and 3D mapping, GPS, location mapping, social mapping, digital mapping, 3D holographic mapping and/or mobile mapping technologies with for associating information to specific places can included, but it not limited to, one or more of: Live links to places and events; Data on the landscape; Zoom to birds-eye and human scale ad view impressions; 3D custom audio/visual content marketing impressions; Interactive 360 panoramas; Fly-through tours with content marketing impressions, narration, music; Stunning imagery and videos; 3D buildings and landscaping, e-commerce and mobile banking tools and hooks; Advertising on the landscape; Advanced search for private and public information; Social shopping and social networking, social networking interactions between members and generate marketing and mapping relationships between members of a social network or website, social networking websites or third party websites or applications; Self-posting for uploading user generated content marketing impressions; Custom tools, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions and widgets; and the like. Connecting buyers and sellers with User/consumer, E-commerce, Retail, Media & Entertainment, Business, Government, Sports, or Education related and/or Services for Products, Goods, Gambling, Auctions, Shopping, Sports, Autos & Vehicle, Pets & Animals, Online Communication, Education related and/or Services with users or members or social shoppers known as "Social Shoppers" in real-time on a geographical area across one or multiple social layers that are displayed as graphic animated color overlays on a three dimensional images on geospatial platform using geospatial mapping technology." The invention can also provide mobile payment method and/or system for effectuating an online payment through a computer or via a mobile device, wireless device or other similar device or android device or tablet device or mobile internet devices or holographic devices or holographic phone or non-phone connected device, (e.g. tablets, e-readers and MP3 players) to complete an e-commerce, online purchase, mobile payment, mobile banking and mobile wallet transactions on a three-dimensional geospatial platform using geospatial, web mapping, 2D and 3D mapping, GPS, location mapping, social mapping, digital mapping, 3D holographic mapping and/or mapping technologies.

With Social Earth Mobile, Social Shoppers can explore the same 3D imagery and terrain as on the desktop version. Users or members can be able to search, detect, receive and pay for geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the and online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping and mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications. Users or members will be able to search the globe and fly to their current location or anywhere in the world by typing in the address in the search bar. With a touch of a button, users or members can be able to Pan, zoom, and tilt their view as they virtually travel around the globe. Users or members can be able to search for people, cities, places and businesses around the world and View many layers of geographic information and other information a three-dimensional geospatial platform using geospatial, web mapping, 2D and 3D mapping, GPS, location mapping, social mapping, digital mapping, 3D holographic mapping and/or mobile mapping technologies. The invention provides opportunities to connect buyers and sellers and pay per view impressions people at the point of shopping through GPS and GIS technologies—a benefit both to shoppers and merchants.

The present invention thus provides any known alternative geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based coupons, promotions or offers in connection with an online or mobile news feed, location-based advertising, mobile location-based advertising and promotions or offers and marketing impressions and online or mobile coupons and promotions or offers for online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping and mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, as functions or content marketing impressions, access, systems, and the like, as known in the art, or as described herein, which can include, but are not limited to, access to trusted user-generated content using social networks, accessing information from multiple networks, and content sites, accumulating social relation information for social network services, adaptive packaging of network resources, adaptive social network management, advertising products to groups within social networks, aggregation of social network data, aggregation, standardization and extension of social networking contacts to enhance a television user/consumer experience, application of social shopping and social networking, social data, assigning access privileges across the world wide web on a computer, mobile device or other devices, associative memory operators, methods and computer program products for using a social network for predictive marketing analysis, automatically locating web or mobile based social network members, and the like, e.g., those disclosed in one or more of e.g., but not limited to, such social networking functions and/or features as presented in the following US patents and patent applications: US20100082693, US20100017431, US20110276631, US20100268655, US20100293247, US20080040428, US20090106822, US20110282944, US20110137722, US20090327432, US20100057859, 7958193, US20100268830, US20090271247, US20110022602, US20090292814, US20080033776, US20090049525, US20090271244, US20110047229, US20100114788, US20090144075, US20100153175, US20090215469, US20110131095, US20080281710, US20090292549, US20110314017, US20110225518, US20080306822, US20100132049, US20100082695, US20100203963, US20110167071, US20100088364, US20110196922, US20090319288, US20110258429, US20090150380, US20120023085, US20100036936, US20090210480, US20100042511, US20100241468, US20100121849, US20110320250, US20110258556, 7987110, US20090030927, 7801971, US20110023101, US20110153553, US20110179161, US20110265011, US20110022657, US20090187624, US20100229223, US20110173051, US20110055333, US20100287256, US20100005518, US20090265604, US20090249451, US20080255989, US20110060793, US20100058417, US20110145052, US20090327437, US20110107382, US20110106884, US20120028623, US20080320139, US20080104225, US20090157439, US20090182664, US20090300502, US20090171691, US20110106597, US20100318925, US20090222348, US20100319034, US20100217721, 8010460, US20080208971, US20110046980, US20080189188, US20090222322, US20100293170, US20110251970, 8073794, 7970657, US20060042483, US20070288464, US20110197224, US20110258203, US20090164400, US20120030210, US20100174747, US20100228617, US20110246560, US20080294678, US20090125230, US20080243933, US20100318619, US20110238752, US20080109296, US20100185935, US20110213762, US20110078252, US20080140786, US20090282144, US20090259970, US20110271328, US20110167117, US20090171904, US20110209192, US20100185578, US20110196923, US20050216300, US20110082747, 7941535, US20090043844, US20110225514, US20110015981, US20110153740, US20090222448, US20110022669, US20090132652, US20110270923, US20090055263, US20110126121, US20110185285, US20080275849, US20080133445, US20100077045, US20110125846, US20090307057, US20100319031, US20110113096, US20110264737, US20100216553, US20100217757, US20110167115, US20090031301, US20120028718, US20100070335, US20080133658, US20090307073, US20110004660, US20110179125, U.S. Pat. No. 8,010,460, U.S. Pat. No. 8,027,943, U.S. Pat. No. 8,010,458, U.S. Pat. No. 7,827,208, U.S. Pat. No. 7,890,501, U.S. Pat. No. 7,809,805, U.S. Pat. No. 8,099,433, U.S. Pat. No. 7,933,810, U.S. Pat. No. 7,970,657, U.S. Pat. No. 7,669,123, U.S. Pat. No. 7,797,256, U.S. Pat. No. 7,788,260, U.S. Pat. No. 7,725,492, U.S. Pat. No. 8,081,817, U.S. Pat. No. 8,037,093, U.S. Pat. No. 7,945,653, U.S. Pat. No. 7,827,265, U.S. Pat. No. 8,108,377, US20110093498, US20080033739, US20100049852, US20080046976, US20110044354, US20110093346, US20110145321, US20100229223, US20110087658, US20100257023, US20100169327, US20100198581, US20090144392, US20110055314, US20110145287, US20110093506, US20110055683, US20090198487, US20100164957, US20100132049, and US20110093460, which are each entirely incorporated herein by reference.

The present invention also provides alternative affiliated promotion or offer or advertising functions, components, and systems, including, but not limited to: one or more of, (1) advertising content management system and method; (2) advertising method and product; (3) affiliate distribution of geo-target geo-targeted or geo-tagged advertisements and/or location-based promotions, location-based offers, location-based coupons, promotions or offers in connection with an online or mobile news feed and with compensation for affiliate; (4) affiliate system and affiliate device; (5) affiliate system on social networking or social networking websites or third party websites or applications; (6) affiliated advertising widget; (7) apparatus and method for interne advertising compensation; (8) apparatus, method and article to evaluate affiliate performance; (9) arranging delivery of geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based coupons, promotions or offers in connection with an online or mobile news feed, position-based services, location-based advertising, mobile location-based advertising and promotions or offers and marketing impressions and online or mobile coupons and promotions or offers for online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping and mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications based user's or member's profile and/or lifestyle preferences and preferred locations, interests, preferences or networking interests or connections or channels; (10) assured comprehension advertising system; (11) bond issue information management and distribution system; (12) buying and selling spots for geo-targeted or geo-tagged advertisements and/or location-based promotions, location-based offers, location-based coupons, promotions or offers in connection with an online or mobile news feed and advertisers, brands, merchants, vendors, service providers, retailers, affiliates and/or other third parties in mass-market media; (13) centralized affiliated marketplaces systems and methods; (14) computerized networking device with embedded advanced content marketing impressions, maps and web and mobile traffic monetization, monetize mobile usage functionality; (15) context-based transactions using broadcast advertising; (16) customer loyalty cards and advertising; (17) customizing an advertisement; (18) delivery, targeting, and measuring advertising over networks; (19) electronic publication advertising system; (20) email-based advertising system; (21) evaluating content marketing impressions based advertising, position-based services, ad links, location-based promotions, location-based offers, location-based coupons, promotions or offers in connection with an online or mobile news feed, or discount ad impressions, merchant ad impressions, email coupon impressions, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time, real-time geo-target advertising and distribution of location-based promotions, location-based offers, location-based coupons, promotions or offers in connection with an online or mobile news feed, advertisements or mobile coupons, mobile grocery coupons and/or location-based deals and offers and location-based services and location-based geo-targeted or geo-tagged advertisements and/or location-based promotions, location-based offers, location-based coupons, promotions or offers in connection with an online or mobile news feed and location-based services and affiliate advertising; (22) internet business co-op with rotating banners; (23) internet-based and tangible referral system; (24) network interaction correlation; (25) non-authentication access management system for affiliated websites linked with advertisement; (26) offering advertising services; and the like, (a) online platform for web or mobile advertisement partnerships with brands, merchants, vendors, service providers, retailers, affiliates and/or other third parties or affiliate program; (b) providing purchasing incentives, location-based promotions, location-based offers, location-based coupons, promotions or offers in connection with an online or mobile news feed, location-based advertising, mobile location-based advertising and promotions or offers and marketing impressions, in real time, geo-targeted or geo-tagged advertisements and/or location-based promotions, location-based offers, location-based coupons, promotions or offers in connection with an online or mobile news feed and/or location-based deals and offers and location-based services in real-time via a mobile device or tablet device or mobile internet devices or holographic devices or holographic phone or wireless data transfer device, (such as a mobile phone networks or wi-fi networks) or computer, in real time, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, geo-targeted or geo-tagged advertisements and/or location-based promotions, location-based offers, location-based coupons, promotions or offers in connection with an online or mobile news feed; (c) providing targeted geo-targeted or geo-tagged advertisements and/or location-based promotions, location-based offers, location-based coupons, promotions or offers in connection with an online or mobile news feed based on current activity; (d) quality-based online advertisement trading system; (e) revenue or revenue sharing generation and sharing experiences and capturing, processing, analyzing and filtering impressions across a broader range of mobile and wireless devices, user engagement impressions, media, search, video, mobile, cross-media and e-commerce impressions for content marketing impressions sharing experiences and capturing, processing, analyzing and filtering impressions across a broader range of mobile and wireless devices, user engagement impressions, media, search, video, mobile, cross-media and e-commerce impressions services; (f) selecting a website affiliate based on maximum potential revenue or revenue sharing generation; (g) selecting personalized non-competitive electronic advertising for electronic display; (h) self-funded commission management system; (i) delivery method for notifying a user of geo-targeted or geo-tagged location-based geo-targeted or geo-tagged advertisements and/or location-based promotions, location-based offers, location-based coupons, promotions or offers in connection with an online or mobile news feed and location-based services over a network such as the Internet and distribution of location-based promotions, location-based offers, location-based coupons, promotions or offers in connection with an online or mobile news feed, advertisements or mobile coupons, mobile grocery coupons and/or location-based deals and offers and location-based services and location-based promotions, location-based offers, location-based coupons, promotions or offers in connection with an online or mobile news feed for geo-targeted or geo-tagged advertisements and/or location-based promotions, location-based offers, location-based coupons, promotions or offers in connection with an online or mobile news feed via text, alert via a mobile app or alert via electronic communication or ringtone or other form of electronic communication to via a mobile device or wireless data transfer device, (such as a mobile phone networks or wi-fi networks) or other similar device or android device or tablet device or mobile internet devices or holographic devices or holographic phone or non-phone connected device, (e.g. tablets, e-readers and MP3 players) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, or chat information, and, (ii) service system and mobile communication terminal for free using of data communication, e.g., but not limited to those disclosed in the following US patents and patent applications: US20080208682, US20100324965, US20070244756, US20080120156, US20080021783, US20030220837, U.S. Pat. No. 6,763,334, U.S. Pat. No. 7,599,853, US20100069157, US20050065847, U.S. Pat. No. 7,788,130, US20080147499, US20110066479, US20100268582, US20020066688, US20070192369, US20090319372, US20040111319, US20100198670, US20080126515, US20090106098, US20060167820, US20050234775, US20050171838, US20070218876, US20080172329, US20050038702, US20020072965, US20110191176, US20040172331, US20100023392, US20040172332, U.S. Pat. No. 7,930,207, U.S. Pat. No. 7,827,062, U.S. Pat. No. 7,844,488, US20040172324, US20030028433, U.S. Pat. No. 5,948,061, US20070214227, US20020087631, US20110270686, US20090307081, US20090240582, US20040153366, US20080306823, US20090198551, U.S. Pat. No. 5,774,534, US20020042914, US20110246391, US20080059575, each of which patents or patent application is entirely incorporated herein by reference.

Non-Limiting Examples of Alternative Implementations of the Present Invention

A host geospatial website can include realistic virtual landscape using satellite and aerial photography that can include many content marketing impressions layers of web based information, based user's or member's profile preferences and preferred locations, interests, preferences or networking interests or connections or channels, geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based coupons, promotions or offers in connection with an online or mobile news feed, location-based advertising, mobile location-based advertising and promotions or offers and marketing impressions and online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, which are accessible across one or multiple websites or third party applications with two or three dimensional images on geospatial platform using cloud-type configuration and using cloud services in combination with geo-mapping and mobile mapping technologies across the web or in conjunction with social networking, a social networking environment, social networking interactions between members and generate marketing and mapping relationships between members of a social network or website and social networking websites or third party websites or applications, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, in real time, e-commerce and social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, social networking activities, social plugins, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions across the world wide web on a computer, mobile device or other devices, in real time, geo-targeted or geo-tagged advertisements and/or location-based promotions, location-based offers, location-based coupons, promotions or offers in connection with an online or mobile news feed and/or location-based deals and offers and location-based services in real-time via a mobile device or tablet device or mobile internet devices or holographic devices or holographic phone or wireless data transfer device, (such as a mobile phone networks or wi-fi networks) or computer, in real time, social, local, mobile search, mobile services, mobile location-based advertising and pro-motions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social and/or business applications, online dating, entertainment shopping, penny auctions or online auctions and geo-targeted or geo-tagged advertisements and/or location-based promotions, location-based offers, location-based coupons, promotions or offers in connection with an online or mobile news feed and affiliate advertising or services from advertisers, brands, merchants, vendors, service providers, retailers, affiliates and/or other third parties from around the world for a richer user experience.

The present invention further provides the use of various marketing and customer generation methods, including, but not limited to, social media platforms to generate traffic to the websites and access points for the present invention, e.g., but not limited to, a SOCIAL EARTH website, in order to provide a large subscriber base of Social Shoppers; Website—Visitors are prompted to register as a Social Shopper when they first visit website and thereafter use the website as a portal for featured Social Earth geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based coupons, promotions or offers in connection with an online or mobile news feed, location-based advertising, mobile location-based advertising and promotions or offers and marketing impressions and sale of Products, Goods, Gambling, Auctions, Shopping, Sports, Autos & Vehicle, Pets & Animals, Online Communication, Education related and/or Services, which are accessible across one or multiple websites or third party applications with two or three dimensional images on geospatial platform using cloud-type configuration and using cloud services in combination with geo-mapping and mobile mapping technologies across the web or in conjunction with social networking, a social networking environment, social networking interactions between members and generate marketing and mapping relationships between members of a social network or website, social networking websites or third party websites or applications, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services Online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, entertainment services, online penny auctions, or online auctions, geo-targeted or geo-tagged advertisements and/or location-based promotions, location-based offers, location-based coupons, promotions or offers in connection with an online or mobile news feed and affiliate advertising or services from brands, advertisers, publishers, networks, merchants, and/or other third parties from their local area or just about anywhere in the world; Mobile Applications—User/consumers can access Social Earth geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the location-based promotions, location-based offers, location-based coupons, promotions or offers in connection with an online or mobile news feed, location-based advertising, mobile location-based advertising and promotions or offers and marketing impressions and sale of Products, Goods, Gambling, Auctions, Shopping, Sports, Autos & Vehicle, Pets & Animals, Online Communication, Education related and/or Services with two or three dimensional images on geospatial platform using cloud-type configuration and using cloud services in combination with geo-mapping and mobile mapping technologies across the web or in conjunction with social networking, a social networking environment, social networking interactions between members and generate marketing and mapping relationships between members of a social network or website, social networking websites or third party websites or applications, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website and social networking websites or third party websites or applications, User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, via a smartphone, via mobile devices or computer, which is compatible with Google Earth™ or other type of plug-in and similar geospatial, web mapping, 2D and 3D mapping, GPS, location mapping, social mapping, digital mapping, 3D holographic mapping and/or mapping technologies, and smart phones; Google Ad Words™—Google Ad Words™ or similar advertising is provided to maximize search results for Social Earth Coupons; Pay Per Ad—the invention can provide a PPC Ad link on other "high traffic" websites to drive traffic to websites of the invention; In-stream Advertising—In-stream advertising is also provides to use social media platforms such as "live social feeds" or "chats" from Facebook™ and Twitter™ and "live communications" via Skype™ to spread the word about Social Earth Coupons; User Generated Traffic—the invention can provide rewards to Social Shoppers for sharing experiences and capturing, processing, analyzing and filtering impressions across a broader range of mobile and wireless devices, user engagement impressions, media, search, video, mobile, cross-media and e-commerce impressions and spreading the word about User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services that are offered. e.g., if a certain number of people sign up for Social Earth Coupon, then the deal becomes available to all included; Share Coupons with Friends—the present invention provides this way to make it easy for users or members to share "Social Earth Coupons with friends, family, business, or others, acquaintance and others on social networking and similar sites, e.g., but not limited to, Twitter™, Facebook™, Stumble Upon™, Delicious™, Friendfeed™, or Digg™; Refer A Friend—the invention can provide a Referral Widget and encourage Social Shoppers to refer their friends and receive $10.00 worth of loyalty credits; Loyalty Card Program—the invention can provide Loyalty Card Programs that reward Social Shoppers each time they purchase a Social Earth Coupon; Social Network Feeds—the invention provides where Social Shoppers can suggest a business to others in the Social Shopper community, track their friends and share "live social feeds" or "chats" from Facebook™ and Twitter™; a Social Earth Credit Card, Social Earth Debit Card and Social Earth Prepaid Phone Card, which will earn loyalty points for even bigger discounts. The Social Earth Cards will also give back a portion of each sales based upon the user's profile selections.

SOCIAL EARTH For Your Business—the present invention can provides for help for businesses to pay per view impressions new customers with the inventions Live View Earth business platform, where are provided businesses featured in a sponsor ads, such as, but not limited to, Premium Sponsor Ads; Gift Cards—Social Shoppers and businesses can purchase Gift Cards for friends, family and customers; the invention can provide position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions so user/consumers can act and immediately share the information with their friends; Open Source Technologies—the invention provides that Social Shoppers can connect with millions of Social Shoppers in popular social networks such as Facebook™ and Twitter™ using open source technologies; Data mining & Analyzing Information—the invention provides for capturing social data for online, mobile advertisers and social brand recognition impressions, social media shopping that are interested in a target market of a particular segment based upon their precise location or other criteria; Image Sharing experiences and capturing, processing, analyzing and filtering impressions across a broader range of mobile and wireless devices, user engagement impressions, media, search, video, mobile, cross-media and e-commerce impressions Sites—the invention provides for Social Shoppers to upload images on image sharing experiences and capturing, processing, analyzing and filtering impressions across a broader range of mobile and wireless devices, user engagement impressions, media, search, video, mobile, cross-media and e-commerce impressions sites; Search Engine Optimization—Key words can be used in the present invention to optimize visibility to top search engines such as: Google™, Yahoo™, Bing™, Ask™ and AOL Search™. Other search engines such as: Collecta™, Topsy™, 48ers™, Leapfish™, Scoopler™ and Sency™ are powerful tools that can show live streams of micro blog updates from Twitter™, Jaiku™ and Identica™, photos from Flickr™, TwitPic™ and yFrog™ and videos from YouTube™ and Ustream™; YouTube™: the present invention can provide periodic YouTube videos outlining how to use and maximize user purchasing power using the present invention, e.g., SOCIAL EARTH, as well as soliciting and providing video testimonials from Social Shoppers on an ongoing basis, e.g., incentivizing "four star" videos with a special "Best Expert User" badge to be featured on their profile page; Video Viral Marketing can also be used in the present invention; as well as Blogging, and using article servers, (such as ezinearticles.com, goarticles.com, self-growth.com, isnare.com); Twitter™ Marketing, including, e.g., but not limited to, discounts or other special based user's or member's profile and/or lifestyle preferences and preferred locations, interests, preferences or networking interests or connections or channels, via mobile devices or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, using geo-tagging, real-time geo-tagging, geo-coding, geo-targeted, geo-location impressions, mobile geo-tagging, geo-fencing, mobile mapping technologies with LBP, LBDDD, LBA, LBDO & LBS services, GPS and GIS technologies, and the like, in the and online or mobile coupons and promotions or offers for Products, Goods, Gambling, Auctions, Shopping, Sports, Autos & Vehicles, Pets & Animals, Online Communications, Education related and/or Services, which are accessible across one or multiple websites or third party applications with two or three dimensional images on geospatial platform using cloud-type configuration and using cloud services in combination with geo-mapping and mobile mapping technologies across the web or in conjunction with social networking, a social networking environment, social networking interactions between members and generate marketing and mapping relationships between members of a social network or website, social networking websites or third party websites or applications and the like, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services and online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services, entertainment shopping, penny auctions or online auctions, geo-targeted or geo-tagged advertisements and/or location-based promotions, location-based offers, location-based coupons, promotions or offers in connection with an online or mobile news feed and affiliate advertising or services with their friends on Social Earth and Twitter™; Affiliates—the invention can further provide API widgets or geo-targeted or geo-tagged LBP, LBDDD, LBA, LBDO & LBS services and social links that can be downloaded by affiliates. Social Shoppers can get paid X percent, (X %) of sales of Social Earth Coupons on their websites; Independent Coupon Distributors—the invention can provide network(s) of independent coupon distributors that own Valupak™ or other franchises, (and other direct mail coupon companies) to include "Social Earth Coupons" that can be distributed to local businesses.

Referring now to the drawings wherein like reference numerals are used to identify identical components in the various ad view impressions, FIG. 1 shows an example of a diagram for a method or system for Mapping Display of Location Based Customized Promotions or Offers for Products or Services based on User Behavior and Location and Social Networking, ("LBCP-PS-UBL-SN") system 10 in accordance with an exemplary embodiment combined online Product or Service in combination with Geospatial Mapping/Web Mapping/2D Mapping/3D Mapping/GPS/Location Mapping/Social Mapping/Digital Mapping/3D Holographic Mapping/Mobile Mapping technologies with/Company-Local Information/and/or Social Networking/Impressions/Location-Based/Communities distribution system 10 includes a main server system 12 and a client system 14 that is remote from main server system 12, connected together by a distributed computer network, such as the Internet 16, (network, or mobile device access system). A user desiring to obtain one and/or more of online Products, Goods or Services in combination with Geospatial Mapping/Web Mapping/2D Mapping/3D Mapping/GPS/Location Mapping/Social Mapping/Digital Mapping/3D Holographic Mapping/Mobile Mapping technologies with /Company-Local Information/and/or Social Networking/ Impressions/Location-Based/Communities uses client system 14 to interact with main server system 12 to obtain online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services. An electronic coupon can be but is not limited to any advertisement that is electronic, (e.g., electronic advertisement on website, electronic advertisement sent to client's via a mobile device or tablet device or mobile internet devices or holographic devices or holographic phone or wireless data transfer device or other similar device or android device or tablet device or mobile internet devices or holographic devices or holographic phone or non-phone connected device, (e.g. tablets, e-readers and MP3 players) or computer, a hyper link based on a search result from a search engine and/or any other push/pull techniques).

Main server system 12 is configured to be connected to, and/or otherwise receive, location-based advertisements, location-based deals and offers location-based services, in real time, geo-targeted or geo-tagged advertisements and/or location-based promotions, location-based offers, location-based coupons, promotions or offers in connection with an online or mobile news feed and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, social activity, location impressions, Products, Goods, Gambling, Auctions, Shopping, Sports, Autos & Vehicle, Pets & Animals, Online Communication, Education related and/or Services information from the issuer of such coupons, (i.e., the coupons sponsor) and/or as provided by the website or mobile device and/or other electronically provided information, e.g., by PDA, cell phone, portable electronic tablet, etc., including social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, or e-commerce or m-commerce system based user's or member's profile preferences and preferred locations, interests, preferences or networking interests or connections or channels. Although not shown, this function can be performed by a direct electronic connection with a sponsor system, and/or can involve loading data from a physically transportable data storage medium, (e.g., diskette, tape, CD-ROM, USB drive, cloud storage, etc.). The coupon sponsor may, and in most cases will, issue in connection with the coupon an associated set of instructions that define how the coupon is to be distributed. For example, such instructions can include restrictions as to the number of coupons that any one user can print out for redemption, the state and/or zip code associated with a user for such user to have access to the coupon, the expiration date, the item and discount amount, etc. Main server system 12 is further configured to be connected to, and/or otherwise receive, advertising information from an advertising sponsor, or purchasing system, e.g., Amazon, or company purchase website or mobile application, or through mobile banking system. Although not shown, this function can be performed by direct electronic connection with the ad sponsors system, and/or can involve loading data from a physically transportable data storage medium, (i.e., diskette, tape, CD-ROM, cloud storage, etc.). The advertising impressions are displayed on client system 14, as described in greater detail below.

Main server system 12 can include a website server 18, a front-end server 20, a handler 22, a database server 24, and an FTP server 26. Website server 18 is configured to provide "web pages," mobile app, e-commerce or electronic or mobile device, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services to user/consumers, (including possible users or members of electronic coupon distribution system 10) with Internet access. Internet 16, more particularly, the world wide web portion thereof, "WWW," is an interconnected computer network that is generally distributed throughout the world on discrete interconnected computer nodes having software interface generally referred to as "web pages," which further includes geospatial, web mapping, 2D and 3D mapping, GPS, location mapping, social mapping, digital mapping, 3D holographic mapping and/or mobile mapping technologies with based user's or member's profile preferences and preferred locations, interests, preferences or networking interests or connections or channels, location-based advertisements, location-based deals and offers, location-based services, in real time, geo-targeted or geo-tagged advertisements and/or location-based promotions, location-based offers, location-based coupons, promotions or offers in connection with an online or mobile news feed and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, in the and online or mobile coupons and promotions or offers for Products, Goods, Gambling, Auctions, Shopping, Sports, Autos & Vehicle, Pets & Animals, Online Communications, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies across the web or in conjunction with social networking, a social networking environment, social networking interactions between members and generate marketing and mapping relationships between members of a social network or website, social networking websites or third party websites or applications, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, company and local information for selected worldwide locations, and/or any other useful data. Access to Internet 16 can be made by various methods; typically, however, a non-institutional user obtains access from one of a plurality of Internet Service Providers, (ISPs), which in turn obtain authorized access to Internet 16. Navigation the WWW portion of Internet 16 involves knowledge of a directory structure of various nodes of the Internet, (i.e., an "address" to each given resource on Internet 16). Such an address is generally referred to as a Uniform Resource Locator, (URL), which typically starts with a protocol name followed by a domain name, for example: http://www.valuepass.com. Website server 18 is configured to provide, among other things, an interface for affecting a download of client software that a user/consumer can download and execute to establish a client system 14 on his and/or her computer system. In this way the user/consumer can become an authorized user, ("user") of electronic coupon distribution system 10. In particular, website server 18 can refer an Internet user/consumer to FTP server 26 for the client installation file.

Front-end server 20 provides multiple interface and allocation/direction features for electronic coupon distribution system 10. Front-end server 20 is the entity that is initially contacted by client system 14 at the start of each new session of a method or system for Mapping Display of Location Based Customized Promotions or Offers for Products or Services based on User Behavior and Location and Social Networking, ("LBCP-PS-UBL-SN") distribution system 10, and/or when automatic coupon updates occur. Handler 22 is configured to interface with database server 24. After a user establishes a new session, all subsequent requests by client system 14 can be directed to and are "handled" by handler 22. As a result, handler 22 can thereafter issue a request and/or a command to database server 24, and/or directly respond to client system, (if configured to do so). Database server 24 can comprise a plurality of physical, individual general-purpose digital computers configured as database servers, which can be further configured in a cluster arrangement. Database server 24, in one embodiment, can be configured to operate using SQL server software, such as, but not limited to, Microsoft SQL Server Version 7, commercially available from, for example, Microsoft Corporation, Redmond, Wash., U.S.A.

FTP server 26 can be configured to operate in cooperation with geospatial, website server 18 to provide, for example, installation and/or setup programs. The installation program(s) are downloaded to a general-purpose computer, (e.g., PC and/or a MAC) for installation of the client software in accordance with the present disclosure.

Client system 14 includes client application software 28, DeviceID data 30, (ID) data 30, user preference data 32, user history data 34, LBCP-PS-UBL-SN information data 36, and advertising data 38. In addition, client system 14 can comprise a general purpose computing apparatus configured to operate in accordance with an operating system having a graphical user interface such as, for example, Windows 95/98/NT 4.0/2000/Vista/7, and Apple Computer, Inc. MAC OS Operating System for Macintosh platforms. Client system 14 can further include standard peripherals such as a display device 40, a keyboard 42, a pointing device, such as a mouse 44, and an output device, such as a printer 46, for producing a "hard copy" of LBCP-PS-UBL-SN 48. DeviceID data 30 can be stored on main server system 12, according to an exemplary embodiment. In exemplary embodiments, one, a few, a plurality and/or all DeviceID data 30 can be stored on main server system 12.

Client application software 28 comprises software compatible with and executing on client system 14 configured to implement the present disclosure as described herein. Client application software 28 performs various functions including, but not limited to, collecting user information, including preferences, communicating with main server system 12 via Internet 16, and providing an interface for the user or member of a social network for browsing through, and selecting, LBCP-PS-UBL-SN information for printout. DeviceID data 30 can comprise a multi-digit number that is assigned by main server system 12, more particularly, database server 24, when a user registers with LBCP-PS-UBL-SN information distribution system 10. DeviceID data 30 can have a format, such as XXXXXXXX, where X is a digit between 0-9. DeviceID data 30, however, does not specifically identify the user personally, but rather, more accurately associates a physical machine defining client system 14 with user or member profile information obtained during registration. DeviceID data 30 is stored on client system 14, main server system 12, and/or both as a part of a User Info object. If the DeviceID data 30 is stored on client system 14, then DeviceID data 30 is provided to main server system 12 when making requests, for example, for new LBCP-PS-UBL-SN information data. If a client system 14 operates multiple independent operating systems, (e.g., a Mac operating system, (a product of Apple Computer, Inc.) and a Windows operating system, (a product of Microsoft Corp.), then there can be a separate DeviceID data 30 for each operating system assigned to that client system 14. Main server system 12 can correlate the provided DeviceID data 30 with user information stored in a profile database. The user information can then be used in identifying LBCP-PS-UBL-SN information suitable for the user or member of a social network. In this embodiment, however, the user is not personally identified nor is it even possible, (e.g., through the "hacking" of main server system 12) to identify the user personally, as such information is not even collected from the user. Accordingly, the approach described herein maintains privacy of the user of LBCP-PS-UBL-SN information distribution system 10.

The User Info object further includes user information collected from the user of client system 14 indicative of one and/or more demographic characteristics of the user. In this embodiment, the user information is insufficient to specifically identify the user. In a constructed embodiment, such information comprises a postal zip code associated with the user, and a state in which the user resides. Client application software 28 allows the user to update this information after initial registration. In addition, the User Info object includes the mode in which the Internet is accessed, for example, through use of a modem, (e.g., dial-up), through use of a Local Area Network, (LAN), and/or use of a proxy server. The User Info object can further include the version number of the client application software 28. User preference data 32 comprises two main groups. The first group of information contained in user preference data 32 includes information defining how often the main server system 12 is checked for new LBCP-PS-UBL-SN information. In a constructed embodiment, the options include one hour, two hours, four hours, (the default), twice a day, and once a day. The first group of information contained in user preference data 32 can also include a miscellaneous item of information indicating whether the user prefers that certain LBCP-PS-UBL-SN information be automatically printed, (this can be selected and/or deselected by the user). The second main group of information included in user preference data 32 includes a comprehensive listing of main categories of LBCP-PS-UBL-SN information selected by the user that the user wishes to receive. While the particular main LBCP-PS-UBL-SN information category descriptions can be changed on main server system 12 and downloaded to client system 14 at any time, exemplary categories include "Apparel," "Athletics," "Automotive," and "Internet Electronics," among others. A user can deselect a category, in which case LBCP-PS-UBL-SN information pertaining to that category cannot be sent from main server system 12 to client system 14.

User history data 34 comprises data corresponding to events occurring at the remote client system 14, as well as other items pertaining to the operation of client system 14. All these items are stored in a user history file. For example, when a user is browsing through available LBCP-PS-UBL-SN information each LBCP-PS-UBL-SN information that is selected for viewing is noted in the user history file. Likewise, when LBCP-PS-UBL-SN information is selected for printing, that action is also recorded in the user history file. Other examples include when LBCP-PS-UBL-SN information is actually printed, and when an advertising impression, (described in further detail below) is displayed on display device 40. The information contained in the user history data 34 is encrypted by client application software 28 in accordance with a client system encryption strategy to protect the integrity of the data contained therein.

LBCP-PS-UBL-SN information data 36 includes information corresponding to the LBCP-PS-UBL-SN information available, (e.g., for browsing) on client system 14. Each LBCP-PS-UBL-SN information, such as LBCP-PS-UBL-SN information 48, includes a plurality of items of information associated therewith.

In addition, when LBCP-PS-UBL-SN information 48 is actually printed out, additional information can be printed out on the "hard copy" of the LBCP-PS-UBL-SN information. These additional items can include the DeviceID data 30, portions of the demographic data such as the postal zip code, one and/or more items of the user information contained in user preference data 32, the date and time, and optionally various Internet URLs. Coupon sponsors have found some of the information appearing on printed LBCP-PS-UBL-SN information 48 desirable. That is, when the user redeems LBCP-PS-UBL-SN information 48, for example, at a retail store, information appearing on LBCP-PS-UBL-SN information 48, (which is eventually returned by the retailer to the LBCP-PS-UBL-SN information issuer and/or sponsor) is available to the LBCP-PS-UBL-SN information sponsor. This information can thereafter be used in analyzing and assessing the efficacy of various advertising/promotional strategies. LBCP-PS-UBL-SN information data 36 can be stored on a hard drive and/or the like associated with client system 14, and is preferably stored in an encrypted form. In particular, and in accordance with the present disclosure, LBCP-PS-UBL-SN information data 36 corresponding to LBCP-PS-UBL-SN information is encrypted by main server system 12 in accordance with a server system encryption strategy.

The encrypted LBCP-PS-UBL-SN information data is then transmitted to client system 14. Client system 14 further encrypts the once-encrypted LBCP-PS-UBL-SN information data in accordance with a client system encryption strategy to thereby generate doubly encrypted LBCP-PS-UBL-SN information data. The doubly encrypted LBCP-PS-UBL-SN information data 36 can then be stored on the client system 14. The foregoing encryption steps substantially minimize the occurrence of fraud in the distribution of LBCP-PS-UBL-SN information compared to known systems. A user, for example, can therefore not easily defeat the LBCP-PS-UBL-SN information counting scheme that limits the number of printouts by, for example, exploring the client systems hard drive, identifying LBCP-PS-UBL-SN information data, and thereafter producing printed copies of the LBCP-PS-UBL-SN information. Use of the environment established by client application software 28 is therefore practically the only means for the user or member of a social network to obtain usable LBCP-PS-UBL-SN information 48. Advertising data 38 comprises a plurality of advertising impressions wherein each impression can include a predetermined combination of text and images. Advertising data 38 is also stored on client system 14 in an encrypted form. Display device 40, keyboard 42, mouse 44, and printer 46 can comprise an apparatus known to those of ordinary skill in the art.

FIG. 2 shows, in greater detail, database server 24 of main server system 12. As described above, database server 24 can comprise a plurality of physical database servers arranged in a cluster. Further physical machines can be added to provide for load balancing, (i.e., scalability, and the ability to quickly add additional hardware as load and responsiveness criteria require). Database server 24 can include LBCP-PS-UBL-SN information database 50, an advertising database 52, a master category list master category list database 54, a plugin database 56, a brand logo database 58, and a user transaction history database 60.

LBCP-PS-UBL-SN information database 50 includes LBCP-PS-UBL-SN information data similar to that described in connection with LBCP-PS-UBL-SN information data 36, but is more in the nature of a master LBCP-PS-UBL-SN information database including the entire universe and/or a larger set of LBCP-PS-UBL-SN information available on LBCP-PS-UBL-SN information distribution system 10. Advertising database 52 includes a plurality of ad impressions, which can be a combination of text and/or images. Again, advertising database 52 is in the nature of a master advertising database including all of the advertising impressions included in main server system 12.

Master category list database 54 includes the main LBCP-PS-UBL-SN information category names presently established on LBCP-PS-UBL-SN information distribution system 10. In addition, display characteristics, such as the color of a main LBCP-PS-UBL-SN information category button can also be stored in database 54.

Plugin database 56 includes information as to available plugins for use in connection with client application software 28 of client system 14. Plugin database 56 includes a plurality of plugins. The particular plugins that are selected for use in connection with client application software 28 depends on what added functionality has been configured in client system 14. For example, plugins can be configured to provide Zodiac information, recipe information, and stock quote information to the user. Additionally, a plugin can be configured to provide a new LBCP-PS-UBL-SN information style for the user or member of a social network. In this way, client system 14 can be updated remotely with new functionality.

Brand logo database 58 includes information as to how the user interface of client system 14 is "branded." The default "branding" of the user interface involves the display of a company logo of the assignee of the present disclosure. Also, a corresponding Internet URL for "click through" purposes is associated with the brand image. However, in alternate embodiments, other companies can arrange, (e.g., through a referral of potential new users or members of LBCP-PS-UBL-SN information distribution system 10) to have the user interface of client application software 28 "branded" with the referring company's logo, (and Internet URL for "click through").

User transaction history database 60 includes information contained in user history data 34 uploaded from client system 14. User transaction history database 60 therefore contains information corresponding to actions and/or events taken by and/or involving the user of client system 14. User transaction history database 60 therefore includes a record for each LBCP-PS-UBL-SN information that has been downloaded and/or otherwise provided to client system 14. As each LBCP-PS-UBL-SN information is displayed, and/or printed by the user, for example, the corresponding record in user transaction history database 60 is updated.

Referring now to FIG. 3, (with reference to components referenced in FIGS. 1 and 2), a brief description of the operation of LBCP-PS-UBL-SN information distribution system 10, particularly the main interactions between client system 14 and main server system 12, can now be set forth. Each time a new session is commenced, the basic steps set forth in FIG. 3 are performed.

In step 104, client system 14, by way of execution of client application software 28, is initialized. In step 106, client application software 28 determines whether there is an identified user device for client system 14, and/or whether the present user is a "new" user device. Client application software 28 can make this determination based on the existence and/or absence of particular files on client system 14, (e.g., a file containing a DeviceID data 30) indicative of whether and/or not this is a "new" user device. If "NO," then the method branches to step 112. Otherwise, if the answer to step 106 is "YES," then the method branches to step 107.

In step 107, client application software 28 obtains user information from the user. In particular, client application software 28 is configured to collect user information from a user of client system 14 indicative of one and/or more demographic characteristics of the user without obtaining information sufficient to specifically identify the user. In a constructed embodiment, the information obtained comprises a postal zip code associated with the user, and a State where the user resides. Personal information such as the users or members name, e-mail address, residence address, social security number, telephone number, and the like is not obtained in step 107. In accordance with the present disclosure, the foregoing step provides useful information to main server system 12 in the selection of LBCP-PS-UBL-SN information appropriate for the user or member of a social network, (e.g., geographic area). LBCP-PS-UBL-SN information from merchants located geographically proximate the users or members residence can be more easily redeemed by the user, thus increasing the efficacy of the LBCP-PS-UBL-SN information offer. Other information, such as the type of Internet connection, (e.g., modem), can also be obtained from the user in step 107.

In step 108, main server system 12 registers the "new" user device. Main server system 12 determines whether the user of remote client system 14 is a "new" user device based on the presence and/or absence of DeviceID data 30 in a message from client system 14 to main server system 12. The "new" user device is then registered on main server system 12. Main server system 12 is configured to register the new user by performing, among other things, the steps of allocating a new DeviceID data 30, and associating the new DeviceID data 30 with the user information obtained in step 107. Through the foregoing, remote client system 14 can always be identified by its DeviceID data 30.

In step 109, client system 14 and main server system 12 communicate so as to update the master category list, plugins, brand logo information, advertising data and LBCP-PS-UBL-SN information data at the remote client system 14. This is done, for the first time client application software 28 is executed, by searching the main server system 12 for new information that has come into being between the time the installation and/or setup program that the user used to install client system 14 was populated with such data, (the "sync" date), and the present time, (the server date). The identified information is downloaded to thereby update client system 14. This step ensures that the user of client system 14 has the most up-to-date information in these categories. The method then proceeds to step 110 wherein main client application software 28 is executed.

When the answer to step 106 is "NO," then the method branches to step 112. In step 112, client application determines whether client system 14 is "online." Client system 14 is "online" when the user is connected to the Internet such that client system 14 can communicate with main server system 12. Client system 14, in an exemplary embodiment, cannot force a connection to Internet 16. Rather, if there is no "online" connection, the user of client system 14 can have access to LBCP-PS-UBL-SN information in an "offline" mode of operation. Thus, if the answer to step 112 is "NO," then the method branches to step 110. Otherwise, when the answer step 112 is "YES," then the method branches to step 114.

In step 114, main server system 12 identifies the remote client system 14 based on a DeviceID data 30 provided by client system 14. In this way, main server system 12 can utilize the information "on file," such as state and zip code, for a variety of purposes. In a constructed embodiment, the state and zip code data are included in a request by front-end server 20 to database server 24 to select a server that can service this user for this session. The response to the request is a virtual IP address to a particular handler 22, and a selected database "name" of a selected database server 24.

In step 116, main server system 12, particularly the assigned handler 22 and database server 24, is updated with any information contained in user history data 34 that has not yet been uploaded and processed. The user history file contains information indicative of actions taken by, or, events occurring in response to actions taken by, the user of remote client system 14. As described above, user history data 34 contains information such as the identity of LBCP-PS-UBL-SN information selected, LBCP-PS-UBL-SN information printed, advertising impressions and displayed in advertising pane 72, etc. The assigned handler 22 in conjunction with database server 24 uses the user history file in at least two ways: (i) to produce data from which a user script can be built by the remote client system 14 and, (ii) to update the user transaction history database 60, which can then be queried to prepare reports that are provided as feedback to the various advertising sponsors, LBCP-PS-UBL-SN information issuers, and LBCP-PS-UBL-SN information referral agents.

Step 118 involves obtaining a client script for execution by client system 14. Step 118 includes the substep of identifying LBCP-PS-UBL-SN information at main server system 12 suitable for the user or member of a social network. What is suitable for any particular user can be based on DeviceID data 30, the user information associated with DeviceID data 30, and/or the main LBCP-PS-UBL-SN information categories selected by the user, the OS platform, (e.g., MAC OS vs. Windows), the version of client application software 28, the cobrand ID, and the promotional code, if any. Use of these criteria can be either inclusive and/or exclusive. Client system 14 can be sent lists of undownloaded LBCP-PS-UBL-SN information, undownloaded ads, etc. The lists can only identify, for example, the LBCP-PS-UBL-SN information to be downloaded, (not the LBCP-PS-UBL-SN information itself). Steps 120, 122, and 124 involve obtaining the actual LBCP-PS-UBL-SN information data, ad data, etc.

In step 120, the master category list, plugins, and brand logo information is updated, based on execution of the client script by client system 14. Particularly, client system 14 works through the list of needed items.

In step 122, advertising data comprising advertising impressions from advertising database 52 are updated at the remote client system 14. This step ensures that the user has the most up-to-date advertising available. Again, client system 14 works through a list of needed ads, sequentially making requests from database server 24.

In step 124, LBCP-PS-UBL-SN information data from LBCP-PS-UBL-SN information database 50 is updated at remote client system 14. Updating of the LBCP-PS-UBL-SN information data includes retrieving LBCP-PS-UBL-SN information data corresponding to the identified LBCP-PS-UBL-SN information, (i.e., the list provided as part of the client script).

FIG. 4, (also referring to FIGS. 1, 2) shows the steps performed on main server system 12 to register a new user device. The process begins in step 176 with commencement of the registration routine. In step 178, a new DeviceID data 30 is calculated by database server 24. In step 180, a new entry and/or record is created in a user or member profile table. The profile entry can associate DeviceID data 30 with the user information collected from the user. The method then proceeds to step 182.

In step 182, database server 24 determines whether a "sync date" was provided from client system 14. This is a date that describes how "up-to-date" client system 14 is, particularly the LBCP-PS-UBL-SN information and advertising information portions thereof. The "sync date" is automatically provided from client system 14 to database server 24 via the assigned handler 22. If a "sync date" was not provided by client system 14, then the method branches to step 184 where a nominal sync date based on the version of the software installed on the client system is used for downloading and updating purposes. Alternatively, if the answer to step 182 is "YES," then the method branches to step 186.

In step 186, the date provided by client system 14 is used as the "sync date" to synchronize the data on client system 14 relative to the master data on main server system 12. It should be emphasized that the "sync date" is not a date that client application software 28 solicits from the user, but rather, is simply a date available within client application software 28 relating to how "current" the data is, (i.e., LBCP-PS-UBL-SN information/advertising data, etc.). In either case, the method proceeds to and ends at step 188.

Figure 5:
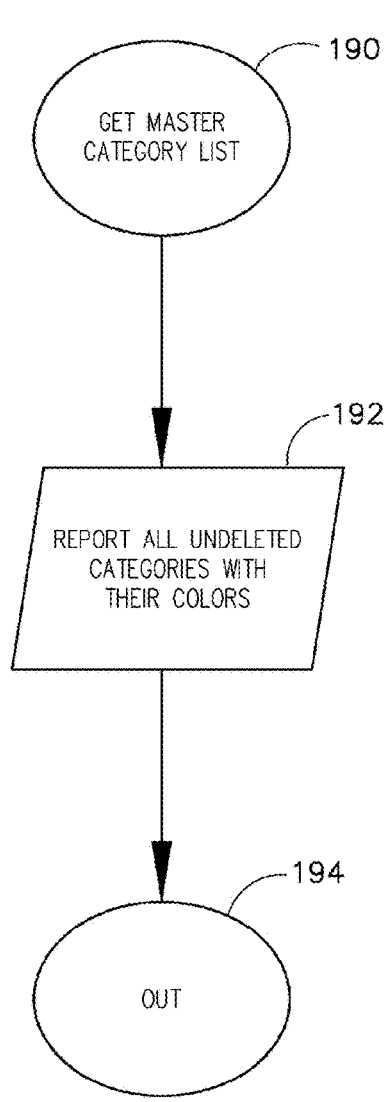
FIG. 5-6 is a simplified flowchart diagram view showing, in greater detail, the steps of updating the master category list, plugins, and brand logo information, respectively, that are shown in block diagram form in FIG. 4, according to an exemplary embodiment.
Figure 6:
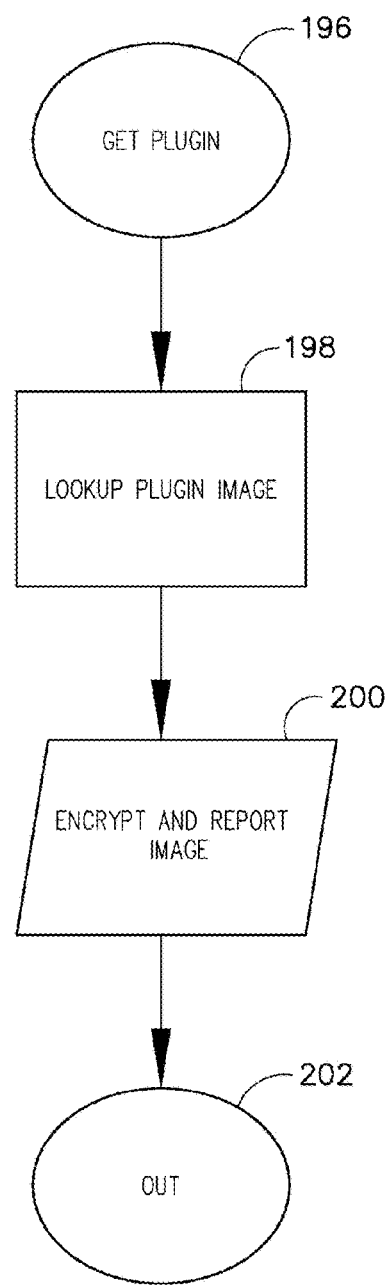

FIG. 5 shows step 120, (FIG. 3) in greater detail. Referring to FIG. 5, step 190 represents a request to obtain a master category list, (i.e., the up-to-date list). This request is made from client system 14, (FIG. 1) to the selected database server 24 via handler 22. Such a request is directed to the selected "virtual" IP address as described above. The master LBCP-PS-UBL-SN information category list, (e.g., "Athletics," "Automotive," "Internet Electronics," etc.) can be updated on main server system 12, particularly database server 24. That is, categories can be added, and/or categories can be deleted. In either case, such a change is reflected in user interface 62 of the respective client systems 14 when the next session is invoked by a user.

In step 192, all undeleted master LBCP-PS-UBL-SN information categories, along with their display color, (as displayed on display device 40 of client system 14) are reported out to client system 14 for use by client application software 28. Step 194 ends the master LBCP-PS-UBL-SN information category list updating process.

Figure 11:
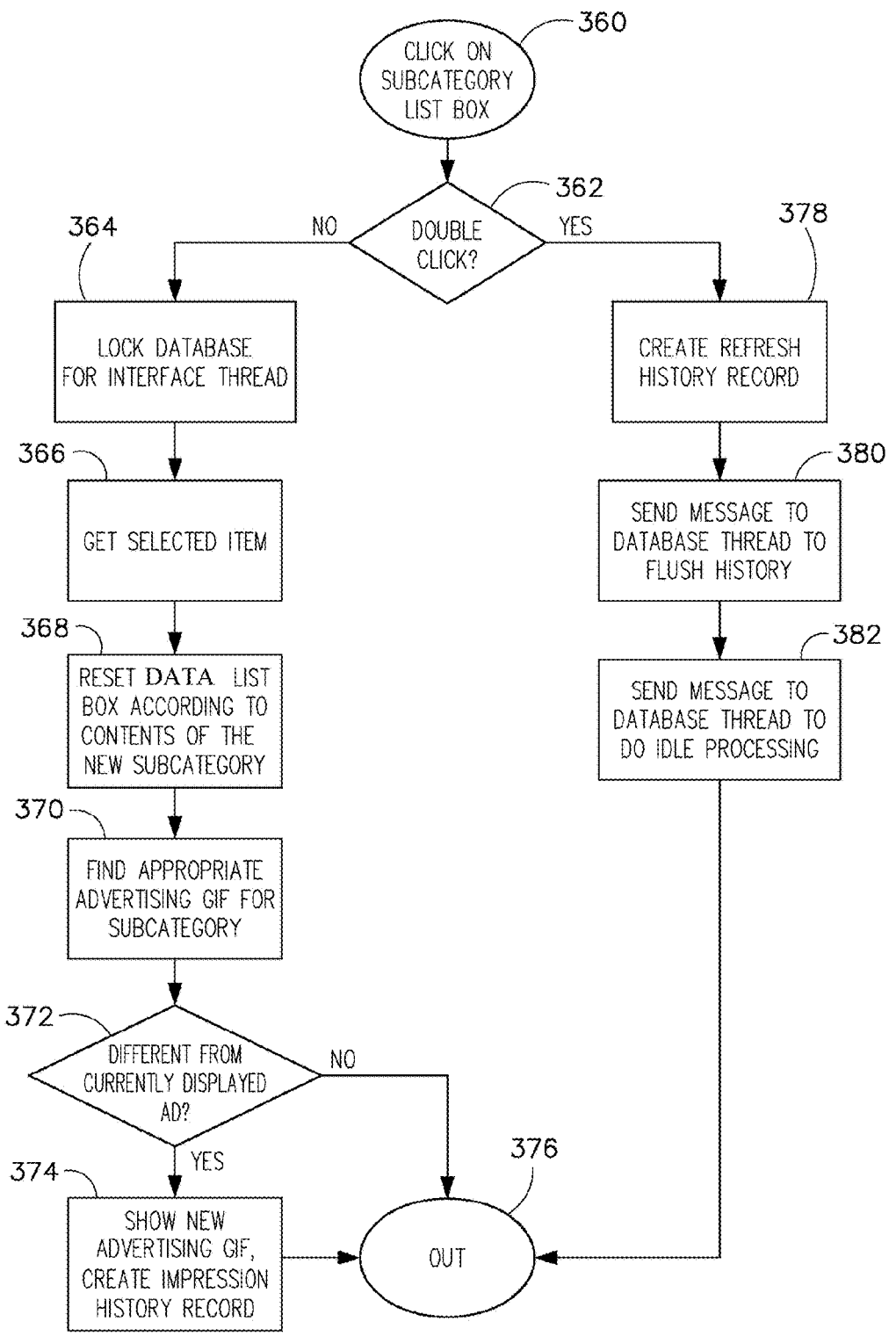
FIG. 11 is a simplified flowchart diagram view showing the steps executed by the client system when a user selects an item from LBCP-PS-UBL-SN information and/or data subcategory list, according to an exemplary embodiment.

Referring now to FIG. 11, step 196 represents a request from client system 14 to database server 24 via handler 22 to obtain a new and/or an up-to-date plugin(s). It should be understood that for an existing user, client system 14 can be executing a client script that includes a list containing needed plugins. The process outlined in FIG. 11 would be executed for each plugin on the list.

In step 198, database server 24 performs a look-up of the needed plugin to locate the corresponding plugin file, (or image).

In step 200, an "image" and/or copy of the file of the sought-after plugin is encrypted in accordance with a server system encryption strategy, and is reported and/or transmitted via Internet 16 to client system 14. In step 202, the plugin update process is completed.

Figure 7:
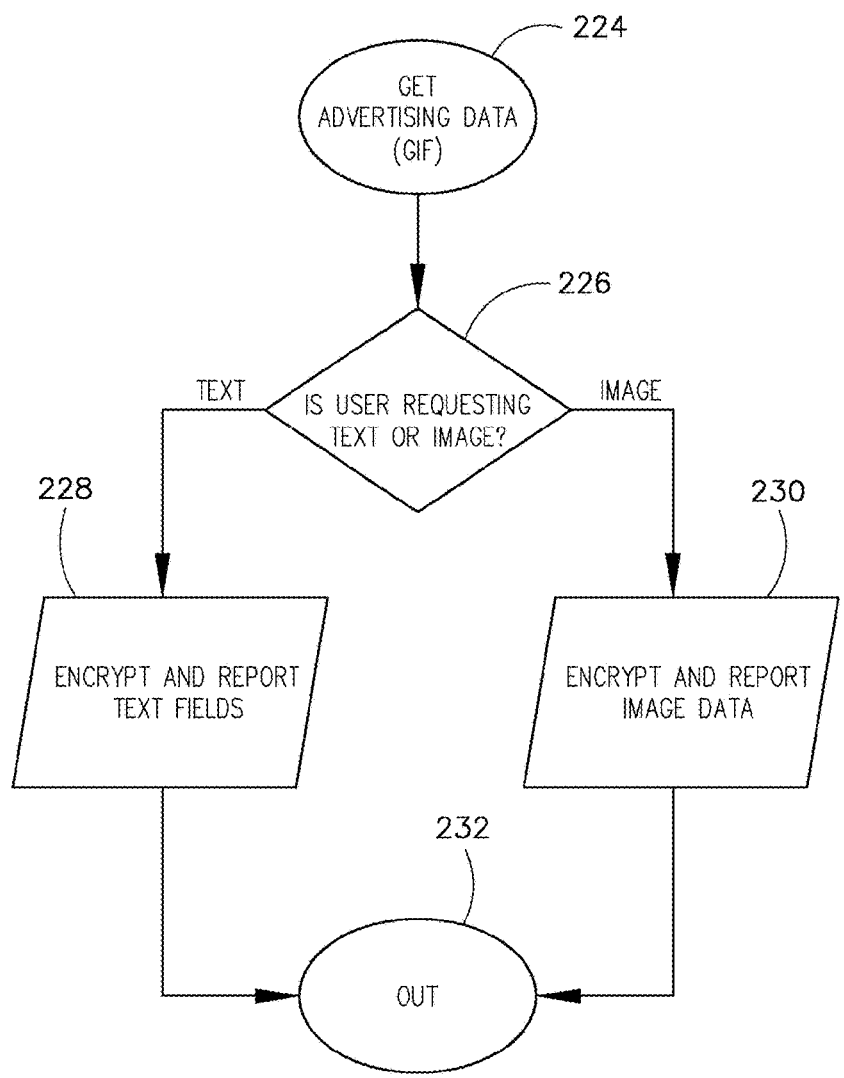
FIG. 7 is a simplified flowchart diagram view showing, in greater detail, the step of updating advertising data that is shown in block diagram form in FIG. 4, according to an exemplary embodiment.

FIG. 7 shows step 122, ("updating advertising data") of FIG. 3 in greater detail. In particular, steps 224-232 illustrate, in accordance with the present disclosure, that advertising text, and images are encrypted to thereby provide secure transmission to client system 14. It should be understood that for an existing user device, client system 14 can be executing a client script that includes a list containing needed advertising impressions. The process outlined in FIG. 12 would be executed for each advertising impression the list. Step 224 marks the beginning of the advertising update method.

In step 226, main server system 12 determines whether the user, more particularly client system 14, is requesting "text" and/or "image" advertising data. If the answer is "text," then the method proceeds to step 228.

In step 228, main server system 12, particularly database server 24, encrypts the text of the advertising data, and reports out the resulting encrypted advertising data. It should be understood this encryption occurs in accordance with a server system encryption strategy.

Otherwise, the method proceeds to step 230 when the advertising data requested is "image" data. In step 230, the advertising data, ("image" data) is encrypted by main server system 12 according to a main server system encryption strategy, resulting in encrypted advertising image data. The encrypted ad image data is then reported out to client system 14. Step 232 defines the end of the advertising update process.

Figure 8:
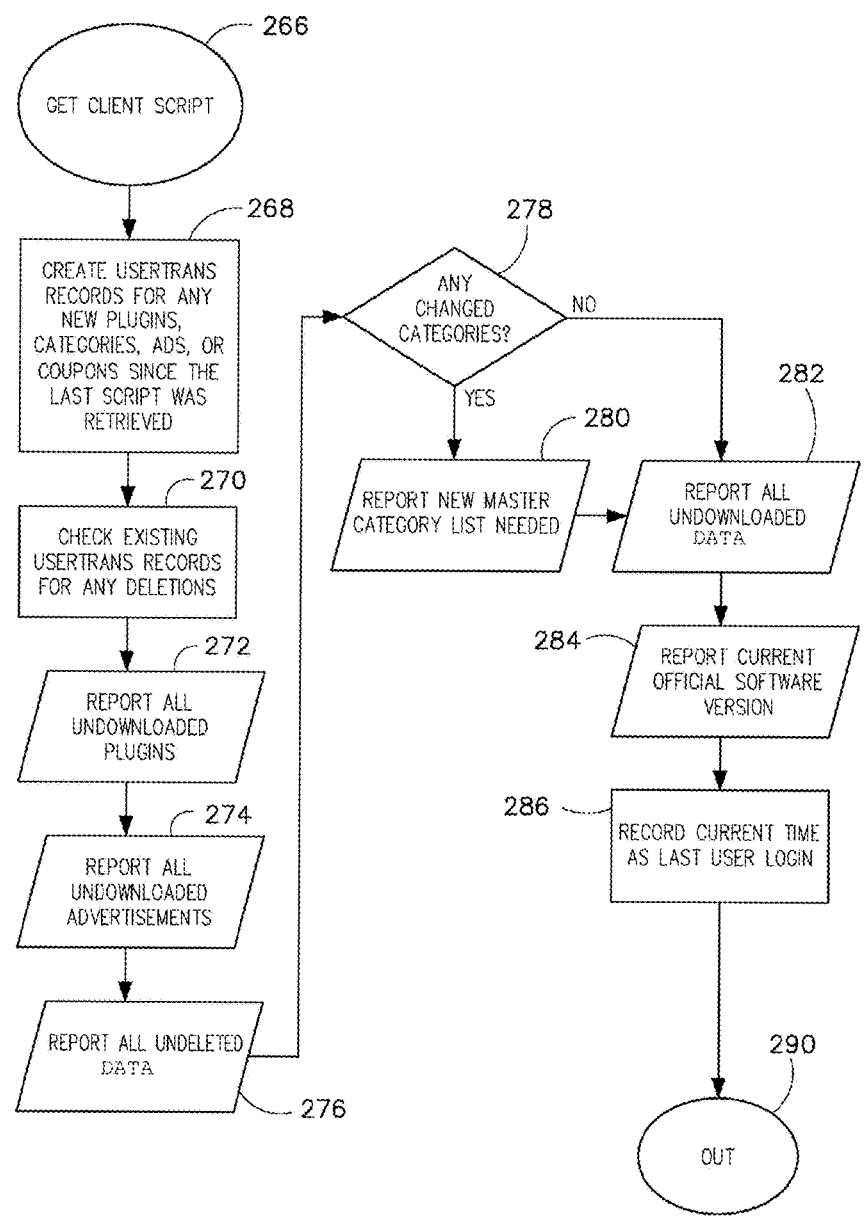
FIG. 8 is a simplified flowchart diagram view showing the steps involved in obtaining a client script, according to an exemplary embodiment.

Referring now to FIG. 8, after the user history codes from user history data 34 have been extracted and decoded, a "client script" is built by client system 14 based on information, (e.g., lists) from handler 22 in cooperation with database server 24. The client script provides instructions for main server system 12 to execute. In step 266, client system 14 issues a request to handler 22 to obtain the "user" and/or "client" script. The client script is then returned to client system 14. Step 268 show the execution of the client script by client system 14, which issues the commands shown in the steps 268-290. In step 268, client system 14 issues commands via handler 22 to database server 24 to create user transaction records for any new plugins, main LBCP-PS-UBL-SN information categories, advertising data, and/or LBCP-PS-UBL-SN information data received by client system 14 since the last client script was retrieved. In step 270, client system 14 issues commands via handler 22 to database server 24 to check existing user transaction records for any deletions. Any deletions are processed whereby the affected user transaction record is modified to indicate that the client LBCP-PS-UBL-SN information has been deleted. In step 272, client system 14, in execution of the client script, issues a command via handler 22 to database server 24 to report all undownloaded plugins. Database server 24, through handler 22, returns a message containing a listing of all undownloaded plugins. This list is processed by client system 14 after the client script has been completed. In step 274, client system 14, in execution of the client script, issues a command via handler 22 to database server 24 to report all undownloaded advertising impressions. Database server 24 returns a list of all undownloaded ad impressions. In step 276, client system 14, in execution of the client script, issues a command via handler 22 to database server 24 to report all undeleted LBCP-PS-UBL-SN information. In step 278, client system 14, in execution of the client script, issues a command via handler 22 to database server 24 to determine whether any of the main LBCP-PS-UBL-SN information categories have been changed. If the answer to this inquiry is "YES," then flow of the process continues at step 280, wherein the database server 24 reports to client system 14 that a new master category list is needed. Flow then proceeds to step 282.

If the answer to the inquiry in step 278 is "NO," then flow of the process proceeds to step 282. In step 282, client system 14, in execution of the client script, issues a command via handler 22 to database server 24 to report all undownloaded LBCP-PS-UBL-SN information. Database server 24 returns a listing of all undownloaded LBCP-PS-UBL-SN information. In step 284, client system 14, in execution of the client script, issues a command via handler 22 to database server 24 to report the current official software version. Database server 24 returns the latest version number. In step 286, database server 24 is requested to record the current time as the last user login. Flow of the process then continues to step 290, which marks the end of the client script execution.

In FIG. 9, steps 346-350 illustrate the response of client application software 28 when a user "ad click impressions" and/or otherwise selects logo pane 74 of user interface 62. Step 346 marks the beginning of the routine. Step 346 is entered when client application software 28, (via the OS) detects that the user has "clicked" on and/or otherwise selected a portion of logo pane 74.

In step 348, client application software 28 invokes an Internet browser registered with the operating system of client system 14 as the default browser and passes thereto a URL. The Internet browser then connects to a website server resource corresponding to the specified URL. This "click" action, therefore, takes the user to the website of the company displayed in logo pane 74. Step 350 marks the end of this routine.

FIG. 10 shows the response of client application software 28 when a user "ad click impressions" on and/or otherwise selects a portion of advertising pane 72. Step 352 marks the beginning of the routine. In step 354, client application software 28 creates a click-through history record indicative of the fact that the user has "clicked" and/or otherwise selected the advertiser displayed in advertising pane 72. This is included in user history data 34, which can thereafter be encrypted and transmitted to main server system 12 for processing.

In step 356, the client application software 28 launches an Internet browser registered with the operating system of client system 14, and passes thereto a URL corresponding to the advertiser displayed in advertising pane 72. When the Internet browser executes, it connects to a website server resource defined by the URL. In-effect, the foregoing actions take the user to the advertisers website specified in the URL. Step 358 marks the end of this routine.

FIG. 11 illustrates a response taken by client application software 28 when a user "ad click impressions" on and/or otherwise selects an item appearing in LBCP-PS-UBL-SN information subcategory list 68. Step 360 marks the beginning of the process. Step 360 is entered when client application software 28, (via the OS) determines that an item in LBCP-PS-UBL-SN information subcategory list 68 has been "clicked" on. In step 362, client application software 28 determines whether the selection was a "click" and/or a "double-click." Depending on which of these events occurred, client application software 28 can take alternative courses of action. If the action is a single-click, then the method branches to step 364.

In step 364, the local LBCP-PS-UBL-SN information database is locked by client application software 28. The process proceeds to step 366. In step 366, the selected subcategory item is retrieved from the local database on client system 14.

In step 368, the content of LBCP-PS-UBL-SN information list 70 is reset by client application software 28 according to the content of the new subcategory. For example, if the new subcategory pertains to LBCP-PS-UBL-SN information, then the new LBCP-PS-UBL-SN information associated with the new selected subcategory is displayed in LBCP-PS-UBL-SN information list 70. In step 370, client application software 28 determines and/or otherwise selects an advertising impression to be displayed in advertising pane 72 in accordance with a predetermined advertising impression selection strategy. In the illustrated embodiment, the selection criteria include the identity of the selected LBCP-PS-UBL-SN information subcategory. In step 372, a test is performed by client application software 28 to determine whether the newly selected advertising impression is different from the advertising impression currently being displayed. If the answer is "YES," then the process branches to step 374, where the new advertising impression is displayed in advertising pane 72, and an advertising impression history record is created for inclusion in the user history data 34. The method proceeds to step 376.

If the answer to step 372 is "NO," however, then the process branches to step 376, which is an exit step. If the action evaluated in step 362 is determined to be a "double click," then the process branches to step 378. "Double clicking" LBCP-PS-UBL-SN information subcategory is a user request to refresh the content of that subcategory. In step 378, client application software 28 creates a refresh history event for that subcategory. In step 380, client application software 28 sends to the database thread a request to flush the current history. The content of that subcategory are then downloaded, (available on display device 40) as if they were new. In step 382, a message is sent to the database thread to do idle processing.

Figure 12A:
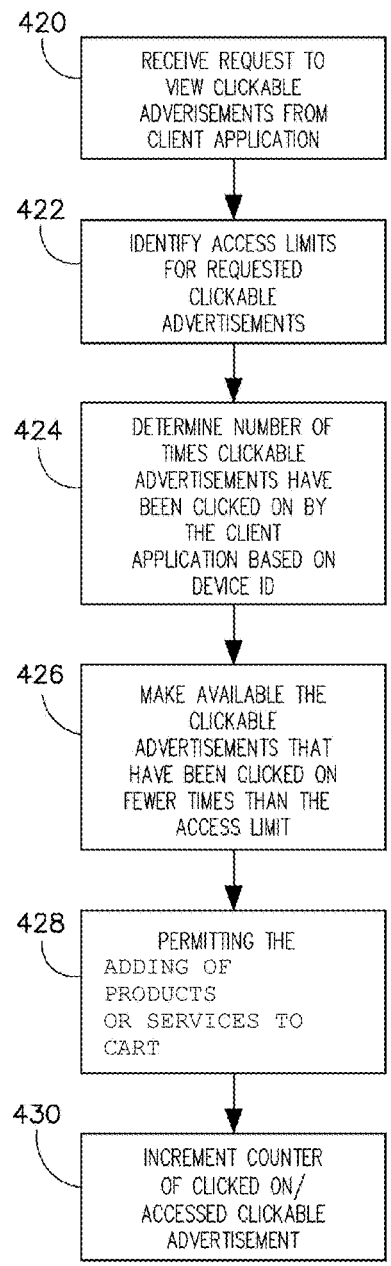
FIGS. 12A/B are flow diagrams of processes for controlling the number of clicks to a clickable advertisement or online coupon, according to exemplary embodiments.
Figure 12B:
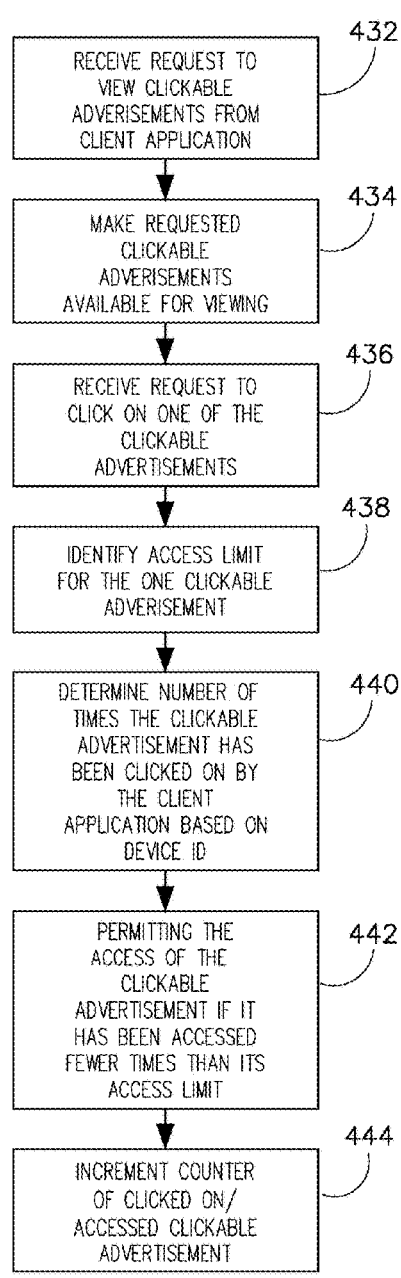

FIGS. 12A and 12B are flow diagrams of processes for controlling the number of ad click impressions to a clickable advertisement. As shown in FIG. 12A, in step 420, a request is received from client application software 28 of a particular client system 14 to view clickable geo-targeted or geo-tagged advertisements and/or location-based promotions, location-based offers, location-based coupons, promotions or offers in connection with an online or mobile news feed. The request preferably includes DeviceID data 30, which is a unique identifier assigned to the client system 14 that uniquely identifies client system 14 making the request. The request can be made in response to linking and/or accessing a particular website and/or by submitting the request through user interface 62.

In step 422, an access limit is identified for each of the clickable geo-targeted or geo-tagged advertisements and/or location-based promotions, location-based offers, location-based coupons, promotions or offers in connection with an online or mobile news feed that are responsive to the received request. Based on the received request, main server system 12 can identify an appropriate handler 22 and database server 24 for servicing the request. Handler 22 accesses database server 24, which can includes a list of available clickable geo-targeted or geo-tagged advertisements and/or location-based promotions, location-based offers, location-based coupons, promotions or offers in connection with an online or mobile news feed to identify the clickable geo-targeted or geo-tagged advertisements and/or location-based promotions, location-based offers, location-based coupons, promotions or offers in connection with an online or mobile news feed, (including LBCP-PS-UBL-SN information) responsive to the request and to identify the access limits associated with those clickable geo-targeted or geo-tagged advertisements and/or location-based promotions, location-based offers, location-based coupons, promotions or offers in connection with an online or mobile news feed.

In step 424, for each of the clickable geo-targeted or geo-tagged advertisements and/or location-based promotions, location-based offers, location-based coupons, promotions or offers in connection with an online or mobile news feed responsive to the request, it is determined how many times each clickable advertisement has been clicked on by client application software 28 and/or client system 14 based on the associated DeviceID data 30. This information can be determined by checking the values of the counters held in database server 24 for each clickable advertisement corresponding to DeviceID data 30 provided in the request.

In step 426, clickable geo-targeted or geo-tagged advertisements and/or location-based promotions, location-based offers, location-based coupons, promotions or offers in connection with an online or mobile news feed are made available to the requesting client system 14 that have been accessed, (i.e., clicked on) by client system 14 fewer times than the access limit. To determine if a clickable advertisement should be made available, main server system 12 compares the identified access limit to the determined number of accesses set in the corresponding counter. If the access limit is greater than the determined number of accesses set in the corresponding counter, then the clickable advertisement is made available to the requesting client system 14. On the other hand if the access limit is equal to, (or less than) the determined number of accesses set in the corresponding counter, then the clickable advertisement is not made available to the requesting client system 14. The clickable geo-targeted or geo-tagged advertisements and/or location-based promotions, location-based offers, location-based coupons, promotions or offers in connection with an online or mobile news feed made available to the client system 14 can be viewed, for example, in advertising pane 72 and/or logo pane 74. Each of the clickable geo-targeted or geo-tagged advertisements and/or location-based promotions, location-based offers, location-based coupons, promotions or offers in connection with an online or mobile news feed made available to client system 14 can be accessed, i.e., clicked on, by the user at client system 14.

In step 428, in addition to making the clickable advertisement available to be clicked on by the user at client system 14, if the clickable advertisement is LBCP-PS-UBL-SN information, then the user is permitted to print LBCP-PS-UBL-SN information as well. To print LBCP-PS-UBL-SN information, the user can select the "Print Now" button 80, which prints the LBCP-PS-UBL-SN information currently being viewed on printer 46. In step 430, in response to the click of the clickable advertisement, the counter associated with that clickable advertisement and corresponding to DeviceID data 30 of client application software 28 and/or client system 14 is incremented. More specifically, client application software 28 can generate a signal to main server system 12 indicating that the clickable advertisement has been clicked on, and based on that signal the server increments the applicable counter in database server 24. The signal can include information identifying the clickable advertisement, as well as DeviceID data 30 of client system 14. Accordingly, each time a clickable advertisement is clicked on, the counter associated with the clickable advertisement is incremented, and once the count in the counter reaches the access limit, the user at that client system 14 is no longer permitted to click on that clickable advertisement. It should be noted that client system 14 can be a client computer.

The method for controlling access to advertisement in a network can include assigning a unique identifier to a client computer and receiving a request from client application software 28 operating on the client computer to access the advertisement. The request can include the identifier assigned to the client computer. The method can further include transmitting an advertisement access report to a remote server. The method can further include the identifier being assigned to the client computer by the client application. The method can also include that the identifier being assigned to the client computer is not one of a DeviceID data 30 and/or an Internet protocol address. The method can also include encrypting the advertisement at a server to generate a first encrypted advertisement and further encrypting the first encrypted advertisement at the client computer to generate a second encrypted advertisement.

FIG. 12B illustrates a process similar to the one in FIG. 12A. Like the process of FIG. 12A, in step 432 of FIG. 12B, a request is received from the client application software 28 to view clickable geo-targeted or geo-tagged advertisements and/or location-based promotions, location-based offers, location-based coupons, promotions or offers in connection with an online or mobile news feed at the request including DeviceID data 30 that uniquely identifies client system 14 making the request. However, instead of checking the access limit of responsive clickable geo-targeted or geo-tagged advertisements and/or location-based promotions, location-based offers, location-based coupons, promotions or offers in connection with an online or mobile news feed, all clickable geo-targeted or geo-tagged advertisements and/or location-based promotions, location-based offers, location-based coupons, promotions or offers in connection with an online or mobile news feed that are responsive to the request are made available to the requesting client system 14 in step 434. To determine which clickable geo-targeted or geo-tagged advertisements and/or location-based promotions, location-based offers, location-based coupons, promotions or offers in connection with an online or mobile news feed are responsive, main server system 12 can identify an appropriate handler 22 and database server 24 for servicing the request. Handler 22 can access database server 24 to identify the clickable geo-targeted or geo-tagged advertisements and/or location-based promotions, location-based offers, location-based coupons, promotions or offers in connection with an online or mobile news feed responsive to the request. The user at client system 14 can try to click on any of the clickable advertisement made available to client system 14.

In step 436, in response to clicking on a selected clickable advertisement, a request is received by main server system 12 for access to that clickable advertisement. The request can include information identifying the selected clickable advertisement, as well as DeviceID data 30 of the requesting client system 14. In step 438, in response to the received request, an access limit is identified for the selected clickable advertisement. More particularly, main server system 12 can identify an appropriate handler 22 to access database server 24 and identify the access limits associated with the selected clickable advertisement. In step 440, it is determined how many times the selected clickable advertisement has been clicked on by client application software 28 and/or client system 14 based on the associated DeviceID data 30. This information can be determined by checking the values of the counter held in database server 24 for the selected clickable advertisement corresponding to DeviceID data 30 provided in the request.

In step 442, the user is permitted to click on and access the selected clickable advertisement if it is determined that the clickable advertisement has been accessed by client system 14 fewer times than the access limit. To determine if a clickable advertisement should be made available, main server system 12 compares the identified access limit to the determined number of accesses, (i.e., ad click) set in the corresponding counter. If the access limit is greater than the determined number of accesses set in the corresponding counter, then the user is permitted to click on and access the clickable advertisement at the requesting client system 14. On the other hand if the access limit is equal to, (or less than) the determined number of accesses set in the corresponding counter, then the user is not permitted to click on and access the clickable advertisement at client system 14. If permitted to click on and access the clickable advertisement, and the clickable advertisement is LBCP-PS-UBL-SN information, then the user can print or add to a cart the LBCP-PS-UBL-SN information, for example, by selecting the "Print Now" button 80, which prints the LBCP-PS-UBL-SN information currently being viewed on printer 46.

In step 444, in response to the click of a clickable advertisement, the counter associated with that clickable advertisement and corresponding to DeviceID data 30 of client application software 28 and/or client system 14 is incremented. More specifically, client application software 28 can generate a signal to main server system 12 indicating that the accessed clickable advertisement has been clicked on, and based on that signal main server system 12 increments the applicable counter in database server 24. The signal can include information identifying the clickable advertisement, as well as DeviceID data 30 of client system 14.

Figure 13:
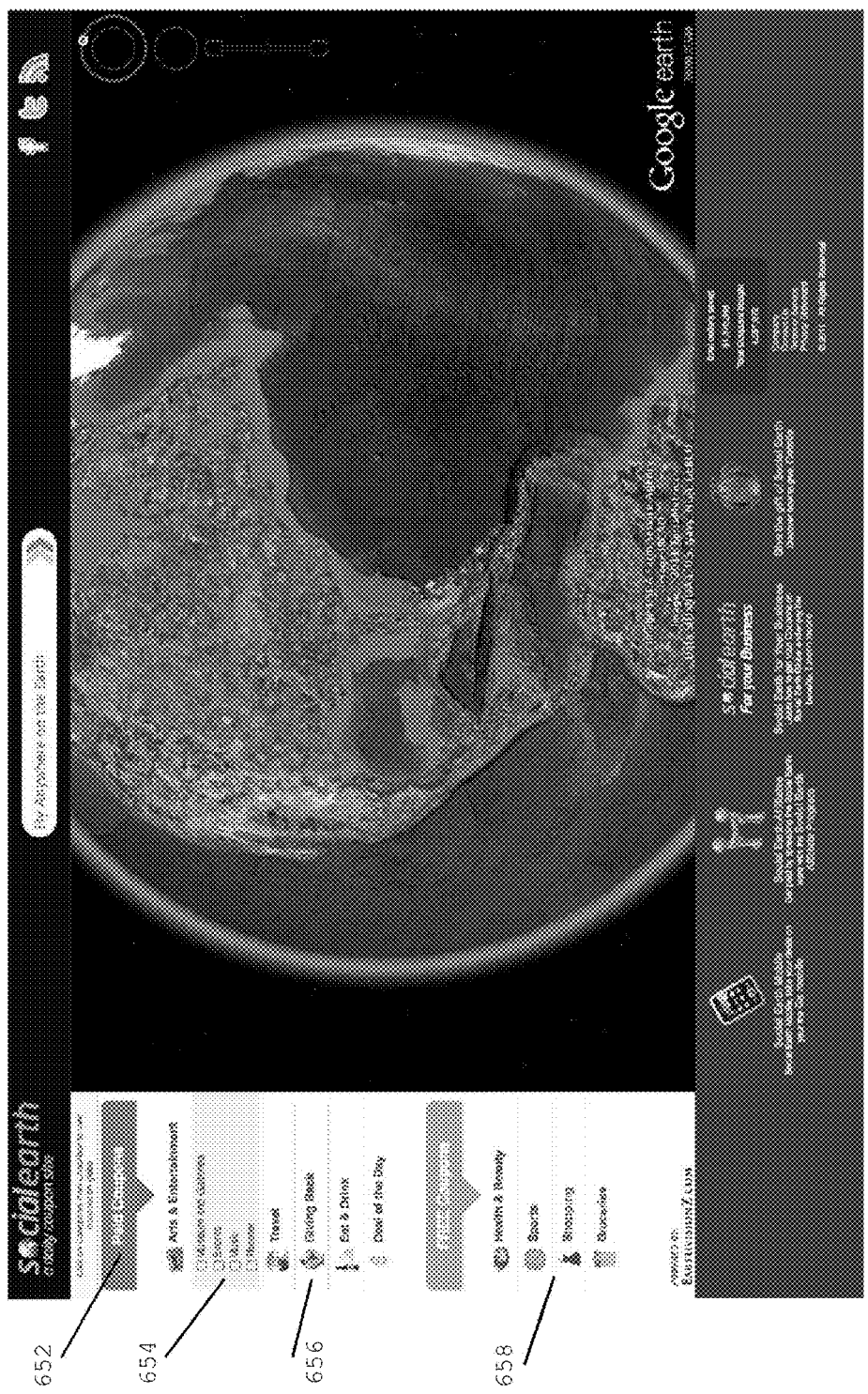
FIG. 13 illustrates a screen display defining an interface associated with a client system portion, according to an exemplary embodiment.

Referring to FIG. 13, illustrations of a screen display defining an interface associated with a client system portion are shown, according to exemplary embodiments, e.g., as Social Earth. FIG. 13 provides the added feature of being able to utilize a pull down menus 652, 654, 656, and 658 to retrieve LBCP-PS-UBL-SN information data. It is to be understood that the above description is merely exemplary rather than limiting in nature, the disclosure being limited only by the appended claims. Various modifications and changes can be made thereto by one of ordinary skill in the art, which embody the principles of the disclosure and fall within the spirit and scope thereof. For example, one and/or more steps described herein as being performed by client system 14 and/or main server system 12 can be performed by the other of client system 14 and/or main server system 12, and/or by both.

For example, a thin client can be operable on client system 14 to interface with main server system 12. A thin client is a client computer and/or client software in client-server architecture networks, which depends primarily on the central server for processing activities, and mainly focuses on conveying input and output between the user and the remote server. In contrast, a thick and/or fat client does as much processing as possible and passes only data for communications and storage to the server. Many thin client devices run only web browsers and/or remote desktop software, meaning that all significant processing occurs on the server.

A Geographic Information System, (GIS), (Also Called Geographic Mapping and "GM") is a computer technology that provides an analytical framework for managing and integrating data, solving problems, and/or understanding past, present, and/or future situations. A GIS can link information and/or attributes to location data, (hereinafter referred to as a "feature"), for example, people to addresses, buildings to parcels, and/or streets within a network. GIS and/or GM can further layer such information to present a better and/or clearer understanding of how many different variables interrelate and/or work together. Layers can be in the form of colored and/or textured overlays, graphics, icons, graphs, and/or other visual indicators of data in context with a geographic location associated with the data. GIS and geospatial technologies are used in the present invention in all fields such as, but not limited to, business and marketing, emergency management, environmental planning, geo-intelligence and security, risk assessment, urban planning and utilities management, as well as industries such as telecommunications, utilities, transportation, education related and/or services and scientific research constitute some of the largest user/consumers of this technology, and through its application in numerous daily tasks, as well as logistics companies using it to plan optimal delivery routes, insurance industry to assess risk and vulnerability with geospatial data, the retail sector to understand its customer base to provide more efficient services, while in the communications realm, location-specific applications such as Foursquare™, Microsoft™ GeoLife™ and Google Buzz™ on cell phones or social media websites help diffuse this technology to the general public. The invention also includes future growth in the geospatial technologies industry including building capacity and developing broad citizen access to the technology, constructing innovative value-added applications to help businesses make informed decisions, capturing and sharing reliable geospatial data, and training a capable work force, as well as the Internet and advances in information and communications technologies also can be included in its expansion. The invention also can include the purchase and use of place-based GIS-generated products without necessarily being familiar with the technology itself, such the use of GPS or Internet-based maps to locate a particular business outlet, while user access and awareness can stimulate a greater demand for new applications of this technology, which can fuel innovation, and a domino effect can help the industry expand into new markets. User access to geospatial technologies and data are slowly revolutionizing how we view the world. GIS has restored the importance of understanding people-place, interactions in an array of activities and decision-making processes. With such value and possibility, leaders and users or members of this technology should promote its application as broadly as possible.

A GIS and/or GM is most often associated with maps formed within a framework of a common coordinate system, such as the World Geodetic System 1984, (WGS84). Reference locations within the framework can be specified by and/or translated to and/or from locations defined within a common coordinate system, so as to allow integration of disparate data and functionality with a geospatial browser. A map, however, is only one way a user can work with geographic data in a GIS and/or GM and is only one type of output generated by a GIS and/or GM. Furthermore, a GIS and/or GM can provide many more problem-solving capabilities than using a simple mapping program and/or adding data to an online mapping tool, (e.g., in a "mash-up").

Generally, a GIS and/or GM can be viewed in at least three ways, (1) as a database; (2) as a map; and/or, (3) as a model. As a database, a GIS provides a unique kind of database relating to the Earth and/or other mapped region, such as a geographic database and/or geo-database. Fundamentally, a GM is based on a structured database that describes the mapped region in geographic terms. GM maps can be either two and/or three-dimensional images in presentation. GM maps are generally constructed of "tiles" that are unit areas of a geographic region. Tiles can be identified in the database by coordinate boundaries and/or individual reference identifications allocated to each tile. The number of tiles covering a particular geographic region can vary depending upon the resolution of the map requested; a high-resolution map, (e.g., 1 m) of a geographic area can have substantially more tiles than a lower resolution map of the same area. Maps combining the underlying geographic information with overlays of associated data can be constructed and used as "windows into the database" to support queries, analysis, and editing of the information in a process called "geo-visualization." As a model, a GM is a set of information transformation and/or "geo-processing" tools that derive new geographic data from existing data. This geo-processing functionality can take information from existing data, apply analytic functions, and write results into new derived data that show features and feature relationships with the mapped region and present the results to a user.

A GM allows mapping of locations and things and identification of places with requested features. GIS mapping can provide information about individual feature and/or present a distribution of features on a map to identify patterns. GM and/or GIS mapping can be based upon and/or filtered by quantities, for example, locations of most and least of a feature. GM and/or GIS mapping can also find and establish relationships between places, features, conditions, and/or events and determine where certain criteria are met and/or not met. GM and/or GIS mapping can also present densities to view concentrations. A density map allows measurement of a number of features using a uniform area unit, such as acres and/or square miles, to clearly present the distribution. This functionality provides an additional level of information beyond simply mapping the locations of features.

GM and/or GIS can be used to map changes to anticipate future needs. GM and/or GIS mapping can also be used to map conditions before and after an action and/or event to see the impact. For example, a retail analyst might map the change in store sales before and after a regional ad campaign to see where the ads were most effective.

Figure 14:
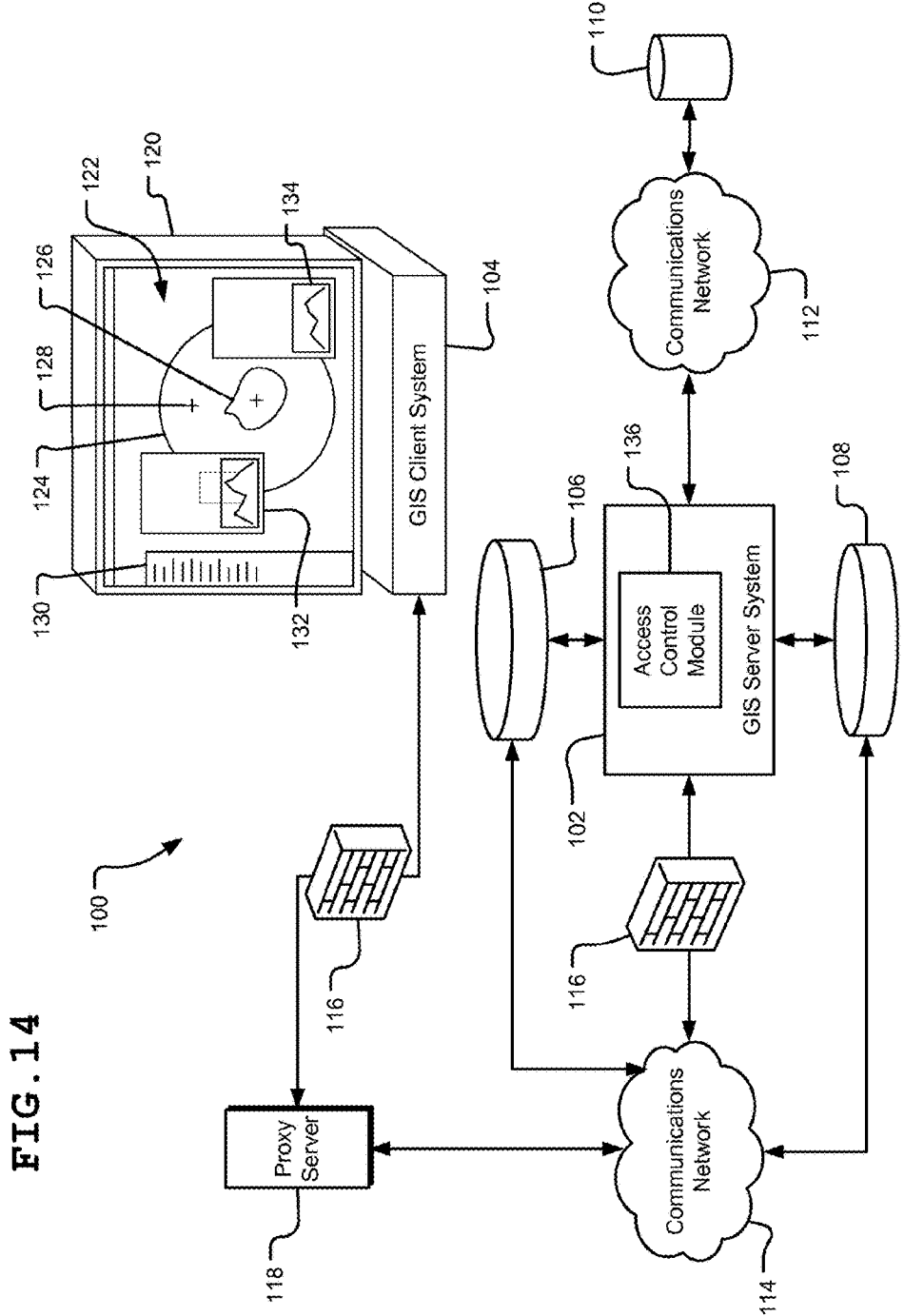
FIG. 14 is a schematic diagram of an exemplary implementation of a geospatial decision management system for implementing a geographic information system over a network.

A GM and/or GIS can be implemented in a geospatial decision management system, (GDMS) 100, shown in FIG. 14 to provide the geo-processing power and infrastructure to process the data and render geo-visualizations of the data in a user interface. The GDMS 100 of FIG. 14 can be implemented in a combination of a server computer system 102, one and/or more client computer systems 104, and various data sources 106, 108, and 110. GDMS data can be saved in the GDMS server system 102 and/or in a datastore 106, 108, and 110 at a local and/or remote location. The data sources 106 and 108 are depicted as local to the server system 102, whereas the data source 110 is depicted as coupled remotely to the server system 102 via a communications network 112. GDMS data can also be cached in a proxy server.

The client system 104 can be coupled remotely to the server system 102 via a communication network 114, (or alternatively, the same communications network 112), although a local connection between the client system 104 and the server system 102 can be employed. It should be understood that multiple client systems can be coupled with the server system 102 concurrently. It should also be understood that the client system 104 and server system 102 can be implemented in an integrated system. The network connection 114, such as an Internet connection, can be used by GDMS client systems 104 to access the data, (e.g., data defining layers and/or providing financial information, chemical concentrations, test results, project state reports, etc.) at the remote data sources 106, 108, 110, directly and/or through an intermediate computing system, (e.g., a proxy server and/or GDMS server).

The client computer 104 can be coupled to an intermediate server, such as a proxy server 118. The proxy server 118 can be positioned between the client computer 104 and the server system 102. The proxy server 118 intercepts all requests to the server system 102 to see if it can fulfill the requests itself with cached data from prior requests. If not, the proxy server 118 forwards the request to the server system 102 to be fulfilled. The proxy server 204 can also be coupled to the communications network 114 and accessed by the client computer 104 and the server system 102 via the network 114. Firewalls 116 can also be implemented between the server system 102 and the client computer 104 and the network 114 for an added layer of security.

The connection can be established as a secure connection between the client system 104 and the server 102 and/or the remote data sources 106, 108 and 110. The secure connection can be accomplished by a variety of different methods including, but not limited to, authentication codes and passwords, secure user management tools, firewalls, user authentication, secure user management tools, user pathway mapping and encryption, etc. In another example, the server system 102 can include an administrative website that can allow authorized users or members to manipulate and assign user rights, (e.g., an administrative tier). The server system 102 can also include a security feature, for example, an access control module 136 to establish, control, and monitor access by client computers 104 to certain data stored within and/or accessible within the GDMS 100. Access control can be governed by an administrator and/or it can be an automated function of the access control module 136 based upon attributes of the data requested and permissions held by the user as further described below.

The server system 102 can represent one and/or more hardware and software servers providing multiple server functions. In addition, one and/or more of the server system 102, the client system 104, and the databases 106, 108 and 110 can form an N-tier system. The server system 102 can also include a web server application subsystem, whereby world wide web-enabled applications can provide various aspects of functionality of the GDMS 100. For example, the server system 102 can provide a website where content creators and/or generators can upload geospatially-related data that can be transformed into features referenced to locations within a map of the GDMS 100 for access through the client system 104 connected to the GDMS 100 for geo-visualization of the information. In an alternative implementation, the client system 104 can be implemented as a "thick" client and execute client-installed software for some and/or all of the functionality of the GDMS 100.

A monitor 120, coupled to the client system 104, presents a GDMS interface 122 constructed from data and functionality received through the server system 102. When a user is working within a GDMS 100, s/he is said to be in a GDMS session. The GDMS interface 122 can be generated by a GDMS application executing on the client system 104 and/or alternatively through a server-executed GDMS application that provides the interface components over the network to a dumb terminal and/or a browser application running on the client system 104. The GDMS interface 122 can be a geospatial browser window including a map 124, (e.g., a globe in this illustration), a geo-visualization of data as a layer 126 and individual features 128 on the map 124, a layer manager 130 for selecting data and other features from the databases 106, 108, 110. The GDMS view can also include tool palettes 132 and 134, which can be distinct features of the browser interface browser plug-ins, and/or separate utilities and/or applications.

In one implementation, the GDMS interface 122 can be in the form of a geospatial browser window and one and/or more geospatially-referenced tools. Access to the data and/or functionality is provided by geospatially-referenced tools, (e.g., tool palettes 132 and 134) that are associated with and triggered in relation to a specific location in a common coordinate system, (e.g., WGS84 and/or some other shared coordinate system) shared by the tools and the geospatial browser. For example, a tool can provide chemical analysis results pertaining to soil samples taken from the location over time. In another example, a tool can retrieve and analyze financial data pertaining to a construction project on a specified region the map, (e.g., a location). The data available to such tools is provided from a variety of data sources and associated with each location within the common coordinate system of the GDMS system 100, such as through specified coordinates, (e.g., longitude and latitude), other geographic constraints, and/or organizational constraints, (e.g., a project identifier of a project having a specific geographic location and/or constraint, a feature identifier of a feature having a specific geographic location and/or constraint, etc.). In this manner, the user can view a location through the geospatial browser and access data and/or functionality associated with a location or a map that is accessible through the tools in the browser. These locations can be the same location and/or distinct locations.

Figure 15:
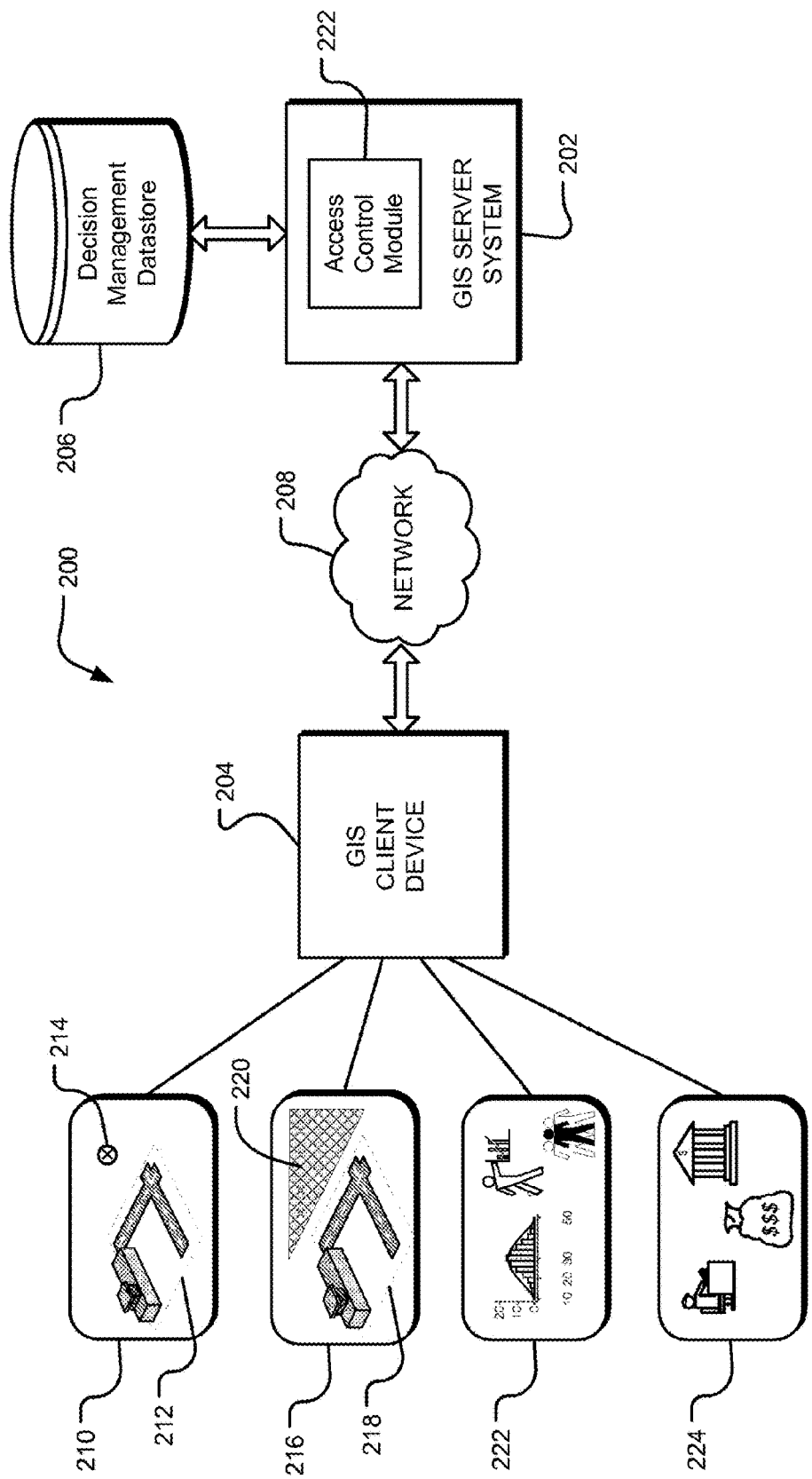
FIG. 15 is a schematic diagram of a geospatial decision management system depicting exemplary implementations of technical and management interface tools available to a client user.

FIG. 15 further illustrates an example of a GDMS 200 for accessing specific data and/or information within a database based on the association of the information with geospatial coordinates. Again, the GDMS 200 can be implemented by a GM and/or GIS server system 202 in communication with a GM and/or GIS client computer 204 over a communication network 208, e.g., the Internet. The GM and/or GIS client computer 204 can be used access information and real-time data a decision management datastore, (DMD) 206 connected with the GM and/or GIS server system 202. The communication network 208 ideally provides the GM and/or GIS client computer 204 with high-speed access to indexed data on the DMD 206.

The GM and/or GIS server system 202 can also include a security feature, for example, an access control module 222 to establish, control, and monitor access by GM and/or GIS client computers 204 to certain data stored within and/or accessible via the DMD 206. Access control can be governed by an administrator and/or it can be an automated function based upon attributes of the data requested and permissions held by the user as further described below The data retrieved from the DMD 206 can be presented in a user interface 210, 216, 222, and 224, (of which four exemplary configurations are presented in FIG. 15 at the GM and/or GIS client computer 204. A feature presented in the user interface 210, (e.g., a geospatial coordinate and/or geographic location) on the client computer 204 can be used access information and real-time datadexed by features using the DMD 206.

The GM and/or GIS client computer 204 can access the indexed data in the DMD 206 by using applications and/or plug-ins, such as technical interface 210, 216 and management interface 222, 224. The technical interface 210, 216 can be used to access technical data associated with particular features. In exemplary implementations such technical data might be biochemical, geochemical, hydro-geological, and/or other physical data on analytes. The management interface 118, 120 can be used to access business management data. In exemplary implementations such management data might be business and organizational documents and data associated with particular features. Several examples of the use of such tools to interface with the DMD 206 and extract the data are presented below.

As shown in the first technical interface 210 in FIG. 15, if the GM and/or GIS client computer 204 requests information about a particular feature, such as a ground water well located near an airport 212, the GM and/or GIS client computer 204 can select the feature 214, i.e., the ground water well, to receive information related to that feature 214. The first technical interface 210 can include a concentric area data tool that can provide technical data related to the ground water well feature 214, for example, latitude and longitude, physical inspection data, water level information, and water contamination information, in a the form of information windows and visual geographic information overlays on a base location map. In an alternate implementation shown in the second technical interface 216, technical data concerning an area of land 220 around, adjacent, and/or near the airport 218 at the location of the feature 214, for example, landscaping, slope, soil composition, and/or grading information can be presented.

In a further implementation shown in a first management interface 222, a contract management concentric data tool can provide management data based upon the selected feature 214, for example, information construction and/or work in progress, zoning and/or easement information, and/or information any contracts applicable to the feature 214. In a further implementation shown in a second management interface 224, a finance management concentric data tool 120 can also provide management data relating to financial information applying to the feature 214 selected, for example, costs of past repairs and/or current maintenance fees. In some implementations the management interface 222, 224 can further comprise a real-time link to a video camera providing a view of the selected feature 214 and any construction and/or activity occurring at the selected feature 214.

Figure 16:
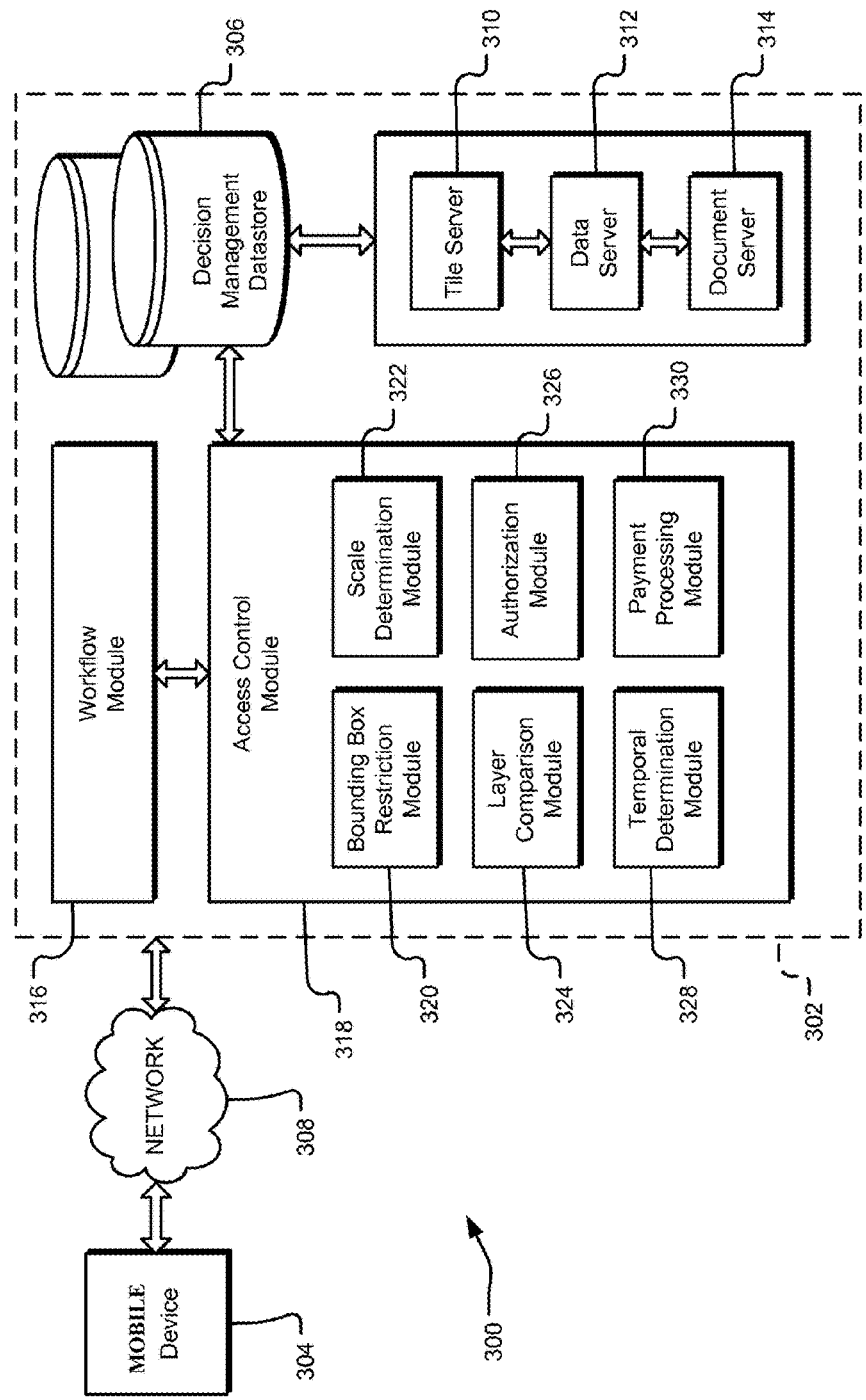
FIG. 16 is a schematic diagram of additional components of a geospatial decision management system for implementing access control to presentation of geospatial attributes within a network.
Figure 17:
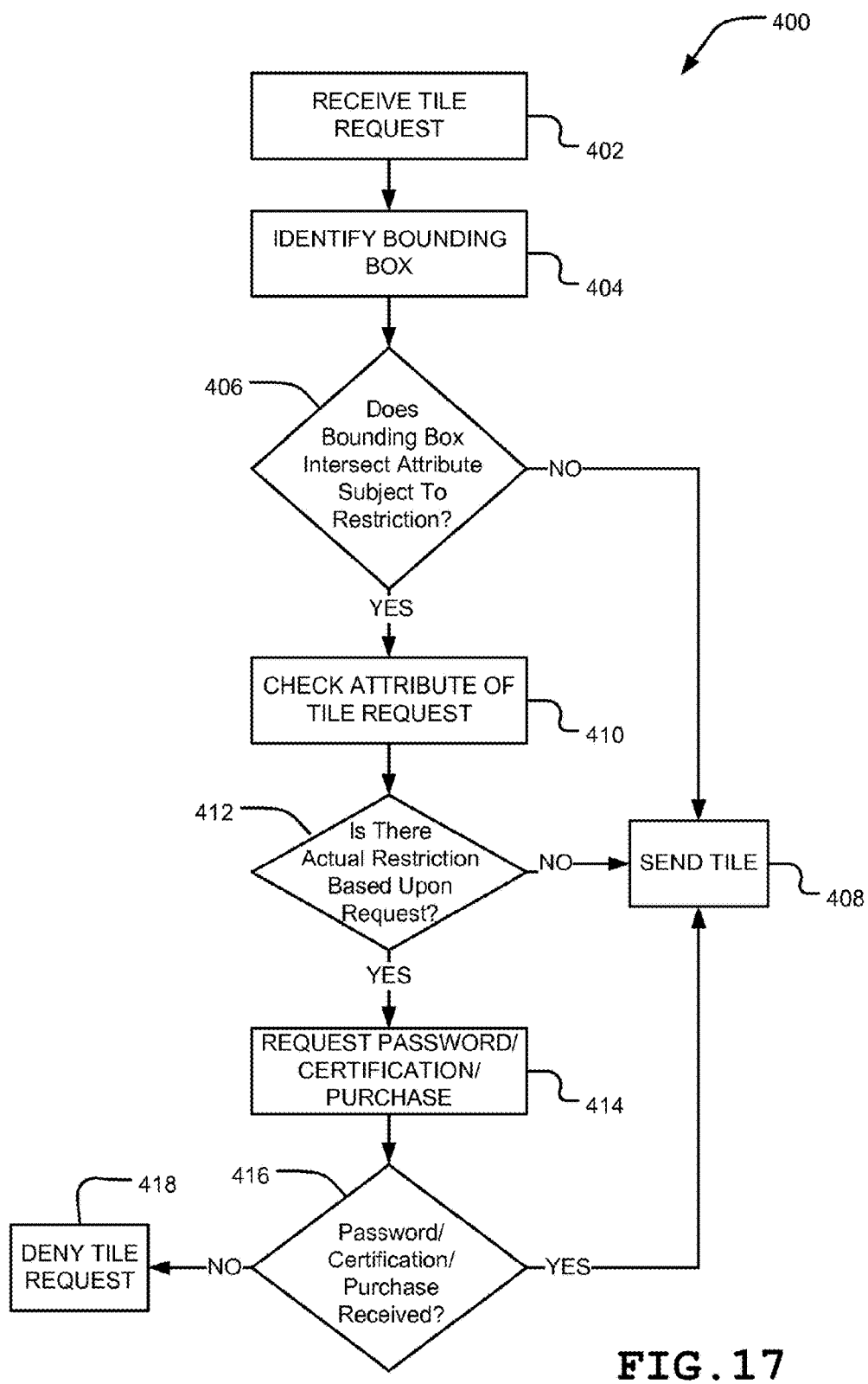
FIG. 17 is a flow diagram of exemplary operations for implementing access control to presentation of geospatial attributes within a geospatial decision management system.

The GDMS shown in FIGS. 16 and 17 is an innovative, GM and/or GIS-based management decision support tool that optimizes the geo-processing and geo-visualization of available GM and/or GIS data, for example, natural resources, building resources, time-management resources, personnel resources, financial resources, and information resources, and others. The GDMS can enable a GM and/or GIS client to easily visualize and interpret large, multifaceted, and complex information sets in order to make comparative analyses of alternatives, identify potential liabilities and opportunities, and optimize program strategies.

The GDMS provides full convergence, and/or integration, of multiple, (essentially limitless) disparate data within a single virtual three-dimensional, (geospatial) model. The disparate data, and even sub-data within them, can be organized by association with relevant features on the model. For example, groundwater analytical data can be associated with a given groundwater well; building data can be associated with a given building; installation information can be associated with the installation; and command information can be associated with the command. The GDMS full data convergence allows data to be accessed relative to position, scale, resolution, time, and other geospatial attributes and serves as an extremely intuitive and efficient way to organize and access essentially limitless quantities of information.

The GDMS allows queries, filters, and comparisons of data to be completed at the GM and/or GIS server system and then visually represented in three dimensions in near real time at the GM and/or GIS client device. The three-dimensional representation of data helps users or members gain a better understanding of the meaning contained within the data more rapidly than using traditional tabular and/or two-dimensional representations of data. The GDMS thus allows the meaning represented in the three-dimensional data to be rapidly communicated to users or members.

The GDMS improves on traditional closed and/organization-specific GM and/or GIS by affording live connections or channels to multiple databases. As the databases are updated, the representations afforded by GDMS can thus be current. This allows a fourth dimension, time, to be factored into resource management decisions. Time is an important additional data factor because previous "ad view" of the data can be compared to current "ad view" of the data, in order to gain an understanding of the rates of change, (or dynamics) of the real system. In other words, the GDMS allows for differences between time states to be understood and factored into a decision process.

In FIG. 14 a GDMS 100 can be used to provide access to specific sections within documents, which are associated with a particular geographic coordinate, e.g., User/consumer, E-commerce, Retail, Media & Entertainment, Business, Government, Sports, or Education related and/or Services Online or mobile coupons and promotions or offers for Products, Goods, Gambling, Auctions, Real Estate, Shopping, Sports, Travel & Hospitality, Social Gaming, Autos & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/ and/or/Social Networking/Impressions/Location-Based/ Communities, (PSR-GM-C/L-SN) information. More specifically, a GDMS 100 user, (or GM and/or GIS client) can select a specific location and/or 'feature' on a map and be directed to advertising search impressions for location-based promotions, location-based offers, location-based coupons, promotions or offers in connection with an online or mobile news feed, position-based services, location-based advertising, mobile location-based advertising and promotions, coupons and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, location-based services, GPS and GIS technologies, and the like, in the location-based promotions, location-based offers, location-based coupons, promotions or offers in connection with an online or mobile news feed, location-based advertising, mobile location-based advertising and promotions or offers and marketing impressions and online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services, which are accessible across one or multiple websites or third party applications with two or three dimensional images on geospatial platform using cloud-type configuration and using cloud services in combination with geo-mapping, web mapping, 2D and 3D mapping, GPS, location mapping, social mapping, digital mapping, 3D holographic mapping and/or mobile mapping technologies with social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services Online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information. Said another way, specific relevant data can be provided to a user based upon the 'feature' selected, not just based upon a traditional search query. Thus, GDMS 100 links and/or ties a 'feature,' and/or specific geographic location to an indexed database of data. The specific relevant data provided to a user can comprise only portions and/or sections of documents, maps, and/or images related to that specific 'feature' selected. This can greatly increase efficiency of GM and/or GIS by taking a user directly to a relevant section of a document, which can be hundreds and/or thousands of pages in length.

As should be apparent from the above discussion, the GDMS is a powerful tool that can be used to access enormous quantities of data stored at remote locations. When using the GDMS, control access to data stored at remote locations, for example, an access control module 222 as depicted in FIG. 15 can be implemented. An administrator of the data stored at the remote location to have server-side control over varying levels of access to data. Thus, in some implementations, access control can be exercised on the server-side; however, in other implementations this level of access control can be exercised on the client side. Further, access control can also be exercised at/by a given database. It can also be desirable to have different levels of authorization to control data access for employees having different roles within an organization. These levels of authorization can be created and adjusted by an administrator to permit varying levels of access to the data.

The GDMS can specifically establish different levels of access to the data can be controlled for each individual and/or can be controlled in groups, (e.g., hierarchically) by the administrator and can be created and maintained using operations implemented within the access control module 222.

The varying levels of accessibility to data can be controlled using a number of different methods including, but not limited to, authentication codes and passwords, secure user management tools, firewalls, user authentication, user pathway mapping, and/or encryption. The levels of access control to the data can also be controlled by the creation of an individual profile for each user identifying the user's role in the organization and specifying their level of access to the data. Then, when a user logs onto a system, their level of access to data can be known by the system and the user can then only be able to view and/or access data that was commensurate with their level of authorization.

The layers of data can also be saved so that other authorized users or members can access the saved layers to view and make additional changes to, (or user comment impressions on) the layers and then save those additional changes. This allows a given user to open the selected state, make changes, alterations, and user comment impressions, and save this new altered state for review and potential further modification by others. Certain GDMS view state data and/or functionality can and/or cannot be accessible to and/or be editable by a user based upon access permissions that have been granted to and/or withheld from the user.

In one implementation, access to the different map tiles and/or layers of data can be based upon the scale and/or resolution of the map and/or layer, i.e., access is 'scale-driven.' The contextual and/or 'smart' layers of data can be turned on and/or off by an administrator based upon the authorization to access each layer of data. A user's ability to change and/or alter the layers of data can also be dependent upon their level of authorization.

With reference now to FIG. 16, an exemplary GDMS 300 is implemented in a server system 302 with a DMD 306 as described above. The server system 302 can further include additional data servers, for example, a map tile server 310 indexed by coordinates, reference number, and/or feature; one and/or more layer servers 312 that provide feature and layer information also indexed by reference to geospatial coordinates, tile reference number, and/or feature; and a document server 314 that can provide online or mobile coupons and promotions or offers for Products, Goods, Gambling, Auctions, Shopping, Sports, Autos & Vehicle, Pets & Animals, Online Communication, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information, and/or other documents and information associated with a geospatial location, (again indexed by coordinate, reference number, and/or feature) in a format not amenable to geo-visualization. As shown in FIG. 16, the data servers 310, 312, 314 can be connected to the DMD 306 and/or to one another to maximize operating efficiency of the datastore 306. In some implementations, the data servers 310, 312, 314 and the datastore 306 can be located within the same server system 302, while in other implementations, the data servers 310, 312, 314 and the datastore 306 can be distributed across a network.

The server system 302 can further comprise a workflow module 316 and an access control module 318 through one and/or a number of different types of software programs, (i.e., programming logic and/or computer executable instructions) utilizing a variety of different types of measures to control access to the DMD 306. The workflow module 316 and the access control module 318 can be positioned between the client computer 304 and the DMD 306, as shown in FIG. 16, to provide a layer of access control between the client device 304 and the DMD 306 and/or the data servers 310, 312, and 314. In other implementations, the access control module 318 and workflow module 316 can be partially and/or substantially implemented in other locations, for example, on the client device 304, and/or within the communications network 308.

Alternately, in an implementation of the GDMS 300 in an open and/or public platform, rather than a system internal to and/or controlled by a particular organization, access to data can be controlled based merely upon geospatial attributes, for example, the geospatial location, (coordinates) of a tile request, scale of a tile request, resolution of a tile request, payment for access, the combination of layers requested, and/or freshness and/or staleness of data requested. Another example of a geospatial attribute can be the ability to download a geospatial data set as opposed to merely having the ability to view a geo-visualization of such data, e.g., as a layer and/or set of features, e.g., Product, Goods, Gambling, Auctions, Shopping, Sports, Autos & Vehicle, Pets & Animals, Online Communications, Education related and/or Services in combination with cloud-type configuration and using cloud services with/Geospatial Mapping/Web Mapping/2D Mapping/3D Mapping/GPS/Location Mapping/Social Mapping/Digital Mapping/3D Holographic Mapping/ Geographic Mapping-Company/Mobile Mapping technologies with/Local Information or Global/and/or/Social Networking/Impressions/Location-Based/Communities, (PSR-GM-C/L&SC-SN) information. A further example of a geospatial attribute can be the ability to save and/or bookmarks geo-visualization states defines by various combinations of underlying mar tiles and overlying layers and features for easily returning to such states as opposed to having to recreate the same filter query to return to a prior state. In such a public platform, contributors of GM and/or GIS data accessible for geo-visualization can place limits and/or restrictions on the availability of and/or accessibility of the GM and/or GIS data. A public implementation of the workflow module 316 can be used as an interface for data sources to either upload data to the DMD 306 and/or otherwise register data with the DMD 306 so that the DMD 306 can locate and access the data from a remote server and/or data store managed by the data source.

Another exemplary function of the access control module 318 can be embodied in the temporal determination module 328 that allows and/or denies access to map tiles and/or layers based upon the age of the information comprising the particular data set, e.g. User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/Geospatial Mapping/Web Mapping/2D Mapping/3D Mapping/GPS/Location Mapping/Social Mapping/ Digital Mapping/3D Holographic Mapping/Geographic Mapping-Company/Mobile Mapping technologies with/Local Information or Global/and/or/Social Networking/Impressions/Location-Based/Communities, (CBGSE-PGGS-GM-C/L&SN) information. In an example, data that is significantly older can develop additional value again for use in temporal studies to identify shopping ad impressions. In such a case, the data can again only be accessible upon payment of a fee for the service. The temporal determination module 328 manages the temporal worth of GM and/or GIS data, for example, by examining time stamps associated with particular GM and/or GIS data and comparing the timestamps to any tags that can be encoded with the data indicating that the GM and/or GIS data set is subject to a fee for service within particular ranges of age.

FIG. 17 depicts an exemplary set of access control operations 400 that can be performed according to one implementation of an access control module within a GDMS. Initially the access control module receives a tile request in a receiving operation 402 associated with one and/or more User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services in combination with cloud-type configuration and using cloud services with/ Geospatial Mapping/Web Mapping/2D Mapping/3D Mapping/GPS/Location Mapping/Social Mapping/Digital Mapping/3D Holographic Mapping/Geographic Mapping-Company/Mobile Mapping technologies with/Local Information or Global/and/or/Social Networking/Impressions/Location-Based/Communities, (PSR-GM-C/L&SC-SN) information. It should be understood that any request from a client device for GM and/or GIS data can necessarily be associated with one and/or more map tiles. In order to present a geo-visualization interface all of the data can have a reference to particular geospatial coordinates, which can optionally be broken down in units of map tiles.

If the access control module recognizes that there is a restriction associated with one and/or more of the tiles in the bounding box, the access control module can next determine what kind of geospatial attribute is implicated in the bounding box restriction in checking operation 410. The access control module can then invoke one and/or more of the sub-modules described above for further processing assistance. The appropriate sub-module(s) can first determine whether an actual restriction must be imposed on the data request pursuant to the geospatial attribute in determination operation 412. This operation determines whether the requested a value of the geospatial data set and/or feature actually conflicts with the restriction set by the data contributor. For example, the tile request at a resolution value restricted by the data contributor without additional authorization and/or payment and the tile would be considered actually restricted. Alternatively, if the tile request is at a resolution value within the allowable bounds set by the contributor, then the attribute of the request would not be considered restricted and the tiles and/or associated data would be approved for presentation in sending operation 408.

Figure 18:
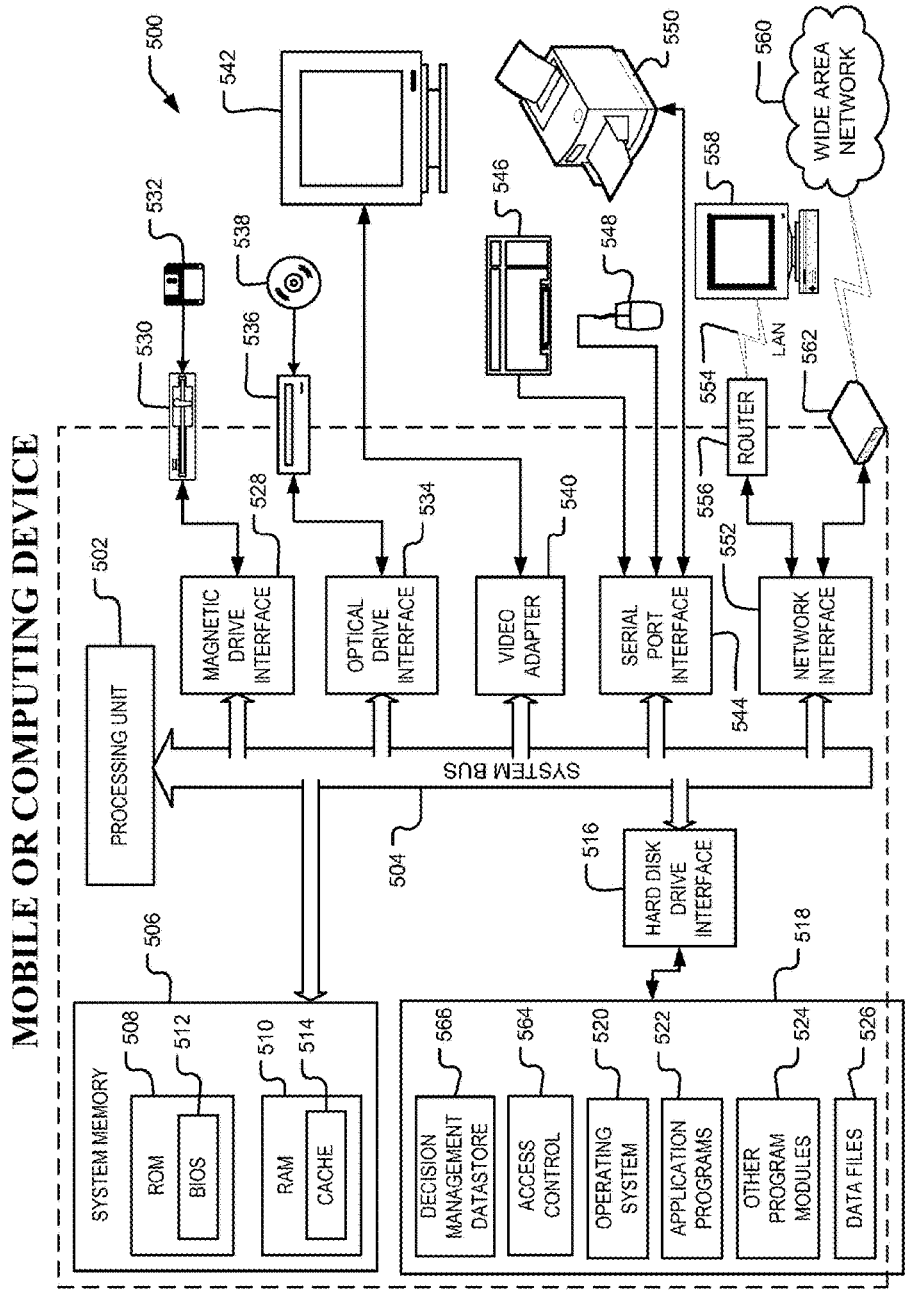
FIG. 18 is a schematic diagram of an exemplary implementation of a general-purpose mobile and/or computer system that that can be used to implement any, all, and/or various aspects of the present invention, e.g., but not limited to a geospatial decision management system, including access control.

An exemplary computer system 500 for implementing the file origin determination processes above is depicted in FIG. 18. The computer system 500 can be a computer server with internal processing and memory components as well as interface components for connection with external input, output, storage, (e.g., computer, server, or cloud, etc.), network, and other types of peripheral devices. Internal components of the computer system in FIG. 18 are shown within the dashed line and external components are shown outside of the dashed line. Components that can be internal and/or external are shown straddling the dashed line. Alternatively to a server, the computer system 500 can be in the form of any of a personal computer, (PC), a notebook and/or portable computer, a tablet PC, a handheld media player, (e.g., an MP3 player), a smart phone or via a mobile device or wireless data transfer device, (such as a mobile phone networks or wi-fi networks) or other similar device or android device or tablet device or mobile internet devices or holographic devices or holographic phone or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions, in real time, a video gaming device, a set top box, a workstation, a mainframe computer, a distributed computer, an Internet appliance, and/or other computer devices, and/or combinations thereof.

The computer system 500 includes a processor 502 and a system memory 506 connected by a system bus 504 that also operatively couples various system components. There can be one and/or more processors 502, e.g., a single central processing unit, (CPU), and/or a plurality of processing units, commonly referred to as a parallel processing environment. The system bus 504 can be any of several types of bus structures including a memory bus and/or memory controller, a peripheral bus, a switched-fabric, point-to-point connection, and a local bus using any of a variety of bus architectures. The system memory 506 includes read only memory, (ROM) 508 and random access memory, (RAM) 510. A basic input/output system, (BIOS) 512, containing the basic routines that help to transfer information between elements within the computer system 500, such as during start-up, is stored in ROM 508. A cache 514 can be set-aside in RAM 510 to provide a high-speed memory store for frequently accessed data.

A hard disk drive interface 516 can be connected with the system bus 504 to provide read and write access to a data storage device, e.g., a hard disk drive 518, for nonvolatile storage of applications, files, and data. A number of program modules and other data can be stored on the hard disk 518, including an operating system 520, one and/or more application programs 522, other program modules 524, and data files 526. In an exemplary implementation, the hard disk drive 518 can further store access control module 564 for restricting access to map and data files and the decision management datastore 566 for housing and managing GM and/or GIS databases according to the exemplary processes described herein above. Note that the hard disk drive 518 can be either an internal component and/or an external component of the computer system 500 as indicated by the hard disk drive 518 straddling the dashed line in FIG. 20. In some configurations, there can be both an internal and an external hard disk drive 518.

The computer system 500 can further include a magnetic disk drive 530 for reading from and/or writing to a removable magnetic disk 532, tape, and/or other magnetic media. The magnetic disk drive 530 can be connected with the system bus 504 via a magnetic drive interface 528 to provide read and write access to the magnetic disk drive 530 initiated by other components and/or applications within the computer system 500. The magnetic disk drive 530 and the associated computer-readable media can be used to provide nonvolatile storage of computer-readable instructions, data structures, program modules, and other data for the computer system 500.

The computer system 500 can additionally include an optical disk drive 536 for reading from and/or writing to a removable optical disk 538 such as a CD ROM and/or other optical media. The optical disk drive 536 can be connected with the system bus 504 via an optical drive interface 534 to provide read and write access to the optical disk drive 536 initiated by other components and/or applications within the computer system 500. The optical disk drive 530 and the associated computer-readable optical media can be used to provide nonvolatile storage of computer-readable instructions, data structures, program modules, and other data for the computer system 500.

A display device 542, e.g., a monitor, a television, and/or a projector, and/or other type of presentation device can also be connected to the system bus 504 via an interface such as a video adapter 540 and/or video card. Similarly, audio devices, for example, external speakers and/or a microphone, (not shown), can be connected to the system bus 504 through an audio card and/or other audio interface (not shown).

In addition to the monitor 542, the computer system 500 can include other peripheral input and output devices, which are often connected to the processor 502 and memory 506 through the serial port interface 544 that is coupled to the system bus 506. Input and output devices can also and/or alternately be connected with the system bus 504 by other interface for example, a universal serial bus, (USB), a parallel port, and/or a game port. A user can enter commands and information into the computer system 500 through various input devices including, for example, a keyboard 546 and pointing device 548, for example, a mouse. Other input devices, (not shown) can include, for example, a microphone, a joystick, a game pad, a tablet, a touch screen device, a satellite dish, a scanner, a facsimile machine, and a digital camera, and a digital video camera. Other output devices can include, for example, a printer 550, a plotter, a photocopier, a photo printer, a facsimile machine, and a press, (the latter not shown). In some implementations, several of these input and output devices can be combined into a single device, for example, a printer/scanner/fax/photocopier. It should also be appreciated that other types of computer-readable media and associated drives for storing data, for example, magnetic cassettes and/or flash memory drives, can be accessed by the computer system 500 via the serial port interface 544, (e.g., USB) and/or similar port interface.

The computer system 500 can operate in a networked environment using logical connections through a network interface 552 coupled with the system bus 504 to communicate with one and/or more remote devices. The logical connections depicted in FIG. 18 include a local-area network, (LAN) 554 and a wide-area network, (WAN) 560. Such networking environments are commonplace in home networks, office networks, enterprise-wide computer networks, and intranets. These logical connections can be achieved by a communication device coupled to and/or integral with the computer system 500. As depicted in FIG. 18, the LAN 554 can use a router 556 and/or hub, either wired and/or wireless, internal and/or external, to connect with remote devices, e.g., a remote computer 558, similarly connected on the LAN 554. The remote computer 558 can be a PC client, a server, a peer device, and/or other common network node, and typically includes many and/or all of the elements described above relative to the computer system 500.

To connect with a WAN 560, the computer system 500 typically includes a modem 562 for establishing communications over the WAN 560. Typically the WAN 560 can be the Internet. However, in some instances the WAN 560 can be a large private network spread among multiple locations. The modem 562 can be a telephone modem, a high-speed modem, (e.g., a digital subscriber line, (DSL) modem), a cable modem, and/or similar type of communications device. The modem 562, which can be internal and/or external, is connected to the system bus 518 via the network interface 552. In alternate embodiments the modem 562 can be connected via the serial port interface 544. It should be appreciated that the network connections shown are exemplary and other means of and communications devices for establishing a communications link between the computer system and other devices and/or networks can be used. Connection of the computer system 500 with a WAN 560 allows the decision management datastore 566 the ability to access remote GM and/or GIS datastores to provide for a distributed GM and/or GIS platform.

All directional references, (e.g., proximal, distal, upper, lower, upward, downward, left, right, lateral, front, back, top, bottom, above, below, vertical, horizontal, clockwise, and counterclockwise) are only used for identification purposes to aid the readers understanding of the present invention, and do not create limitations, particularly as to the position, orientation, and/or use of the invention. Connection references, (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As presented in FIG. 19, The present invention provides in one aspect a delivery system for providing and using delivering advertising search impressions to advertisers brands and other third parties for online marketing of location-based promotions, location-based offers, location-based coupons, promotions or offers in connection with an online or mobile news feed, position-based services, location-based advertising, mobile location-based advertising and promotions or offers and marketing impressions for a geospatial website for a multidimensional representation of information and/or scalable versions of web and mobile device content marketing impressions for an infrastructure and global platform that provides users or members and businesses of all types and sizes with access to broad markets for the delivery of delivering advertising search impressions to advertisers brands and other third parties for online marketing of location-based promotions, location-based offers, location-based coupons, promotions or offers in connection with an online or mobile news feed, location-based advertising, mobile location-based advertising and promotions or offers and marketing impressions, coupons and/or location-based deals and offers and location-based services in real-time via a mobile device geo-tagging, real-time geo-tagging, geo-coding, geo-targeted, geo-location impressions, mobile geo-tagging, geo-fencing, mobile mapping technologies with location-based advertisements, location-based deals and offers, social networking, social networking interactions between members and generate marketing and mapping relationships between members of a social network or website and social networking websites or third party websites or applications, location impression-based services, GPS and GIS technologies, and the like, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, social shopping and social networking, social networking interactions between members and generate marketing and mapping relationships between members of a social network or website, social networking websites or third party websites or applications, User/consumer, E-commerce, Retail, Media & Entertainment, Business, Government, Sports, or Education related and/or Services online or mobile coupons and promotions or offers for Products, Goods, Gambling, Auctions, Real Estate, Shopping, Sports, Travel & Hospitality, Social Gaming, Auto & Vehicles, Pets & Animals, Online Communities, Education related and/or Services from advertisers, brands, and/or merchants from around the world.

Figure 20:
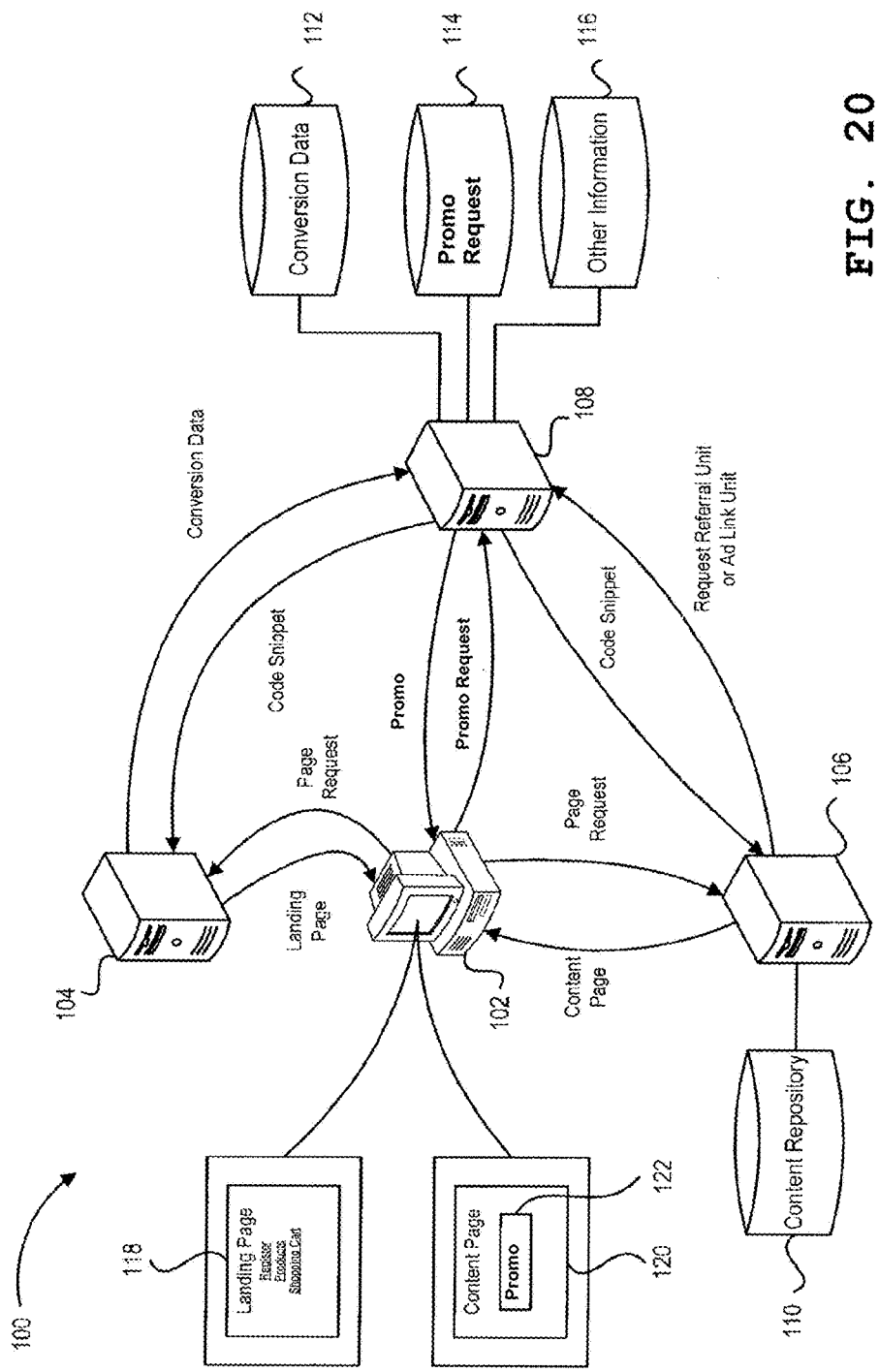
FIG. 20 is a block diagram of an example online system of the present invention.

FIG. 20 is a block diagram of an example online advertising system 100. In some implementations, one or more advertisers 104 can directly, or indirectly, enter, maintain, and track advertisement, ("ad") information in an ad management system 108. The ads can be stored in a repository 114 coupled to the system 108, (e.g., a MySQL® database). The ads may be in the form of graphical ads, such as banner ads or graphic color ads, sponsored video ads, digital promotions or offers, online classified ads, yellow page ads, white page ads, text message ads, interactive advertising, text only ads, image ads, audio ads, social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, sports ad impressions, brand impressions, global brand impressions, product impressions, goods impressions, gambling impressions, auction impressions, real estate impressions, shopping impressions, sports impressions, travel & hospitality impressions, social gaming impressions, autos & vehicles impressions, pets & animals impressions, online communication impressions, education impressions, services impressions, social tracking impressions, social shopping impressions, sharing on a social networking system digital content impressions, mobile social video sharing impressions, video ad impressions, audio-video & photography impressions, near field communication (NFC), NFC impressions, NFC boarding pass impressions, mobile boarding pass impressions, payment and tracking passenger impressions, aggregator impressions, viral impressions, any language or translated into any language impressions, mobile ads, mobile ad network, mobile advertising for mobile publishers and advertisers and mobile commerce, mobile location-based advertising and promotions, ads combining one of more of any of such components, etc. The ads may also include embedded information, such as embedded media, links, meta-information, and/or machine executable instructions. One or more publishers 106 may submit requests for ads or social/geo/promo link promotional data set to the system 108. The system 108 responds by sending ads, social/geo/promo link promotional data set, or information that can allow for the retrieval of ads or social/geo/promo link promotional data set to the requesting publisher 106 for placement/serving one or more of the publisher's web properties, (e.g., websites and other network-distributed content marketing impressions). The advertising search impressions for location-based promotions, location-based offers, location-based coupons, promotions or offers in connection with an online or mobile news feed, position-based services, location-based advertising, mobile location-based advertising and promotions or offers and marketing impressions, online coupons and/or location-based deals and offers and location-based services in real-time via a mobile device or tablet device or mobile interne devices or holographic devices or holographic phone or wireless data transfer device, (such as a mobile phone networks or wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, or social/geo/promo link promotional data set can be placed with or embedded in the publisher's content, (e.g., videos, articles, search results), which can be stored in a repository 110 at the publisher 106, and/or placed with content received from other sources, (e.g., other publishers, advertisers).

In some implementations, publisher's properties available in this system may also include both Internet-distributed and broadcast distributed content such as, but not limited to, television spots, radio spots, print advertising, billboard advertising, (electronic or printed), on-vehicle advertising, and the like.

Other entities, such as users or members 102 and advertisers 104, can provide usage information to the system 108, such as, for example, whether or not a conversion or click-throughs related to an ad has occurred. In some implementations, conversion data can be stored in a repository 112, where it can be used by the system 108 to improve ad-targeting performance. The usage information provided to the system 108 can include measured or observed user behavior related to ads that have been served. In some implementations, the system 108 performs financial transactions, such as crediting the publishers 106 and charging the advertisers 104 based on the usage information.

A computer network, such as a local area network, (LAN), wide area network, (WAN), the Internet, wireless network or a combination thereof, can connect the location-based services, advertisers 104, the system 108, the publishers 106, and the users or members 102.

One example of a publisher 106 is a general content server that receives requests for content, (e.g., articles, electronic mail messages, discussion threads, music, video, graphics, networked games, search results, web page listings, information feeds, dynamic web page content, etc.), and retrieves the requested content in response to the request. The content server may submit a request, (either directly or indirectly) for advertising search impressions for location-based promotions, location-based offers, location-based coupons, promotions or offers in connection with an online or mobile news feed or advertisements or social/geo/promo link promotional data set to an ad server in the system 108. The location-based services or ad request may include a number of ads desired. The social/geo/promo link promotional data set request may include a number of social/geo/promo link promotional data set desired and the number of social/geo/promo links per social/geo/promo link promotional data set. The advertising search impressions for location-based promotions or offers or advertisements or social/geo/promo link promotional data set request may also include content request information. This information can include the content itself, (e.g., page or other content document), a category or keyword corresponding to the content or the content request, (e.g., arts, business, computers, arts-movies, arts-music, etc.), part or all of the content request, content age, content type, (e.g., text, graphics, video, audio, mixed media, etc.), geo-location or geo-tagging information, demographic information related to the content, keyword, web property, etc., and the like.

In some implementations, the content server, (or a browser rendering content provided by the content server) can combine the requested content with one or more of the advertising search impressions for location-based promotions, location-based offers, location-based coupons, promotions or offers in connection with an online or mobile news feed or advertisements, or social/geo/promo link promotional data set provided by the system 108. The combination can happen prior to delivery of the content to the user or contemporaneously where the advertising server can serve the ads or social/geo/promo link promotional data set directly to an end user. The combined content and location based promotions or offers or advertisements or social/geo/promo link promotional data set can be delivered to the user 102 that requested the content for presentation in a viewer, (e.g., a browser or other content display system). The content server can transmit information about the location-based promotions, location-based offers, location-based coupons, promotions or offers in connection with an online or mobile news feed or advertisements, or social/geo/promo link promotional data set back to the ad server, including information describing how, when, and/or where the location-based promotions, location-based offers, location-based coupons, promotions or offers in connection with an online or mobile news feed or advertisements or social/geo/promo link promotional data set are to be rendered, (e.g., in HTML or JavaScript™). The content page 120 can be rendered in the user's viewer with one or more ads 122. When the user 102 ad click impressions on a displayed ad 122 of an advertiser, the user 102 can be redirected to a landing page 118 of the advertiser's web site.

In another example, the publisher 106 is a search service. A search service can receive queries for search results. In response, the search service can retrieve relevant search results from an index of content, (e.g., from an index of web pages). An exemplary search service is described in the article S. Brin and L. Page, "The Anatomy of a Large-Scale Hypertextual Search Engine," Seventh International world wide web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of search results, (e.g., ten).

The search service can submit a request for delivering advertising search impressions to advertisers brands and other third parties for online marketing of location-based promotions, location-based offers, location-based coupons, promotions or offers in connection with an online or mobile news feed, position-based services, location-based advertising, mobile location-based advertising and promotions or offers and marketing impressions in real-time or social/geo/promo link promotional data set to the system 108. The request may include a number of ads or social/geo/promo link promotional data set desired. A social/geo/promo link promotional data set request may include a number of social/geo/promo link promotional data set desired and the number of social/geo/promo links per social/geo/promo link promotional data set. The number of advertising search engine optimization, search engine impressions, search impressions for location-based promotions, location-based offers, location-based coupons, promotions or offers in connection with an online or mobile news feed, position-based services, location-based advertising, mobile location-based advertising and promotions or offers and marketing impressions or number of social/geo/promo link promotional data set may depend on the search results, the amount of screen or page space occupied by the search results or other content marketing impressions to be displayed contemporaneously with the sponsored content, the size and shape of the ads, etc. In some implementations, the number of desired advertising search impressions for location-based promotions, location-based offers, location-based coupons, promotions or offers in connection with an online or mobile news feed, position-based services, location-based advertising, mobile location-based advertising and promotions or offers and marketing impressions across the world wide web and on mobile or wireless data transfer device, (such as a mobile phone networks or wi-fi networks) or android device or tablet device or mobile interne devices or holographic devices or holographic phone or non-phone connected device, (e.g. tablets, e-readers and MP3 players) or computer, (an Internet connected computer terminal), or distribution of mobile or, (wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time can be from one to ten, or from three to five. In some implementations, the number of desired social/geo/promo link promotional data set can be greater than one, (e.g., three). The request for ads or social/geo/promo link promotional data set may also include a query, (as entered or parsed), information based on the query, (such as geo-location, geo-tagging or mobile geo-tagging or geo-fencing information, whether the query came from an affiliate and an identifier of such an affiliate), and/or information associated with or based on, the search results. Such information may include, for example, identifiers related to the search results, (e.g., document identifiers or "docIDs"), scores related to the search results, (e.g., information retrieval, ("IR") scores), snippets of text extracted from identified documents, (e.g., web pages), full text of identified documents, feature vectors of identified documents, etc. Other information can be included in the request including information related to the content that is to be displayed contemporaneously with the sponsored content. In some implementations, IR scores can be computed from, for example, dot products of feature vectors corresponding to a query and a document, page rank scores, and/or combinations of IR scores and page rank scores, etc.

A search service can combine the search results with one or more of the delivering advertising search impressions to advertisers brands and other third parties for online marketing of location-based promotions, location-based offers, location-based coupons, promotions or offers in connection with an online or mobile news feed, position-based services, location-based advertising, mobile location-based advertising and promotions or offers and marketing impressions across the world wide web and on mobile or wireless data transfer device, (such as a mobile phone networks or wi-fi networks) or android device or tablet device or mobile internet devices or holographic devices or holographic phone or non-phone connected device, (e.g. tablets, e-readers and MP3 players) or computer, (an Internet connected computer terminal), or distribution of mobile or, (wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions in real-time or social/geo/promo link promotional data set provided by the system 108. This combined information can then be forwarded/delivered to the user 102 that requested the content. The search results can be maintained as distinct from the ads or social/geo/promo link promotional data set, so as not to confuse the user between paid geo-targeted or geo-tagged advertisements and/or location-based promotions, location-based offers, location-based coupons, promotions or offers in connection with an online or mobile news feed and presumably neutral search results. The search service can transmit information about the delivering advertising search impressions to advertisers brands and other third parties for online marketing of location-based promotions, location-based offers, location-based coupons, promotions or offers in connection with an online or mobile news feed, location-based advertising, mobile location-based advertising and promotions or offers and marketing impressions across the world wide web and on mobile or wireless data transfer device, (such as a mobile phone networks or wi-fi networks) or android device or tablet device or mobile internet devices or holographic devices or holographic phone or non-phone connected device, (e.g. tablets, e-readers and MP3 players) or computer, (an Internet connected computer terminal), (or wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time or social/geo/promo link promotional data set and when, where, and/or how the or tablet device or mobile internet devices or holographic devices or holographic phone or wireless data transfer device, (such as a mobile phone networks, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time or social/geo/promo link promotional data set was to be rendered back to the system 104.

As can be appreciated from the foregoing, the advertising management system 108 can serve publishers 106, such as content servers and search services. The system 108 permits serving of delivering advertising search impressions to advertisers brands and other third parties for online marketing of location-based promotions, location-based offers, location-based coupons, promotions or offers in connection with an online or mobile news feed, position-based services, location-based advertising, mobile location-based advertising and promotions or offers and marketing impressions across the world wide web and on mobile or wireless data transfer device, (such as a mobile phone networks or wi-fi networks) or android device or tablet device or mobile internet devices or holographic devices or holographic phone or non-phone connected device, (e.g. tablets, e-readers and MP3 players) or computer, (an Internet connected computer terminal) online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions in, in real-time, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services targeted to content, (e.g., documents, web pages, web post blogs, etc.) served by content servers. For example, a network or inter-network may include an ad server serving targeted location-based promotions, location-based offers, location-based coupons, promotions or offers in connection with an online or mobile news feed, position-based services, location-based advertising, mobile location-based advertising and promotions or offers and marketing impressions across the world wide web and on mobile or wireless data transfer device, (such as a mobile phone networks or wi-fi networks) or android device or tablet device or mobile interne devices or holographic devices or holographic phone or non-phone connected device, (e.g. tablets, e-readers and MP3 players) or computer, (an Internet connected computer terminal), or distribution of mobile or, (wi-fi networks), services or ads, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions in real-time in response to requests from a search service with ad spots for sale. Suppose that the inter-network is the World Wide Web. The search service can be configured to crawl much or all of the content. Some of this content can include ad spots, (also referred to as "inventory") available. In this example, one or more content servers may include one or more documents. Documents may include web pages, email, content, embedded information, (e.g., embedded media), meta-information and machine executable instructions, and ad spots available. The location-based geo-targeted or geo-tagged advertisements and/or location-based promotions, location-based offers, location-based coupons, promotions or offers in connection with an online or mobile news feed or location-based services or ads, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, geo-targeted or geo-tagged advertisements and/or location-based promotions, location-based offers, location-based coupons, promotions or offers in connection with an online or mobile news feed and capturing, processing, analyzing and filtering impressions based upon people, places and things, content, audience, geographical area, delivery modes, data sets and ad markers and distribution of mobile or distribution of mobile or, (wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time inserted or overlays into ad spots in a document can vary each time the document is served or, alternatively, can have a static association with a given document.

In one implementation, for the system 104 to provide geo-targeted or geo-tagged advertisements and/or location-based promotions, location-based offers, location-based coupons, promotions or offers in connection with an online or mobile news feed to the publisher that are targeted to the user 108 upon whose browser the geo-targeted or geo-tagged advertisements and/or location-based promotions, location-based offers, location-based coupons, promotions or offers in connection with an online or mobile news feed can be displayed, it is advantageous for user or member profile information about the user 108 to be provided to the system 104. In some implementations, user or member profile information and other types of data can be collected by the system 108 and stored in a repository 116. The stored data may include, for example, geographic locations of users or members, ad context information, etc. The system can then select the geo-targeted or geo-tagged advertisements and/or location-based promotions, location-based offers, location-based coupons, promotions or offers in connection with an online or mobile news feed to provide for viewing by the user 108 based at least in part on the user or member profile information.

Figure 21A:
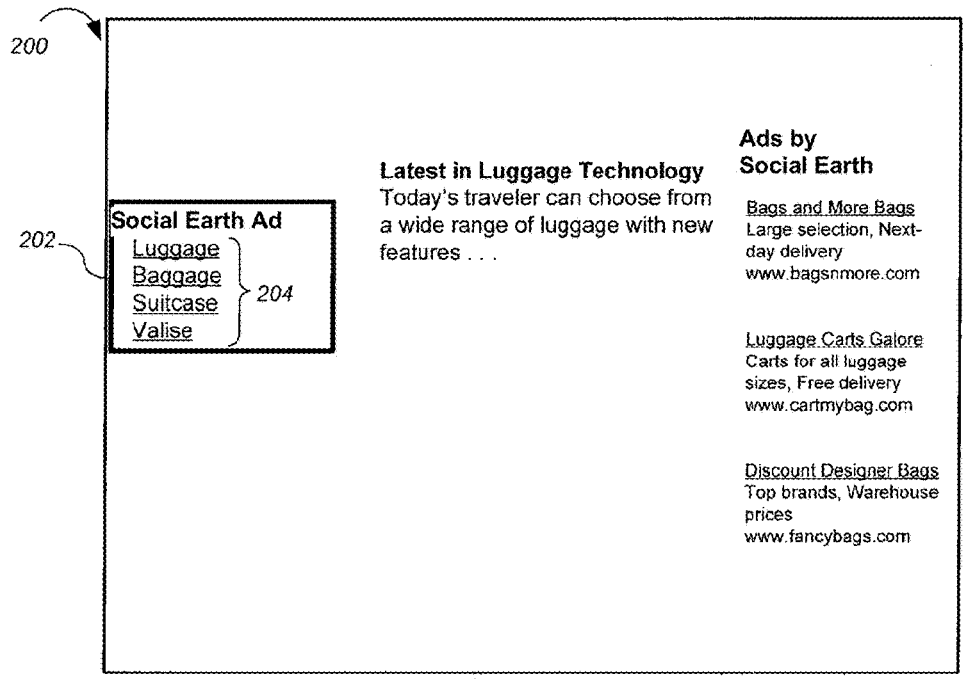
FIG. 21A illustrates an example of a related social/geo/promo link promotional data set provided with geospatial, web page content.

FIG. 21A illustrates an example 200 of a related social/geo/promo link promotional data set 202 provided with geospatial, web page content marketing impressions. In example 200, the content marketing impressions of the web page is directed to the latest in luggage technology. The content marketing impressions of the web page is displayed with related delivering advertising search impressions to advertisers brands and other third parties for online marketing of location-based promotions, location-based offers, location-based coupons, promotions or offers in connection with an online or mobile news feed, location-based advertising, mobile location-based advertising and promotions or offers and marketing impressions across the world wide web and on mobile or wireless data transfer device, (such as a mobile phone networks or wi-fi networks) or android device or tablet device or mobile interne devices or holographic devices or holographic phone or non-phone connected device, (e.g. tablets, e-readers and MP3 players) or computer, (an Internet connected computer terminal), or distribution of mobile or, (wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time and the related social/geo/promo link promotional data set 202.

The related social/geo/promo link promotional data set 202 includes a list of selectable topics or categories 204 related to the content marketing impressions of the web page. The related social/geo/promo link promotional data set 202 can present multiple, (e.g., four) social/geo/promo links. In some implementations, the related social/geo/promo link promotional data set 202 also includes a label, (e.g., "Ads by Google") identifying the link unit 202 as advertisement.

Example 200 includes one related social/geo/promo link promotional data set 202 for the web page. The related social/geo/promo link promotional data set includes the following selectable categories 204: luggage, baggage, suitcase, and valise. These categories 204 are related to the content marketing impressions of the web page. However, the categories 204 in the list are very similar to one another. In particular, these categories 204 are synonyms of each other. A user presented with the luggage technology web page content marketing impressions and the related social/geo/promo link promotional data set 202 is likely to find little variety in the listed categories 204. If the user decides to select any category, the user is likely to select the first category, (e.g., luggage) and ignore the other three categories because of their high correlation to the first category.

Despite the correlation in the categories 204, the list of location-based advertisements and location-based services or ads, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, location-based promotions, location-based offers, location-based coupons, promotions or offers in connection with an online or mobile news feed, location-based advertising, mobile location-based advertising and promotions or offers and marketing impressions, in real time, geo-targeted or geo-tagged advertisements and/or location-based promotions, location-based offers, location-based coupons, promotions or offers in connection with an online or mobile news feed and capturing, processing, analyzing and filtering impressions based upon people, places and things, content, audience, geographical area, delivery modes, data sets and ad markers and distribution of mobile, social, local, mobile search, mobile services, mobile location-based advertising and promotions' or offers' impressions, mobile social networking impressions, location-based mobile ads, mobile ad network, mobile advertising for mobile publishers and advertisers and mobile commerce, mobile location-based advertising and promotions or offers associated with location or maps in a social network or website online or mobile device, location-based mobile coupons, mobile grocery coupons, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, and mobile coupons, mobile grocery coupons, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services presented when one category is selected may differ from the list of ads presented when another category is selected. The ads associated with the similar categories that are lower on the related social/geo/promo link promotional data set list are at a disadvantage relative to the ads associated with the first category in the list.

Figure 21B:
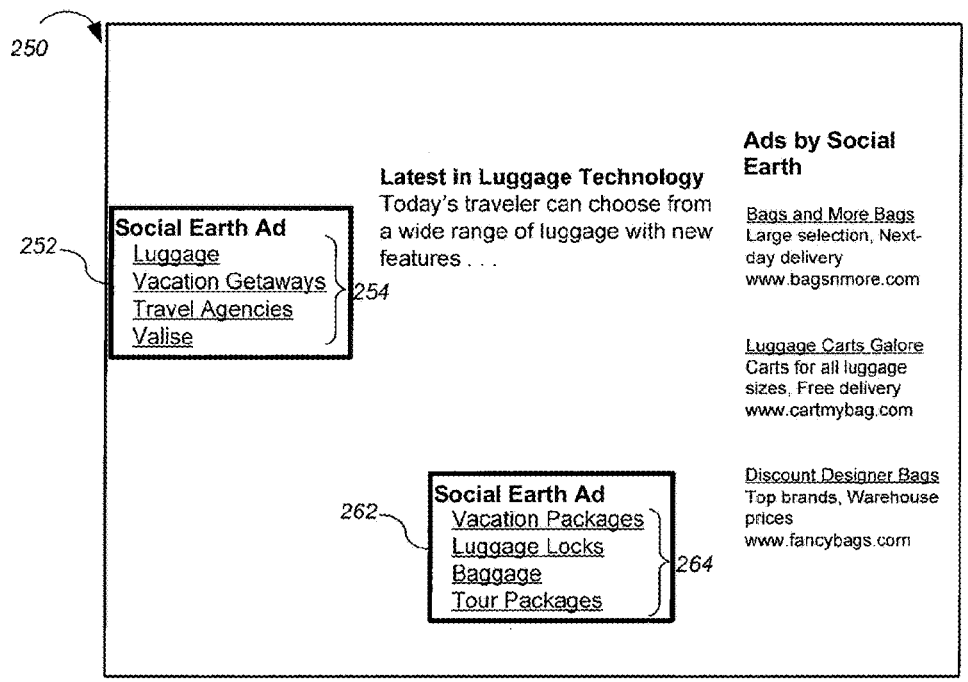
FIG. 21B illustrates an example of multiple related social/geo/promo link promotional data sets provided with the web page content.

FIG. 21B illustrates an example 250 of multiple related social/geo/promo link promotional data set 252, 262 provided with geospatial, web page content marketing impressions. The content marketing impressions of the web page is directed to the latest in luggage technology.

Example 250 includes two related social/geo/promo link promotional data set 252, 262 for the web page. The related social/geo/promo link promotional data set 252 includes the following selectable categories 254: luggage, vacation getaways, travel agencies, and valise. The related social/geo/promo link promotional data set 262 includes the following selectable categories 264: vacation packages, luggage locks, baggage, and tour packages. The categories 254, 264 are related to the content marketing impressions of the web page. However, the categories are scattered across the two related social/geo/promo link promotional data set 252, 262 without regard to the correlation or diversity of the categories. For example, the luggage category of related social/geo/promo link promotional data set 252 is a synonym of the baggage category of related social/geo/promo link promotional data set 262. The vacation getaways category of related social/geo/promo link promotional data set 252 is a synonym of the vacation packages category of related social/geo/promo link promotional data set 262. Additionally, the categories within each link unit are diverse. For example, vacation packages and luggage locks are disparate categories in the related social/geo/promo link promotional data set 262. If the categories are incoherently assembled in multiple related social/geo/promo link promotional data set without considering correlation or diversity, a user may have difficulty finding a particular category of interest.

Figure 22:
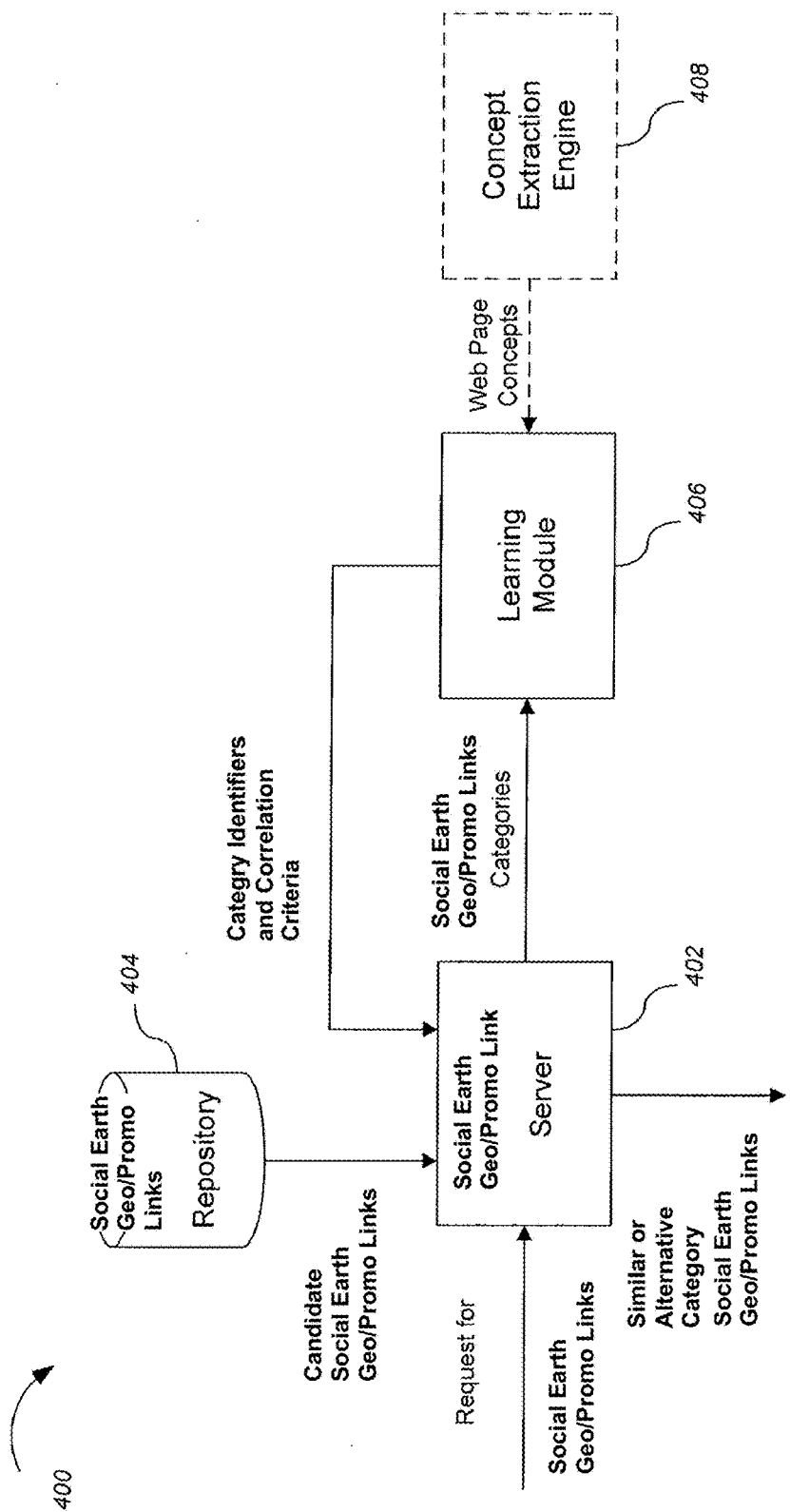
FIG. 22 is a block diagram of an example implementation of an advertising management system of the invention that provides related social/geo/promo link promotional data set with correlated broad and alternative categories.

FIG. 22 is a block diagram of an example implementation 400 of an advertising management system 108 of FIG. 20 that provides related social/geo/promo link promotional data set with correlated broad and alternative categories. The advertising management system 108 includes a social/geo/promo link server 402, a social/geo/promo link repository 404, and a learning module 406. In some implementations, the system 108 also includes a concept extraction engine 408. In some implementations, the ad server in system 108 also serves related social/geo/promo links.

The social/geo/promo link server 402 receives requests for related social/geo/promo link promotional data set. In some implementations, the social/geo/promo link server 402 receives related social/geo/promo link promotional data set requests from one or more content marketing impressions servers. A social/geo/promo link promotional data set request can accompany an ad request, where both the location-based advertisements and location-based services, position-based services, ad links, location-based promotions, location-based offers, location-based coupons, promotions or offers in connection with an online or mobile news feed, discount ad impressions, merchant ad impressions, email coupon impressions, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real time, geo-targeted or geo-tagged advertisements and/or location-based promotions, location-based offers, location-based coupons, promotions or offers in connection with an online or mobile news feed and capturing, processing, analyzing and filtering impressions based upon people, places and things, content, audience, geographical area, delivery modes, data sets and ad markers and distribution of mobile or wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, in real-time and social/geo/promo link promotional data set are to be displayed with the same content marketing impressions. In some implementations, a content marketing impressions server sends a combined request for both ads and social/geo/promo link promotional data set. The related social/geo/promo link promotional data set request may include a number, (e.g., one, two, or three) of related social/geo/promo link promotional data set desired and the number, (e.g., four or five) of related social/geo/promo link promotional data set categories for each related social/geo/promo link promotional data set. The related social/geo/promo link promotional data set request may also include content marketing impressions request information. For example, the information can include the content marketing impressions itself or one or more categories or keyword corresponding to the content marketing impressions or the content marketing impressions request.

The social/geo/promo link server 402 receives candidate related social/geo/promo links from a social/geo/promo link repository 404. In some implementations, the candidate related social/geo/promo links are determined based on keyword corresponding to the requested content marketing impressions with which the related social/geo/promo link promotional data set is to be displayed. Other matching techniques can be used.

The social/geo/promo link server 402 identifies categories for the candidate related social/geo/promo links and forwards the categories to a learning module 406. In some implementations, the categories are the same as the candidate related social/geo/promo links. In some implementations, the candidate related social/geo/promo links are a subset of the categories that can be selected for social/geo/promo link promotional data set displayed with requested content marketing impressions.

In some implementations, the related social/geo/promo link promotional data set request can include an identifier, (e.g., the Uniform Resource Locator, (URL)) of the webpage with the requested content marketing impressions with which the related social/geo/promo link promotional data set is to be displayed. Using the identifier, the web page can be crawled to determine one or more concepts evoked by the content marketing impressions of the web page. An optional concept extraction engine 408 can extract concepts from the web page content marketing impressions. The web page concepts can be forwarded to the learning module 406. Some examples of concept extraction engines are described in U.S. Pat. No. 7,231,393 and U.S. 2004/0068697, each of which, is incorporated by reference herein in its entirety.

The learning module 406 receives related social/geo/promo link categories from the social/geo/promo link server 402.

The learning module 406 generates or retrieves one or more category identifiers associated with each related social/geo/promo link category. As described above, each related social/geo/promo link category can be classified under one or more categories. In some implementations, the category identifiers are predetermined. For example, the category identifiers for the related social/geo/promo link categories can be determined before a related social/geo/promo link promotional data set request is served. In some implementations, the category identifiers are pre-computed for the keyword for ads in the social/geo/promo link repository 404.

In some implementations, the learning module 406 also receives web page concepts from the concept extraction engine 408. Web page concepts can also be classified under one or more categories. Category identifiers for the web page concepts can be determined when a related social/geo/promo link promotional data set request is received.

The learning module 406 computes one or more correlation criteria for each related social/geo/promo link category. A correlation measure provides a measure of how "close" or "distant" in correlation two category identifiers are, where the pair of category identifiers corresponds to two related social/geo/promo link categories. If category identifiers are determined for the web page concepts, correlation criteria can also be computed between a category identifier associated with a related social/geo/promo link category and a category identifier associated with one of the web page concepts.

In some implementations, the correlation measure can be computed using statistics accumulated over a large set of documents, (e.g., web pages). For example, the number of instances of a document evoking two category concepts can be determined. The number of instances can be used as a heuristic to measure the correlation between the two categories. That is, the larger the number of instances, the more likely the two categories are similar. Techniques for associating documents and co-occurring category concepts are described in U.S. Patent Publication No. 2006/0242013 A1, filed Oct. 26, 2006, for "Suggesting Targeting Information for Ads, Such as Websites and/or Categories of Websites for Example," which published patent application is incorporated by reference herein in its entirety. The correlation measure is further discussed below.

The social/geo/promo link server 402 receives from the learning module 406 one or more correlation criteria for each related social/geo/promo link category. In some implementations, the social/geo/promo link server 402 also receives the category identifiers from the learning module 406. The social/geo/promo link server 402 generates the same, similar, broad or alternative, social/geo/promo link categories based on the correlation criteria of the candidate social/geo/promo link categories. The same, similar, broad or alternative, social/geo/promo link categories are organized into one or more related social/geo/promo link promotional data set which can be provided by the system 108 to the content marketing impressions server to be combined with the requested content marketing impressions.

In some implementations, the social/geo/promo link server 402 provides the functionality of the learning module 406, including generation or retrieval of the category identifiers and the correlation criteria. In these implementations, the learning module 406 is not part of system 108.

Figure 23:
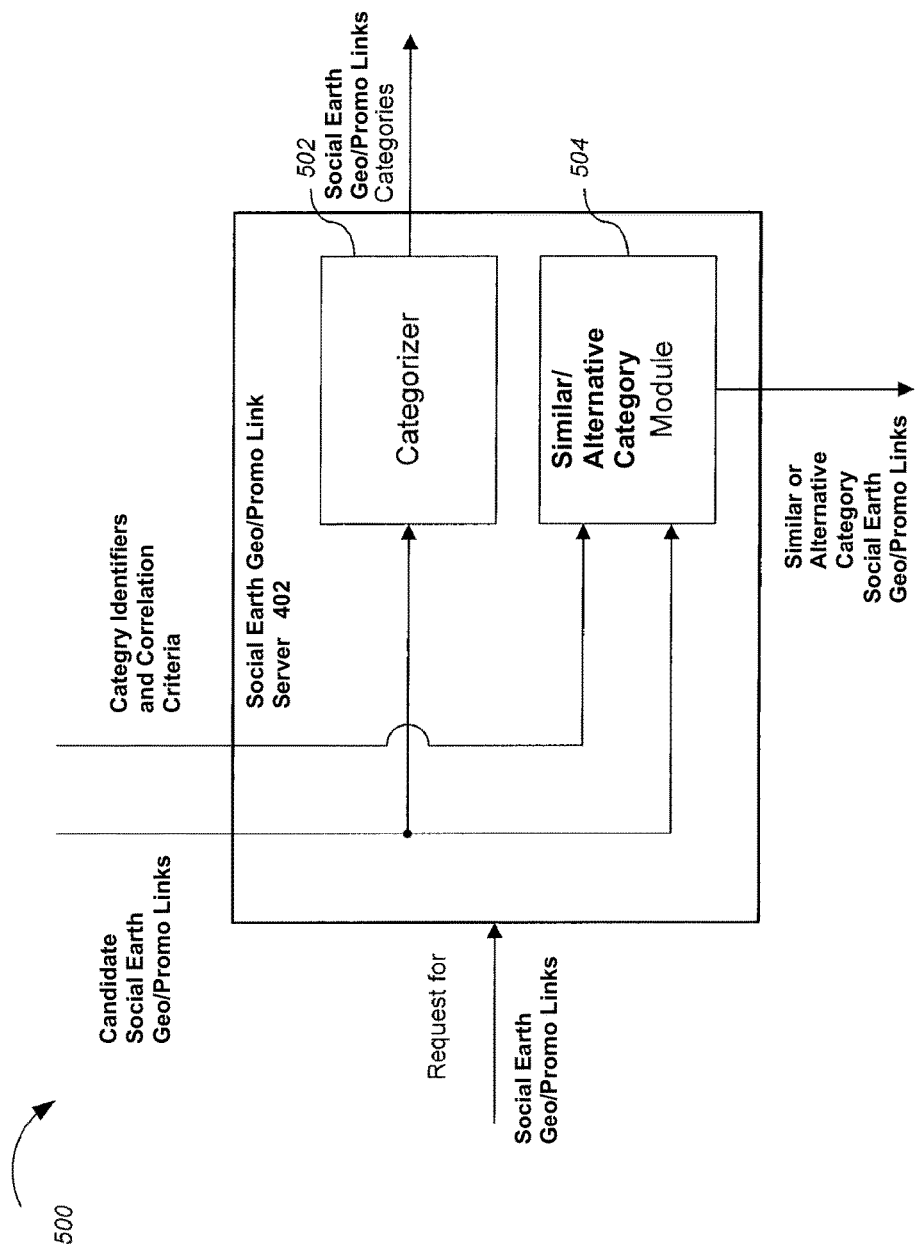
FIG. 23 is a block diagram of an example implementation of the social/geo/promo link server of the present invention.

FIG. 23 is a block diagram of an example implementation 500 of the social/geo/promo link server 402 of FIG. 3. The social/geo/promo link server 402 includes a categorizer 502 and a cluster/anti-cluster module 504.

The social/geo/promo link server 402 receives requests for related social/geo/promo link promotional data set. The related social/geo/promo link promotional data set request may include a number of related social/geo/promo link promotional data set desired and the number of related social/geo/promo link categories per related social/geo/promo link promotional data set. The number of related social/geo/promo link promotional data set desired can be used to determine whether related social/geo/promo link categories should be same, similar, broad or alternative, clusters or groupings.

The social/geo/promo link server 402 receives candidate related social/geo/promo links. In some implementations, the candidate related social/geo/promo links are ordered by relevance to the requested content marketing impressions. The social/geo/promo link server 402 can receive the ordered list of candidate social/geo/promo links. Alternatively, the social/geo/promo link server 402 can receive an unordered list, and the social/geo/promo link server 402 can order the candidate social/geo/promo links by relevance to the requested content marketing impressions using a relevance measure.

The categorizer 502 of the social/geo/promo link server 402 identifies categories for the candidate related social/geo/promo links. In some implementations, the categories are the same as the related social/geo/promo links, and the categorizer 502 is not included in the social/geo/promo link server 402.

The social/geo/promo link server 402 receives one or more correlation criteria for each category. In some implementations, the social/geo/promo link server 402 also receives the one or more category identifiers associated with each category. In some implementations, category identifiers are also received for the web page concepts and are used to cluster or anti-cluster social/geo/promo link categories.

The candidate social/geo/promo links and the correlation criteria are provided as inputs to the cluster/anti-cluster module 504. If the request is for a single related social/geo/promo link promotional data set, the classification of the categories by characteristics, (also called categories) is used to improve the diversity of categories coverage, (alternative category clustering) of the related social/geo/promo link categories displayed in the single related social/geo/promo link promotional data set. If the request is for multiple related social/geo/promo link promotional data set, the classification of the related social/geo/promo link categories by categories is used to cluster related social/geo/promo link categories in one related social/geo/promo link promotional data set in the same category or similar categories while those in other related social/geo/promo link promotional data set are from different categories.

Figure 24:
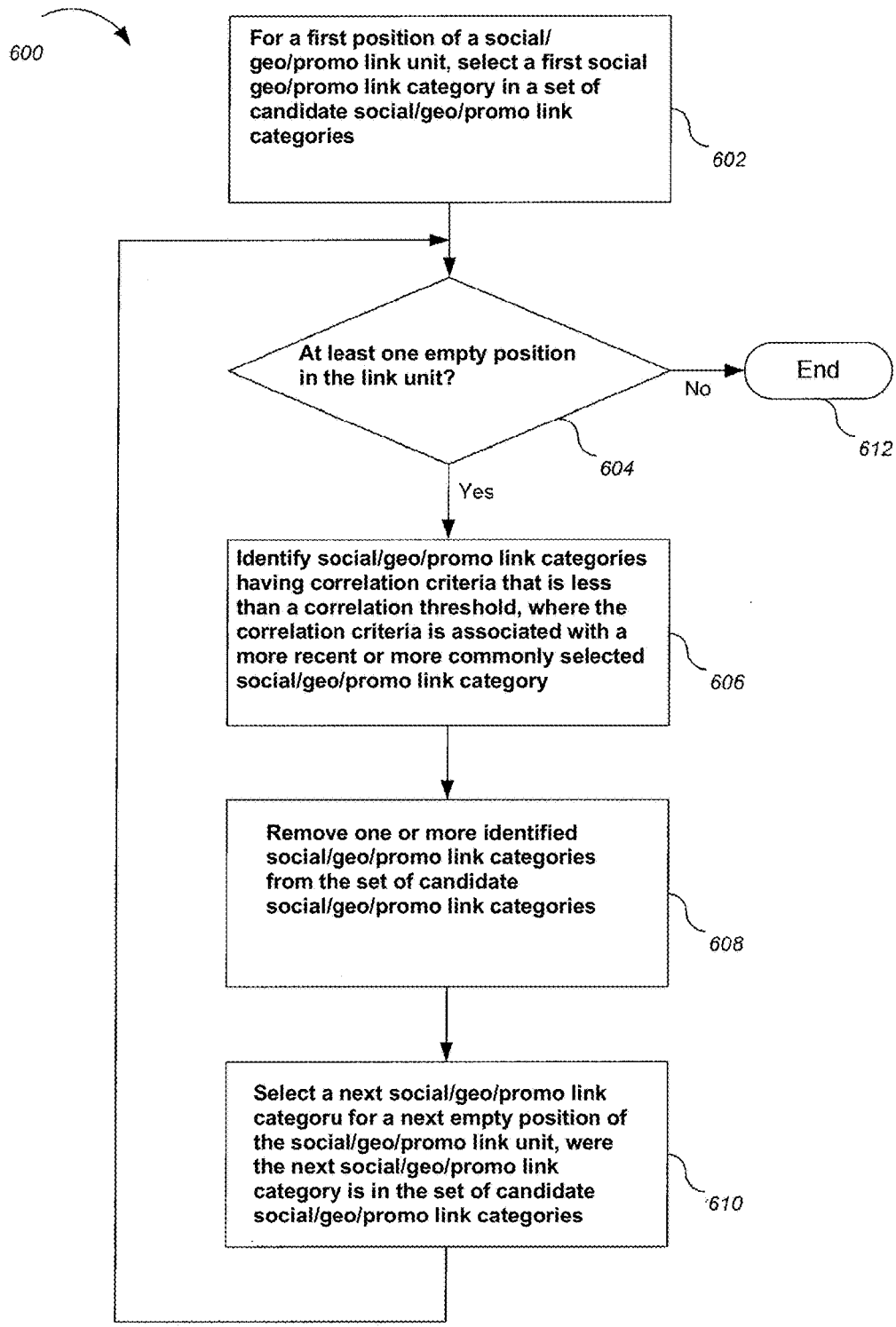
FIG. 24 is a flow diagram of an example process for providing a related social/geo/promo link promotional data set with correlated broad categories.

FIG. 24 is a flow diagram of an example process 600 for providing a related social/geo/promo link promotional data set with anti-clustered categories. The process 600 begins by selecting a first social/geo/promo link category for a first position of the social/geo/promo link promotional data set, where the first social/geo/promo link category is in a set of candidate social/geo/promo link categories, (602). In some implementations, the set of candidate social/geo/promo link categories is ordered according to the relevance of the social/geo/promo link categories to the requested content marketing impressions of the web page with which the related social/geo/promo link promotional data set is to be displayed. For an ordered set of candidate social/geo/promo link categories, the top relevance scoring social/geo/promo link category is selected for the first position of the social/geo/promo link promotional data set. In some implementations, selected social/geo/promo link categories are removed from the set of candidate social/geo/promo link categories.

As an example, the set of candidate social/geo/promo link categories can be ordered by relevance to the requested content marketing impressions of a web page. For a set with the following order: A, B, C, D, . . . , L, category A can be chosen as the most relevant social/geo/promo link category for the first position of the social/geo/promo link promotional data set.

The process 600 determines whether there is at least one empty, (e.g., unfilled) position remaining in the related social/geo/promo link promotional data set, (604). In some implementations, the link unit request can include the number of social/geo/promo link categories desired for the related social/geo/promo link promotional data set. If there are a predetermined number, (e.g., zero) of empty positions remaining in the related social/geo/promo link promotional data set, the process 600 ends, and (612). Generally, a related social/geo/promo link promotional data set is displayed with multiple social/geo/promo link categories.

If there is at least one empty position remaining in the related social/geo/promo link promotional data set, social/geo/promo link categories having a correlation measure that is less than a correlation threshold are identified, where the identified social/geo/promo link categories have one or more correlation criteria associated with the most recently selected social/geo/promo link category, (606). The identified social/geo/promo link categories are in the set of candidate social/geo/promo link categories. In some implementations, the correlation threshold can be predetermined.

In some implementations the correlation measure can indicate the "distance" between the category identifiers of two social/geo/promo link categories. That is, the smaller the correlation measures, the smaller the "distance" between the category identifiers, and the more similar the category identifiers are. For this type of correlation measure, the larger the correlation measure, and the less similar the category identifiers are. Identifying categories that have correlation criteria that are less than a correlation threshold means identifying the categories with a category identifier that is close, (within the correlation threshold) to a category identifier of the most recently selected category.

Alternatively, in some implementations, the correlation measure can indicate the "closeness" of the category identifiers of two social/geo/promo link categories. That is, the larger the correlation measure, the more similar the category identifiers are. For this type of correlation measure, the process 600 would identify the categories having a correlation measure that is greater than a correlation threshold.

Social/geo/promo link categories, which are identified, are removed from the set of candidate social/geo/promo link categories, (608). That is, social/geo/promo link categories that are too similar to the most recently selected social/geo/promo link category are eliminated from further consideration based on the correlation criteria.

A next social/geo/promo link category is selected for the next empty, (e.g., unfilled) position of the social/geo/promo link promotional data set, where the next social/geo/promo link category is selected from the set of candidate social/geo/promo link categories, (610). For an ordered set of candidate social/geo/promo link categories, the next most relevant social/geo/promo link category remaining in the set is selected for the next position of the social/geo/promo link promotional data set.

In some implementations, when the set of candidate social/geo/promo link categories is ordered according to relevance, the correlation criteria for a particular social/geo/promo link category are not compared to the correlation threshold unless the preceding social/geo/promo link categories in the ordered set have already been selected or eliminated. That is, after the first most relevant social/geo/promo link category is selected, the second social/geo/promo link category in the ordered set is selected if the second social/geo/promo link category is not too similar to the first social/geo/promo link category. If the second social/geo/promo link category is too similar, the next social/geo/promo link category in the ordered set is checked for correlation. The process continues until the social/geo/promo link positions of the social/geo/promo link promotional data set are filled.

If there is at least one empty position remaining in the related social/geo/promo link promotional data set, (604), the process repeats steps 606 through 610. The elimination and selection process repeats until a number, (e.g., all) of the social/geo/promo link positions for the related social/geo/promo link promotional data set have been filled. If the number, (e.g., all) of the positions of the related social/geo/promo link promotional data set has been filled, the process 600 ends, (612).

In some implementations, correlation criteria of social/geo/promo link categories can be used to reorder the set of candidate social/geo/promo link categories. That is, instead of or in addition to using the correlation criteria to eliminate social/geo/promo link categories, correlation criteria can be used to boost or lower the order position of a social/geo/promo link category in the ordered set of candidate social/geo/promo link categories. For example, the boosting or lowering can be based on the correlation measure of a social/geo/promo link category relative to the correlation criteria of other social/geo/promo link categories. In this implementation, the ordering of the set of candidate social/geo/promo link categories can account for both relevance to requested content marketing impressions and correlation to previously selected social/geo/promo link categories.

Figure 25:
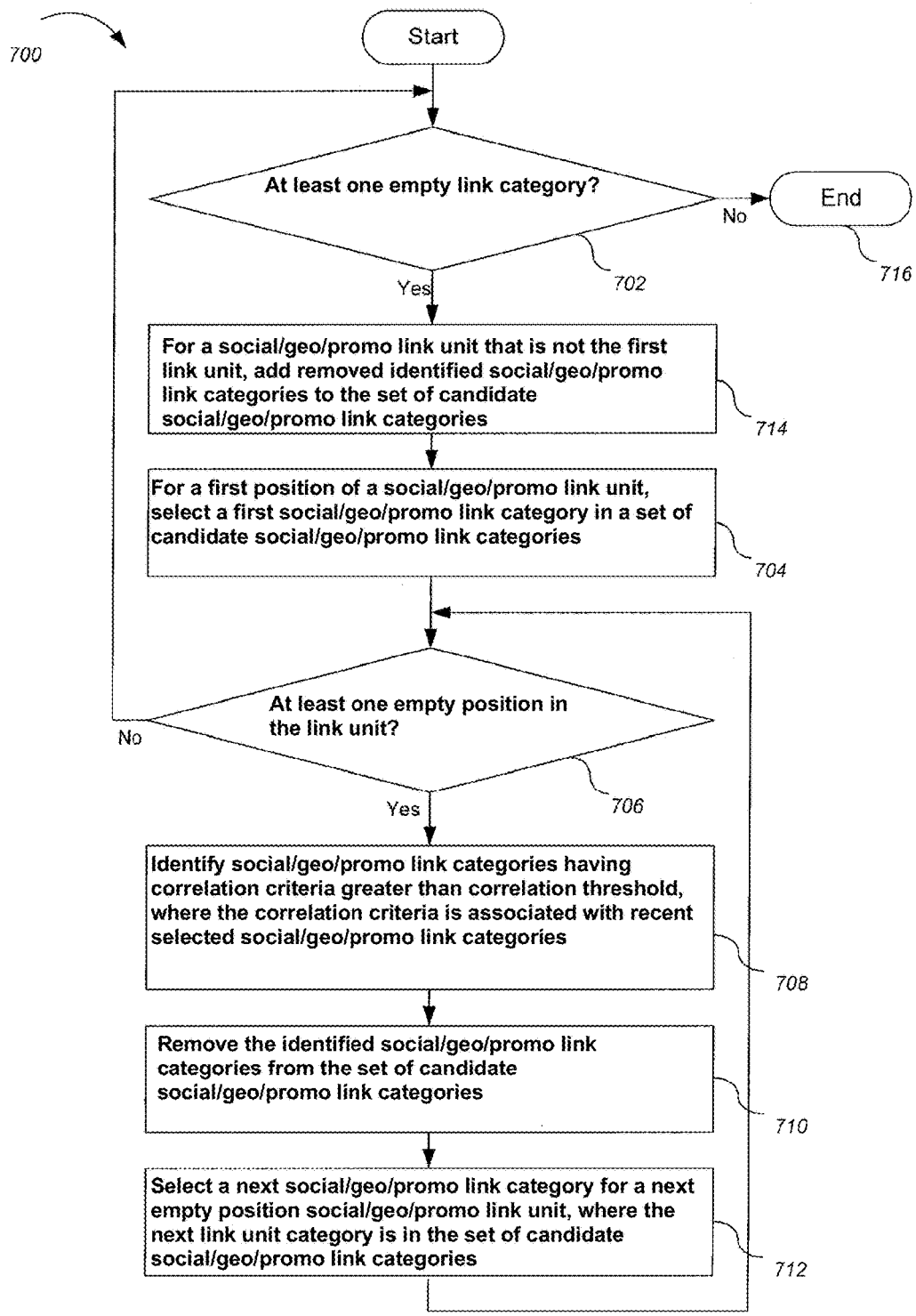
FIG. 25 is a flow diagram of an example process for providing multiple related social/geo/promo link promotional data sets with clustered categories.

FIG. 25 is a flow diagram of an example process 700 for providing multiple related social/geo/promo link promotional data set with clustered categories. The process 700 begins by determining whether there is at least one empty, (e.g., unfilled) related social/geo/promo link promotional data set, (702). In some implementations, the related social/geo/promo link promotional data set request can include the number of related social/geo/promo link promotional data set desired. If there are a predetermined number, (e.g., zero) of empty related social/geo/promo link promotional data set remaining, the process 700 ends, (716).

At the start of the process 700, the requested social/geo/promo link promotional data set have not been filled, so the process 700 continues to the next step to fill the first requested social/geo/promo link promotional data set. A first social/geo/promo link category is selected for a first position of the social/geo/promo link promotional data set, where the first social/geo/promo link category is in a set of candidate social/geo/promo link categories, (704). In some implementations, the set of candidate social/geo/promo link categories is ordered according to the relevance of the social/geo/promo link categories to the requested content marketing impressions of the web page with which the related social/geo/promo link promotional data set are to be displayed. For an ordered set of candidate social/geo/promo link categories, the top relevance scoring social/geo/promo link category is selected for the first position of the first social/geo/promo link promotional data set.

The process 700 determines whether there is at least one empty, (e.g., unfilled) position remaining in the related social/geo/promo link promotional data set, (706). In some implementations, the related social/geo/promo link promotional data set request can include the number of social/geo/promo link categories desired for each related social/geo/promo link promotional data set.

If there is at least one empty position remaining in the related social/geo/promo link promotional data set, social/geo/promo link categories having a correlation measure that is greater than a correlation threshold are identified, where at least one identified social/geo/promo link category has one or more correlation criteria associated with the most recently selected social/geo/promo link category, (708). The identified social/geo/promo link categories are in the set of candidate social/geo/promo link categories. In some implementations, the correlation threshold can be predetermined. Because the social/geo/promo link categories within a social/geo/promo link promotional data set are being clustered, the social/geo/promo link categories with correlation criteria, which are greater than the correlation threshold, are identified. That is, for a correlation measure that indicates "distance," the social/geo/promo link categories with a correlation measure greater than the correlation threshold are the categories that are too diverse to be clustered with the most recently selected social/geo/promo link category.

Alternatively, in some implementations, the correlation measure can indicate the "closeness" of the category identifiers of two social/geo/promo link categories. For this type of correlation measure, the process 700 would identify the categories having a correlation measure that is less than a correlation threshold.

In some implementations, a given social/geo/promo link category in the set of candidate social/geo/promo link categories can have a separate correlation measure for at least one pair-wise combination of a category identifier of the given social/geo/promo link category and a category identifier of the most recently selected social/geo/promo link category. A composite correlation measure can be determined for the given social/geo/promo link category, for example, by taking a maximum, a minimum, or a combination, (e.g., a weighted combination) of the separate correlation criteria for the given social/geo/promo link category. In these implementations, the social/geo/promo link categories, which are too diverse, can be identified by comparing the composite correlation criteria to the correlation threshold.

Social/geo/promo link categories, which are identified, are removed from the set of candidate social/geo/promo link categories, (710). That is, social/geo/promo link categories that are too diverse relative to the most recently selected social/geo/promo link category are eliminated from further consideration based on the correlation criteria.

A next social/geo/promo link category is selected for the next empty, (e.g., unfilled) position of the social/geo/promo link promotional data set, where the next social/geo/promo link category is selected from the set of candidate social/geo/promo link categories, (712). For an ordered set of candidate social/geo/promo link categories, the next most relevant social/geo/promo link category remaining in the set is selected for the next position of the social/geo/promo link promotional data set.

In some implementations, when the set of candidate social/geo/promo link categories is ordered according to, the correlation criteria for a particular social/geo/promo link category are not compared to the correlation threshold unless the preceding social/geo/promo link categories in the ordered set have already been selected or eliminated.

If there is at least one empty position remaining in the related social/geo/promo link promotional data set, (706), the process repeats steps 708 through 712. The elimination and selection process repeats until a number, (e.g., all) of the social/geo/promo link positions for the related social/geo/promo link promotional data set have been filled.

If a number, (e.g., all) of the positions of the related social/geo/promo link promotional data set have been filled, the process 700 returns to step 702. Again, the process 700 determines whether there is at least one empty, (e.g., unfilled) related social/geo/promo link promotional data set remaining, (702). Consider the case, in the second example, where two related social/geo/promo link promotional data set are requested. Because only the first related social/geo/promo link promotional data set has been filled, the process 700 repeats for the second requested social/geo/promo link promotional data set.

Before continuing to step 704, the process 700 adds a number, (e.g., all) of the removed identified social/geo/promo link categories to the set of candidate social/geo/promo link categories, (714). This step is not performed for the first social/geo/promo link promotional data set, because before the first social/geo/promo link position is filled in the first social/geo/promo link promotional data set, social/geo/promo link categories have not been removed from the set of candidate social/geo/promo link categories. For later social/geo/promo link promotional data set, previously removed social/geo/promo link categories are added back to the set of candidate social/geo/promo link categories because, although these categories were too dissimilar to be included in the cluster for the first social/geo/promo link promotional data set, the social/geo/promo link categories for the other social/geo/promo link promotional data set are chosen to be diverse relative to the social/geo/promo link categories selected for the first social/geo/promo link promotional data set.

The process 700 repeats steps 704 through 714 until there are a predetermined number, (e.g., zero) of remaining empty social/geo/promo link promotional data set to be filled. If there are a predetermined number, (e.g., zero) of empty social/geo/promo link promotional data set remaining, the process 700 ends, (716).

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor one of multiple processors or cores, of any kind of computer. Generally, a processor can receive instructions and data from a read-only memory or a random access memory or both. The essential elements of a computer are a processor for executing instructions and one or more memories for storing instructions and data. Generally, a computer can also include, or be operatively coupled to communicate with one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs, (application-specific integrated circuits).

To provide for interaction with a user, the features can be implemented on a computer having a display device such as a CRT, (cathode ray tube) or LCD, (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Online Gambling:

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage transmission or display devices.

Furthermore, usage of the word "gaming," "gambling," "social gaming," or the like, refer to either land-based or online events, activities, games, sessions, rounds, hands, rolls and operations etc., including video games, Web games, casino games, card games, dice games, sporting events and/or any other gaming or gambling events. In addition, the word "bet," "bid" or the like, refer to any type of wagers, bets or gaming ventures that are placed on random events, whether of monetary or non-monetary value.

The present invention provides-a monetary or non-monetary online gaming platform, for enabling online games, gambling, events, activities and/or entertainment, that overcomes the limitations of existing land based and online gaming systems. The present invention provides a platform and method that may separate the actual event, produced by an event generator, and a Web server, (i.e. transaction server), that may communicate with both a player and one or more event generators and may processes the event data such that a player may place bets on the outcome of one or more events produced by one or more event generators. This separation, together with the integration of additional server components, may enable a network-based game management center, (hereinafter referred to as a virtual House" or just "House" to monitor the results of events from a plurality of event generators in real time, and manage data streams from one or more event generators simultaneously, whether the events are land-based and/or network-based, (virtual). One or more players, or groups of players, such as user/consumer groups, may monitor, analyze and play one or more events related to one or more Event generators.

According to at least one embodiment of the present invention, an event monitor such as a digital reader may be connected, associated with and or otherwise collect data from one or more event generators and may digitize and/or transmit to the transaction server data indicative of events which may occur on the one or more event generators.

According to further embodiment of the present invention, image and/or video information, digital or analog, may be collected from or near an event generator, and a pattern recognition unit may analyze the image and/or video information from one or more event generators such that the pattern recognition unit may produce a signal indicative of the events which may have occurred on the one or more event generators. Image and/or video information may be collected and transmitted via analog and/or digital communication channels. The image and/or video information may be collected by a video camera, web-cam, still digital camera, or any other suitable device or system known today or to be devised in the future.

According to some embodiments of the present invention, a person or persons may monitor a game event generator and may manually enter and/or transmit game event data to the transaction server. According to some embodiments, the image and/or video information collection device, (e.g. video camera) may be controlled by a computer associate with the pattern recognition unit such that the device is positioned and focused onto those areas of the one or more event generators most relevant at a given moment. For example, during the time bets are places on a roulette table, the image/video collection device may be positioned so as to acquire clear images of the roulette tables bet placing area, and during the spin of the ball, the camera may be repositioned to get a clear view of the ball and the number where it lands. According to some embodiments of the present invention, a person or persons may receive location-based promotions, location-based offers, location-based coupons, promotions or offers in connection with an online or mobile news feed or distribution of mobile or, (wi-fi networks) or computer, online coupons, position-based services, ad links, location-based promotions, location-based offers, location-based coupons, promotions or offers in connection with an online or mobile news feed, discount ad impressions, merchant ad impressions, email coupon impressions, location-based advertising, mobile location-based advertising and promotions or offers and marketing impressions, real-time, geo-targeted or geo-tagged advertising and distribution of mobile promotions, online coupons, promotions, offers, social, local, mobile search, mobile services, mobile location-based advertising and promotions, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services based user's or member's profile and/or lifestyle preferences and preferred locations, interests, preferences or networking interests or connections or channels.

There is provided, in accordance with at least one embodiment of the present invention, an application, system and method for automated conversion of image and/or video based gaming data, or data from a reader, digital or analog, into usable statistical data, thereby enabling one or more players to participate using both historic and real time gaming information from one or more games and/or event generators, whether the games are online or offline, (e.g. land-based). According to further embodiments of the present invention, statistics may be compiled from game event-data collected, whether the data was collected manually through automated means such as a digital reader, video collection device, or the like.

As part of some further embodiments of the present invention, part or all of a specific player's playing history may be recorded and statistics relating to the player's gaming activities may be compiled and presented to the player on demand. A player may use these statistics in making future gaming decisions or developing a gaming/betting strategy.

There is also provided, in accordance with at least one embodiment of the present invention, a transaction server or system for players to place bets based on the outcomes of one or more specific games, whether the games are physical or virtual. These bets may be based on standard game results or on alternative elements or derivatives related to the game progress or results.

According to some embodiments of the present invention, a player may instruct a virtual betting agent to monitor one or more event generators and one or a set of events taking places to place one or more bets associated with one or more game event generators, online casino, online sports betting, NBA, college basketball lines, football, soccer. According to further embodiments of the present invention, a player may place a bet on some combination of game events occurring one or more game event generators, either over some period of time or over some number of games or game events.

According to some embodiments of the present invention, the transaction server may include a risk management unit which may stop or terminate the acceptance of bets from players one or more game events associated with one or more event generators when it is determined that exposure to potential losses by the House exceeds some threshold value. Different risk management units may apply to different groups of player and different groups of event generators.

Figure 26:
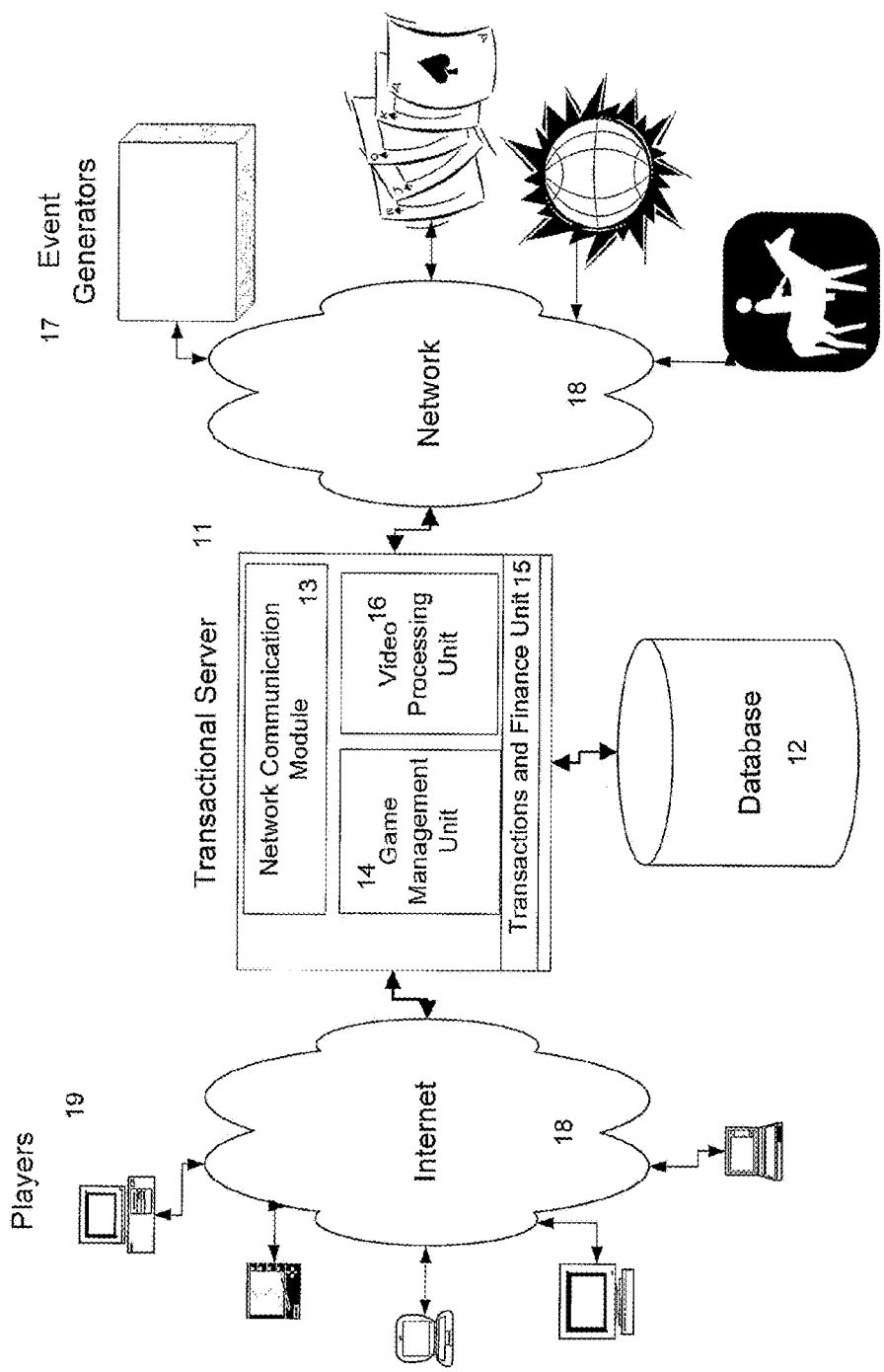
FIG. 26 is a diagram illustrating some components of an online gaming platform according to at least some embodiments of the present invention.

Specifically, reference is now made to FIG. 26, which is a monetary or non-monetary online gaming platform or system, generally designated 10 according to at least one embodiment of the present invention, for enabling online games, gambling, events, activities and/or entertainment. In FIG. 26 is shown a Transaction server, (TS) 11, operationally connected to at least one database 12. The database 12 may store player account data, game data for each gaming event, (from all the Event generators, which are described below), player activity and history data, player participation data, player preferences data, House data, and any other data that is relevant for performing the operations of the platform 10. The TS 11 is also operationally connected to at least one Event generator, ("EG") 17, such as a land-based, (physical) or online, (virtual) video game, computer game, chess game, bingo game, roulette table, blackjack table, one-arm bandit machine or sporting game or any other game, entertainment event and/or gambling event that typically produces a random or indefinite result that may be bet or bid on. An EG may include a mechanism for maintaining, monitoring, implementing or otherwise generating events, as well as a mechanism for enabling transmission of event data relating to individual events, (games/tables/machines etc.) to the TS 11. This data may be in the form of data signals that transmit game results, audio streams; images, video streams of actual event recordings, or any other data format that represents monitored events. The EG 17 may include data reading and transmission tools, devices or systems to transmit event data. Such tools may include electronic or mechanical mechanisms to read analog and/or digital data generated by the EG 17, and transfer this data to the TS, 11. Other examples of such a data reading devices may include optical readers, commonly known in the art, that are typically used in roulette tables, and or Video cameras. A video camera or any alternative reader may transmit data digitally either over a digital channel or over an I.P. network using digital packets.

The TS 11 may be connected to an EG 17 through a wireline and/or is wireless data network, such as the Internet 18, a company Intranet, and/or Extranet, using communications mediums including cable TV networks, satellite networks and cellular communication networks. Such network connectivity may enable interactive communications between players 19, the platform 10 and the Event generator(s) 17. According to an alternative embodiment of the present invention, the EG(s) 17 may be geographically connected to the TS 11, such as in the case where the EG(s) 17 are virtual, (computerized) EG(s) connected to the TS 11. Players according to some embodiments of the present invention, may interact with the platform using any type of computing and/or communication device, including personal computers, PDAs, mobile telephones, interactive TV, wearable computers, notebook computers, etc.

Transaction server, ("TS") 11, according to some embodiments of the present invention, may provide a platform and system that may separate an actual event, produced by an Event generator, and the server, that communicates and processes the event data, (Transaction server). This separation, together with the integration of additional server components, enables the implementation of a virtual House that h monitor the results of events from a plurality of Event generators, (in real time), and manage the data from one or more Event generators simultaneously, whether the events that have been generated are land-based and/or virtual. The House subsequently may enable one or more players, or one or more groups of players, such as user/consumer groups, to monitor, analyze and wager one or more events produced by one or more EGs simultaneously, whether the events are land-based and/or virtual. The House furthermore may enable one or more players to monitor and interact with one or more external activities, events or gaming sessions, (hereinafter referred to as "events"), and "play" these events with the House and/or one or more other players.

The above stated functions of the TS 11 may be achieved by receiving event data from one or more EGs 17 and directing the event data to the various components of the TS 11, to the database 12 and to the players 19. Event data may be in the form of data signals representing event results of individual events, or actual recorded data streams, such as video streams, that capture the actual events. In this way players are able to monitor and interact with a plurality of external games or events simultaneously. Players 19, according to the present invention, may be operating any network enabled interactive computing or communications device. The present invention, furthermore, enables a plurality of players to play against the House, to play against each other, or to form teams whereby the teams may play against each other and/or against the House.

According to some embodiments of the present invention, one player or group of players may bear the financial risk for the bets of another player or group of players. In some games according to some embodiments of the present invention, where players compete against each other, for example poker, each player or team of players may bet against each other. In other games, a player or group of players may act as the House for another group of players, where the group representing the house may benefit from the losses of the second group and may be responsible for payment resulting from the wins of the second group.

The TS 11 may further contain a Network Communication Module, (NOM) 13, with server functionality, for receiving and transmitting data between the TS 11 and Event generators, (EG) 17, and between the TS 11 and the players 19. The NCM 13 may include a security layer for enabling, (secure) communication of data to and from the TS 11. The security layer may incorporate relevant security hardware and/or software for protecting data against unauthorized access and keeping the network secure from intruders etc.

The TS 11 may further contain a Game Management Unit, (GMU) 14 for managing various operations within the TS 11, and for enabling interaction between the TS 11 and the EG(s) 17, and between the TS 11 and the players 19. The GMU 14 may also provide a graphic user interface (GUI) that presents event data to the players and enables the players to monitor progress of relevant events, manage accounts, and give commands to the TS 11, such as bidding preferences and rules. According to a further embodiment of the present invention, the GUI may provide a split screen that divides the player's display device, (which may include a PC monitor, interactive TV screen, cellular phone panel, PDA screen or any other display device) into several windows, each one displaying the progress, results and/or statistical data for at least one individual game. Such a GUI may thereby simultaneous provide viewing, analyzing, bidding and/or managing options to a player over a plurality of games or events.

In addition, the TS 11 may include a Transactions and Finance Unit, (TFU) 15, for managing of players accounts as well as authentication and implementation of financing and payouts etc. for players. The TFU 15 may be adapted to support any financial systems and payment methods, including online, (Internet based) accounts, credit card accounts, token accounts, ATM accounts, e-bank accounts, or any other player accounts, whether "money" based or "non-money" based accounts. According to at least one embodiment of the present invention, the TFU 15 may request initial deposits, (of money or tokens etc.) in an account. The TFU 15 may verify that the deposit satisfies House rules. Examples of such House rules relating to deposits include but are not limited to: minimum and maximum deposit amount, authentication of the depositor identity and eligibility, and any other deposit related rules and/or regulations determined by the House. Once this deposit has been made, the account may then be credited or debited in real time, according to the bids placed by players or payouts received by players. According to this embodiment, each bid or wager made may be verified by the TFU 15, which queries the player account before confirming a bid, to determine available resources to cover the cost of the bid.

According to a further embodiment of the present invention, the TS 11 may be operationally connected to a player's financial institution, credit/debit card account, e-bank, credit-card processing center or any other financial transaction center. This embodiment may enable player participation with the platform 10, while the platform 10 is indirectly connected to the player's account. In this way, the TFU 15 may manage each player's online account, including, but not limited to, the following functionalities: verifying player identity; authenticating financial ability of players; securing payments for bids; and implementing deposits of payouts etc.

According to an additional embodiment of the present invention, in the case where EG 17 is equipped with multicasting software, the TS 11 may enable a player 19 to configure the platform 10 to route video event data or other game data from: EG 17 directly to at least one player 19. In this way, video data or alternative gaming data may be received and processed by one or more players 19, in addition to, (but not necessarily by) the TS 11.

According to a further embodiment of the present invention, the TS 11 may contain a Video Processing Module, (VPM) 16 that may enable processing of video data received from EG 17. This VPM 16 may incorporate a video recognition module together with video data analytics software, thereby enabling the VPM 16 to recognize, filter, format and/or analyze etc. raw video data streams from one or a plurality of EG(s) 17, thereby converting such raw data into player-usable data. Any data recognition and conversion tool may be used for this purpose. An example of such a data recognition and formatting tool has been described in U.S. Pat. No. 6,339,773, which is incorporated by reference in its entirety. The '773 patent describes a tool for converting data from a received format into another chosen format, and subsequent transmitting or embedding the format. Where necessary, this tool also describes reformatting the data in its original format.

Such video data from EG 17 may alternatively be acquired directly from a security apparatus such as security video cameras that are located in close proximity to an individual event generator. An example of such video-based security apparatus is the NiceVision series of applications, from NICE Systems Ltd., (NICE Systems Ltd., 8 Hapnina Street, P.O Box 690, 43107 Ra'anana, ISRAEL.

According to a further embodiment of the present invention, the TS 11 may contain an Audio Processing Module, (APM) that enables processing of audio data received from EG 17. This APM may incorporate an audio recognition module together with audio data analytics software, thereby enabling the APM to recognize, filter, format and/or analyze etc. raw audio data streams from a plurality of EG(s) 17, thereby converting such raw data into player-usable data. Any data recognition and conversion tool may be used for this purpose.

According to a further embodiment of the present invention, the TS 11 may contain an Image Processing Module, (IPM) that enables processing of image data received from EG 17. This IPM may incorporate an image recognition module together with audio data analytics software, thereby enabling the IPM to recognize, filter, format and/or analyze etc. raw image data streams from a plurality of EG(s) 17, thereby converting such raw data into player-usable data. Any data recognition and conversion tool may be used for this purpose.

Figure 27:
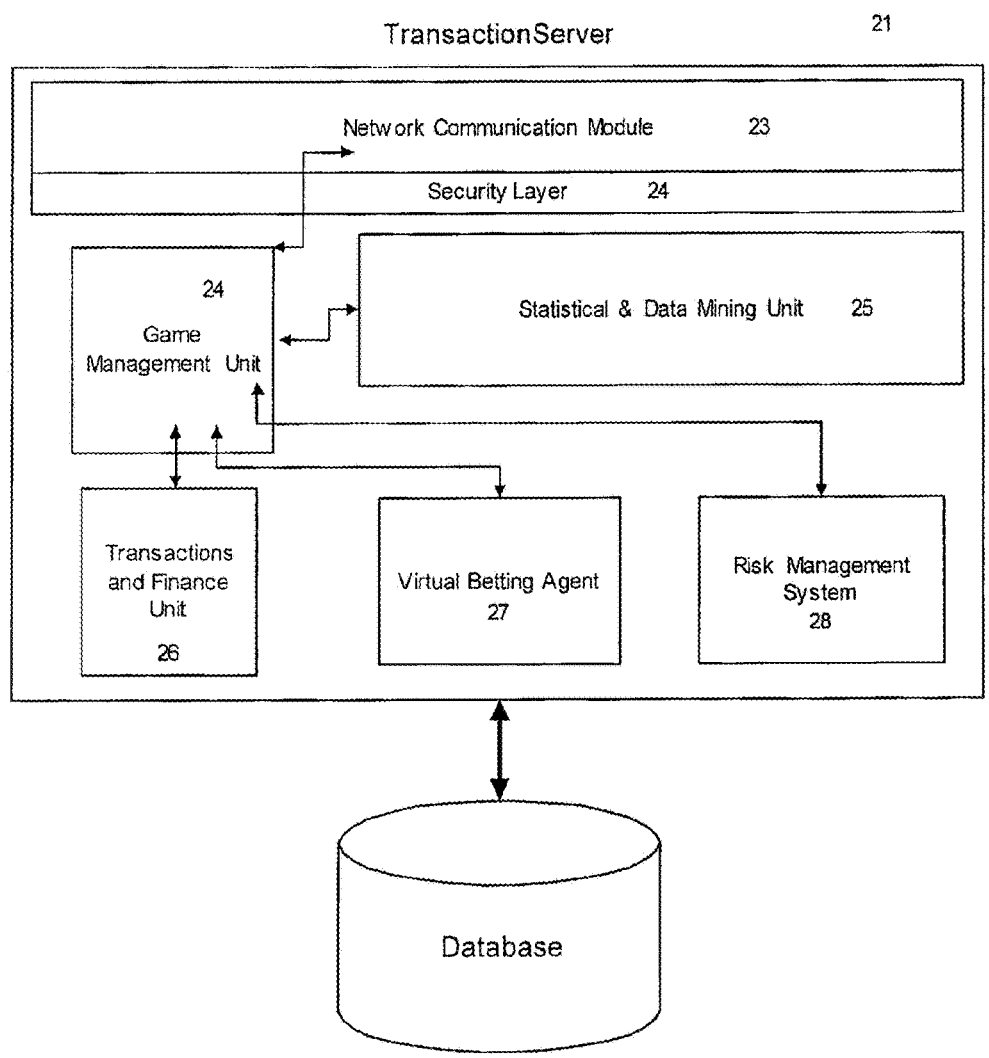
FIG. 27 is a diagram illustrating some components of a transaction server according to some embodiments of the present invention.

Reference is now made to FIG. 27, which illustrates the Transaction server, (TS) 21 according to at least one additional embodiment of the present invention. The TS, 21 may contain a security layer 24 for enabling secure communication of data to and from the TS 21.

According to an additional embodiment of the present invention, the TS 21 may contain a Statistics and Data mining & analyzing information Unit, (SDMU) 25, for processing event data from a plurality of EG(s) 17 using statistical and data mining & analyzing information tools, such that raw or primary event data is converted to usable data for the players and the platform 10. There are many tools known in the art for undertaking statistical analysis and data mining & analyzing information on data. Such provision of gaming data may be provided to players on a continual and real-time basis. According to another embodiment of the present invention, the TS 21 may contain a Virtual Betting Agent, (VBA) 27 for enabling personal configuration of gaming rules and conditions by players. The VBA 27 may be configured, for example, to limit the bid amounts, determine maximum game times, exiting criteria, profit and loss limits and any individual conditions, (e.g. in "a" event, do "b") etc. An example of a configuration of loss and profit limits is in the case where the player determines that his/her bids can be placed automatically, until such a time that a determined loss or profit limit has been reached, at which time the player's participation in a game may be automatically discontinued. Further examples of options enabled by the VBA 27 include selecting future bets on games/events and/or derivatives of games/events. For example, a player may use statistics to determine that game has more chance of winning the next 5 rounds than game 2. Player may then place a bet on game 1, against game 2, in relation to the results of the 5 upcoming rounds. Another example is where player desires to bid for a derivative occurrence in game 3, such as on the probability that the next card is "white". In this way, players may configure rules for automatic betting based on actual game results or derivative information from game data, which is derived from analyzing game progress and/or results to develop new sets of events based on the probability of events happening. By enabling the above, the VBA 27 may provide a stock-exchange type of environment of individual events or games, where players may bet on the probabilities of particular events occurring or future successes of individual events, such that each individual event has a kind of market capital that may be bet on.

According to a further embodiment of the present invention, the VBA 27 may enable at least one player to play against at least one other player. This player-to-player option is particularly, but not only, relevant in the context of future bets, wherein players may bet against other players on the chances of selected events transpiring. The TS 11 may monitor the requests and references of a plurality of players, and optionally the combination of two or more players in player groups, thereby providing player(s)-to-player(s) betting opportunities. As in the typical player-House interactions according to the present invention, betting occurs, results of events are acquired, and payments are implemented by the TS 11 according to the event results.

According to a further embodiment of the present invention, the TS 21 may contain a Risk Management System, (RMS) 28, for enabling the House to manage event risks between various events and/or for the House operations as a whole. For example, the House may determine that any EG 17 that has lost more rounds than it has won within any 50 game routine must be discontinued, or that the entire house should cease activity if a certain amount of money has been lost in a determined period. The RMS 28 may enable the House to see the total exposure or risk at any given moment, and to cease activities at any moment, to limit bets or to freeze payouts etc.

Figure 28:
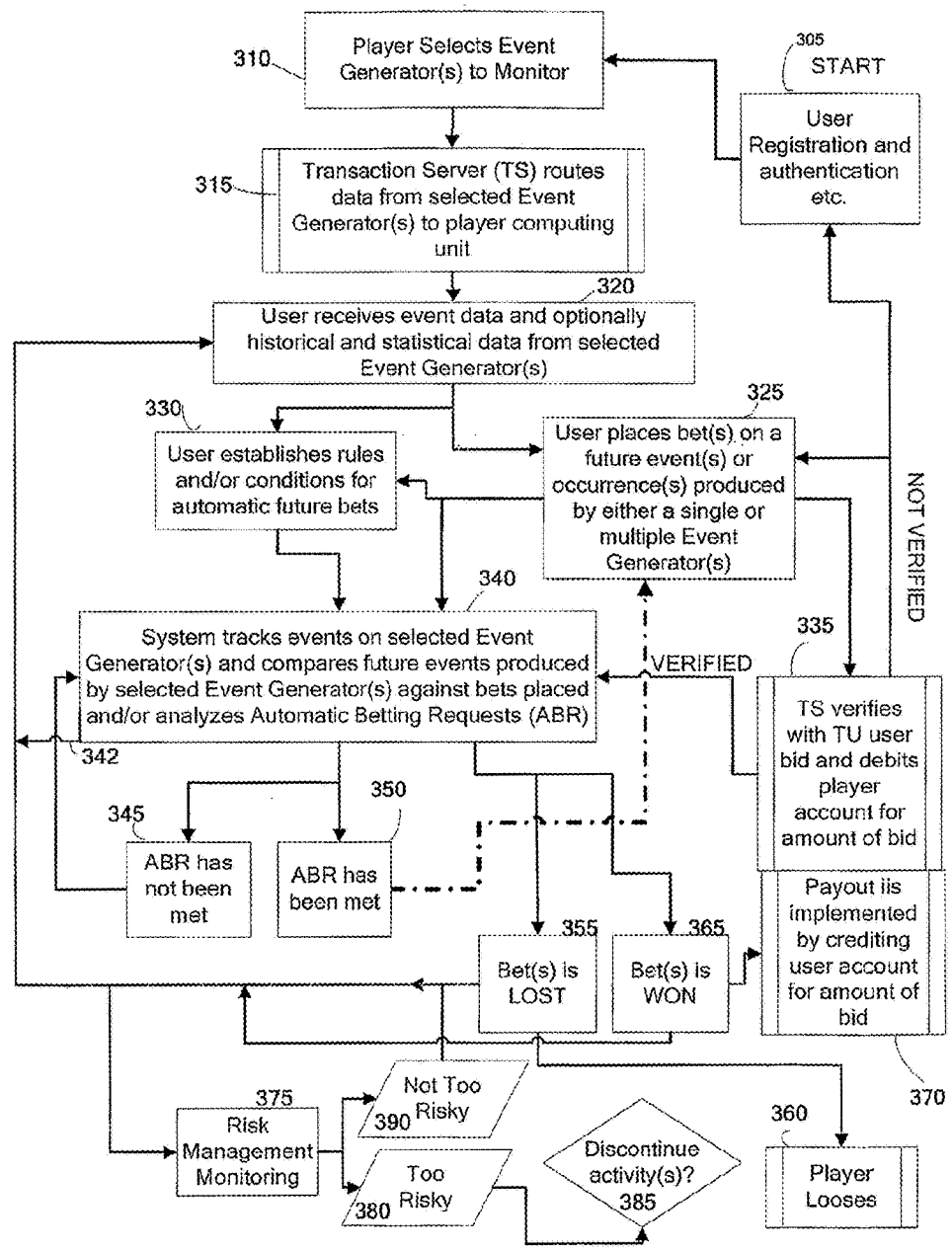
FIG. 28 is a flowchart illustrating steps which may be performed according to one or more methods associated with some embodiments of the present invention.

FIG. 28 is a flowchart that illustrates an example of steps performed according to at least one process of the present invention. As can be seen in the figure, user 19 initially registers with the system 305, and subsequently utilizes the platform front-end, (such as a House Website, as presented by the GMU 24) to select 310 one or more EG(s) for monitoring. The registered player is typically required to log in to the platform 10, optionally by using a keyword, biometric data or any other necessary private code or key. The player 19 may subsequently view the various available events and/or manage his/her portfolio of gaming events, adding or deleting events in which he or she is playing or monitoring. Once the player determines, for examples which games he or she would like to monitor play, the relevant data is routed from the selected is EG(s) to the player 19 computing device. This touting of event data is typically implemented by the GMU 24. The player 19 subsequently receives 320 event data, and optionally historical and statistical data, from selected Event generator(s) 17. He/she then places bet(s) 325 on a future event(s) or ongoing events produced by; either a single or multiple Event generator(s). These bets may be monetary and/or non-monetary: bets. Additionally or alternatively, the player 19 may establish rules and/or conditions 330 for automatic future bets, optionally using a Virtual Betting Agent, (VBA) 27, for enabling personal configuration of gaming rules and/or conditions by players. Betting conditions may include, for example, bid ceilings, payout ceilings loss limits, time limits, and particular event limits etc. Particular event limits may include, for example, a rule that in the case of "x" wins by the House, player game is immediately suspended. After bets have been placed, TS 21 may authenticate the user and verify the user bid with the Transaction and Finance Unit, (TU) 26. The bid amount may be extracted from 335 the player's account or credit card etc., to confirm the bid placement.

In either of the above scenarios, the system subsequently tracks events on selected event generator(s) and compares generated, (future) events produced by selected event generator(s) against bets placed, to derive bidding results and/or analyze Automatic Betting Requests, (ABR) 340. The latter process determines whether the ABR(s) have or have not been met, and thereby indicates whether the player's conditions for the placing of a bid have been met. In the case where the ABR have not been met, the system continues tracking events or games 340, until such a: time as the ABR are met. When the ABR has been met, the system informs the user, and returns to request confirmation of bid placement by the player 325. The above event tracking and comparing processes 340, in the cases where bets have been placed, provide the results for the event(s) that the players have bid on. In the case where the bet is lost, the game ends 360. In the case where the bet is won, the payout, which may be a monetary or non-monetary payout, is generated, and the payout or game prize, whether monetary or non-monetary, may be transferred from the House to the player account 370. The player account may be a "money" account or a "non-money" account, where bonuses coupons, incentives etc., may be deposited and/or withdrawn. According to a further embodiment of the present invention, a conversion may be implemented, in any of the above gaming scenarios, to convert non-monetary deposits into monetary deposits, or non-monetary accounts into monetary accounts, or vice Versa. The user may be authenticated before the payout is made, (credited) to the user's account. In the case where the user is not authenticated, the user may need to reregister or otherwise prove his/her identity 305. Alternatively, the player may return directly to step 325 and place one or more additional bets. The results of the event tracking and comparing processes 340 are typically sent to the user 342, enabling the user to determine if he/she wishes to continue interacting with the particular event played, (i.e. step 320), without having to start from step 310.

According to at least one embodiment of the present invention, a Risk Management System, (RMS) 28 may be provided to enable the House to determine risk limits. The RMS 28 may monitor 375 the results of steps 355 and/or 365, (which relate to the event results) or any other steps in at least one gaming process, from one or more EG(s) 17, to determine whether the House determined risk ceiling has been met for the House in general, or for one or more EG(s) 17. In the case where a determined risk limit has been met 380, TS 11 may act to discontinue 385 one or more activities, such as player bids or payouts, and/or the general functioning of the House, in accordance with the predetermined rules. In the case where a determined risk limit has not been met 390, the gaming process may be continued. The RMS 28 may monitor the House risk at any time, during all or any processes. The example illustrated in FIG. 28 is but one alternative of where the RMS 28 may implement monitoring.

According to at least one embodiment of the present invention, the receiving 320 of event data and, (optionally) historical and statistical data from selected Event generator(s) 17 may be enabled by the Statistics and Data mining & analyzing information Unit, (SDMU) 25. The SDMU 25 may enable processing of event data from a plurality of EG(s) 17 using statistical and data mining & analyzing information tools, such that raw or primary gaming data may be converted to usable data for both the players and the platform 10.

According to at least one embodiment of the present invention, the establishment of rules and/or conditions 330 for automatic future bets may be implemented using a Virtual Betting Agent, (VBA) 27. The VBA 27 may enable personal configuration of gaming rules and/or conditions by players.

According to a further embodiment of the present invention, a method is provided for enabling a land-based House to provide event betting to remote players. According to at least one version of this embodiment, as can be seen with reference to FIG. 26, the land-based House may convert at least one existing event or game into an EG 17. The land-based House may also provide a TS 11. The EG 17 may subsequently transfers event results to the TS 11, using a network, whereby the events may be processed and transferred to one or more remote players 19. The remote players 19 may subsequently interact with the existing events, by monitoring events, analyzing event statistics, and placing bets and/or setting betting conditions and rules using a GUI provided by the TS 11.

According to a further embodiment of the present invention, a method is provided for enabling a non-monetary gaming platform, wherein step 335 is ignored. In this case, once the user has placed a bid, the system may automatically track the selected events 340, without requiring financial verification.

According to a further embodiment of the present invention, a method is provided for enabling the data and/or results of at least one event generator 17 to be at least partially owned, possessed or otherwise purchased by at least one user, whether the user is an individual, group, partnership, company, incorporation or any other entity, and whether the user is participating in the events or not participating in the events. This embodiment thereby enables users or members to have interests or rights in the data and/or results of at least one Event generator 17.

Potential Aspects or Elements of the Claimed Invention that can be Optionally Excluded or Negatively Claimed.

The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more, or any combination of any component or step disclosed herein, e.g., but not limited to any one or a combination of: a method, apparatus, computer readable medium, computer system, wireless or wired network, or system to provide a delivery system for advertisers, brands and/or other third parties to conduct advertising using mobile or internet promotions' or offers' impressions tracking and analysis, location information, 2D and 3D mapping, social media, and user behavior and information, for generating mobile and internet posted promotions or offers for, and/or sales of, products and/or services; a method for generating mobile, wireless, and internet posted, location based, customized promotions or offers for products or services, using (i) impressions data, (ii) location information data, (iii) 2D and 3D mapping data, (iv) user internet activity data; and (v) social networking interaction data, the method comprising: (a) electronically assigning, on an electronic computing system via a processor, a unique identifier to a user of a client mobile device or client computer receiving a request from said user, through a client application operating on the client mobile device or computer, to access a location based, customized, promotions website, the request including the identifier assigned to the user or the client; (b) electronically providing to said user, via a mobile or wireless device or computer, mobile and internet posting of said location based, customized, promotions on said promotions website for products or services, wherein said location based, customized, promotions or offers are selected for said user based on data comprising: (i) impressions data comprising tracking and analysis of website access of said user's, target markets' users, and demographic groups; (ii) location information data relating to selected (a) users, target markets, and demographic groups; (b) product or service or service providers; and (c) points of interest near said users, target markets, demographic groups, or product or service or service providers; (iii) 2D and 3D mapping data of selected: (a) user, target market or demographic group locations; or (b) product or service or service provider locations; (iv) user internet activity data relating to searching, browsing, purchases, and interests; and (v) social networking data of interactions between said user and other users, target markets, and demographics groups.

The invention can provide wherein said selection of said for said user comprises electronically collecting and analyzing behavior information of said user, said behavior information comprising: (a) said impressions tracking and analysis; (b) said location information; (c) said 2D and 3D mapping; (d) said user internet activity; and (e) said social networking interactions;

wherein said location based, customized, promotions or offers are selected from the group consisting of a coupon, an advertisement, a location-based promotion, a location-based offer, a location-based discount, a daily deal ad, location-based advertising, a location-based ad, a location-based deal or offer, a mobile ads, a mobile ad network, mobile advertising, mobile location-based advertising, a customer loyalty card, a discounts, a promotion, an offer, a location-based promotion, location-based offer, an online or mobile coupon or promotion, mobile location-based advertising, a promotions or offers associated with a location or a map, a location-based mobile coupon, a mobile grocery coupon, a mobile ad products, a targeted mobile ad, a mobile advertising network, and a mobile coupon;

wherein said mobile device or wireless device is selected from the group consisting of a smart phone, a tablet device, a cell phone, a mobile internet device, a netbook, a notebook, a personal digital assistant, an internet phone, a holographic device, a holographic phone, a cable internet device, a satellite internet device, an internet television, a DSL internet device, and a portable internet access device or computer;

wherein said first promotional data set further comprises one selected from statistics regarding donations, humanitarian aid and sustainable gifts made by the end users or members or other end users or members;

wherein said method further comprises providing said first promotional data set to said end users or members, other end users or members, or advertisers, third parties, and wherein said impressions include social impressions;

wherein said method further comprises (a) said user designating a portion of a purchase of said product or service, or providing links; or (b) providing said user with websites for organizations or companies that provide charitable contributions, humanitarian aid, sustainable gifts or loans;

wherein said product or service is a brand merchant or retailer for user/consumer, products, e-commerce, retail, media & entertainment, business, government, sports, travel & hospitality, real estate, educational services, sport services, entertainment shopping services, online gambling services, online penny and online auction services, service provider services, business center services, or affiliate services;

wherein said access in step (a) is subject to identity verification;

wherein social networking is provided as one selected from social shopping, social networking interactions, access to social networking websites or third party websites or applications, social plugins, social or business applications, SSLs, cookie and mobile cookie, browser cookie, advertising cookie, cookie-based targeting, flash cookie, location-based cookie and other third party cookie, and embedded advertisements;

wherein said promotion or offer or service comprises job or employment services, or educational services;

wherein said method further behavior information further comprises behavior tracking social media communications online or mobile with other social networks online or mobile, ad click impressions, profile targeting impressions, profiles of users, open source impressions, engagement impressions, media, search, video, mobile, cross-media and e-commerce impressions and mobile searches;

wherein said promotions or offers are paid for by mobile or internet based payments from users or members, publishers, marketers, user/consumers and other third parties;

wherein selected promotions or offer automatically give users discounts on their purchases at participating merchants that generate marketing and mapping relationships between members of a social network or website and third party websites or applications;

wherein selected promotions or offers, coupons, products or services automatically populate a social network, a user page or website based upon the user's profile and/or lifestyle preferences;

wherein selected online coupons, position-based services, ad links, location-based promotions, location-based offers, location-based coupons, promotions or offers in connection with an online or mobile news feed. The invention can provide wherein said media used in said promotions is selected from the group consisting of live or pre-recorded audio or video media and wherein purchase of a product or service automatically give users discounts on their purchases at participating merchants;

a method for providing social shopping in combination with 2D and 3D geospatial map interactive displays and social networking, said method comprising: (a) collecting and analyzing initial end user or member data via a processor on a computer or mobile device to provide initial end user or member data sets, said initial end user or member data sets comprising: (1) initial end users' or members' impressions data comprising tracking and analysis of website access of users, target markets, and demographic groups, (2) user or member profile data; (3) location information data relating to selected (a) users, members, target markets, and demographic groups; (b) product or service or service providers; and (c) points of interest near said users, members, target markets, demographic groups, or product or service or service providers; (4) 2D and 3D mapping data of selected: (a) user, member, target market or demographic group locations or location interests; or (b) product or service provider locations; (5) user or member internet activity data relating to searching, browsing, purchases, and interests; (6) social networking data of interactions between users or members through networking interests or connections or channels, target markets, and demographics groups; and (7) generate marketing and mapping relationships between members of a social network or website; (b) generating, via a processor on a computer system or mobile device or wireless device, first promotional data sets from said initial end user data sets, said first promotional data sets comprising first sets of customized promotions or offers that are provided as 2D or 3D geospatial map interactive displays, said first set of location based, customized, promotions relating to products or services of said product or service or service providers, or related products or services, for each of (i) said initial end users or members, (ii) additional end users or members, and (iii) target end user groups; wherein said generating comprises electronically monitoring, collecting, and analyzing behavior information accessed by the user, said behavior information comprising: (1) said initial end users' or members' impressions data; (2) said user or member profile data; (3) said location information data; (4) said product or service providers; and (5) said points of interest; (6) said 2D and 3D mapping data; (7) said user or member internet activity data; (8) said social networking data; and (9) generate marketing and mapping relationships between members of a social network or website; (c) electronically displaying to said users, members, target markets, or demographics groups, on said 2D or 3D geospatial map interactive display, said first set of location based, customized, promotions or offers that are displayed as ad links, promotion or offer information, or promotional media, wherein said first set is provided as part of a first social/geo/promo link category for a first position of a social/geo/promo link promotional data set; or (d) electronically identifying via a computer processor one or more second social/geo/promo link categories of said location based, customized, promotions using one or more correlation criteria, at least one second social/geo/promo link category having one or more correlation criteria associated with said first social/geo/promo link category, wherein said second social/geo/promo links can be provided to additional 2D or 3D geospatial map interactive displays provided to one or more of said users, members, target markets, or demographics groups;

wherein said generating step (b) further comprises: generating, via a processor on a computer system or mobile device or wireless device, second promotional data sets from said first promotional data sets, said second promotional data sets comprising second sets of location based, customized, promotions or offers that are provided as 2D or 3D geospatial map interactive displays, said second set of customized promotions or offers relating to products or services of said product or service or service providers, or related products or services, for each of (i) said initial end users or members, (ii) additional end users or members, and (iii) target end user groups;

wherein said displaying step (c) further comprises: electronically displaying to said users, members, target markets, or demographics groups, on said 2D or 3D geospatial map interactive display, said second set of location based, customized, promotions or offers that are displayed as ad links, promotion or offer information, or promotional media, wherein said second set is provided as part of said first social/geo/promo link category for said first position of a social/geo/promo link promotional data set;

wherein said promotions or offers comprise or are displayed as one selected from the group consisting of social media advertising impressions, text impressions, or tweet ad impressions, online marketplace ad impressions, online marketplace video impressions, online auction ad impressions, share ad impressions, online print media ad impressions, telecommunication ad impressions, online coupons, position-based services, ad links, location-based services, location-based promotions, location-based offers, location-based coupons, promotions or offers in connection with an online or mobile news feed, location-based discounts or daily deal ads, location-based advertising, location-based ads, location-based deals and offers, mobile ads, mobile ad network, mobile advertising, mobile commerce, mobile location-based advertising and promotions or offers, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products and/or services, discount ad impressions, impressions, social media web impressions or similar types of position-based services, ad links, location-based promotions, location-based offers, location-based coupons, promotions or offers in connection with an online or mobile news feed, discount ad impressions, merchant ad impressions, email coupon impressions, merchant ads, video clip ads, video upload or presentations site ads or links, B2B ad impressions, B2C ad impressions, B2B social medial communication impressions, gambling ad impressions, gambling site impressions, sports or sports related ad impressions, sports gambling ads, multiplayer online game ads, virtual ads, digital ads or virtual billboard ads or virtual ad impressions through the use of digital technology to insert virtual advertising images on a virtual landscape or into a social network, social networking websites or third party websites or applications, live or pre-recorded television show or video or sporting event and online or mobile coupons and promotions or offers for products or services, operating through credit cards or other payment services, automatically giving users discounts on their purchases at participating merchants, virtual or digital advertisements, banner ads, graphic color ads; promotions or offers inserted or overlays on images in a social network or website, social video sharing impressions, video ad impressions, audio-video & photography impressions, near field communication (NFC), NFC impressions, NFC boarding pass impressions, mobile boarding pass impressions, payment and tracking passenger impressions, viral impressions, any language or translated into any language impressions, sports ad impressions, brand impressions, global brand impressions, social shopping impressions, sharing on a social networking system digital content impressions, mobile social video sharing impressions, virtual world ad impressions, video game impressions, in-game advertising impressions, location-based ads, mobile browser ad impressions, mobile web ad impressions, widgets or widget ad impressions, bookmark ad impressions, tab impressions, web feed impressions, tabbed browsing ad impressions, page zooming ad impressions, ad-sponsored link impressions, auction impressions, multiple platform website ads, interactive content marketing impressions via a mobile device or other similar device or android device or tablet device or mobile internet devices or holographic devices or mercatot cell phones, (e.g. holographic phone) or other non-phone connected device or computer ads, context syncing, across one or multiple platforms, stream search ad impressions, communications, monetization, monetize mobile usage online media business impressions, video or voice chat ad impressions, social hang out impressions, demographic impressions, name impressions, age impressions, gender impressions, relationship status impressions, country and city impressions, location impressions, education related and/or services impressions, work impressions, interests & topics impressions, email ad impressions, photo blogging impressions, floating ad impressions, expanding ad impressions, polite ad impressions, wallpaper ad impressions, trick banner impressions, pop-up impressions, pop-under impressions, social video sharing impressions, video ad impressions, audio-video & photography impressions, sports ad impressions, brand impressions, global brand impressions, social shopping impressions, sharing on a social networking system digital content impressions, mobile social video sharing impressions, map ad impressions, mobile ads, mobile ad network, mobile advertising for mobile publishers and advertisers and mobile commerce, mobile location-based advertising and promotions or offers associated with location or maps, mobile and impressions, mobile products impressions, mobile app impressions, social business app impressions, social enterprise app impressions, third party app impressions, mobile ad products, targeted mobile ad impressions, mobile advertising network for mobile publishers and advertisers impressions, mobile user's location, phone brand, model and retail price impressions, superstitials impressions, interstitial ad impressions, e-mail advertising impressions, display advertising impressions, social media behavior marketing impressions, social media shopping impressions, social media ad impressions, social brand recognition impressions, social media shopping, e-mail marketing impressions referral marketing impressions, referral marketing impressions, affiliate marketing impressions, inbound marketing, video marketing, one-to-one marketing impressions, niche marketing impressions, behavior impressions, affiliate marketing impressions, semantic advertising impressions with two or three dimensional images on geospatial platform in combination with geo-mapping, web mapping, 2D and 3D mapping, GPS, location mapping, social mapping, digital mapping, 3D holographic mapping or mobile mapping technologies, in conjunction with social networking, a social networking environment, social networking interactions between members, to generate marketing and mapping relationships between members of a social network or website, social networking websites, or third party websites or applications;

wherein said third party is selected from a government agency, a credit reporting agency, a social network, an auction site, a company, an educational or financial institution, bank, a lender or mortgage company, an auto company, or a regulatory agency according to applicable laws and regulations;

wherein said company is selected from the group consisting of a financial services company, a product company, a services company, a social network, an auction site, a company, a brand merchant or retailer, a real estate company or related services, an educational or financial institution or bank, an entertainment company, an online penny or online auction, or other type of service company;

wherein the method further comprises: selecting a third social/geo/promo link category for a second position of the social/geo/promo link promotional data set, where the third social/geo/promo link category is different from the one or more identified second social/geo/promo link categories;

wherein: the social/geo/promo link promotional data set is associated with a web page; and the social/geo/promo link categories are ordered by capturing, processing, analyzing and filtering relevance, social content marketing, social contextual ads and connections among said users, members, or their friends, family, acquaintances, classmates, or business associates; user-contributed information, mood recording impressions & updating, friend communications and blog impressions and focused marketing and those interactions are used to select targeted location-based promotions, location-based offers, location-based coupons, promotions or offers in connection with an online or mobile news feed for the user or member of a social network, and connecting them with the brand or advertiser to the web page;

wherein identifying one or more second social/geo/promo link categories using one or more correlation criteria further comprises: identifying one or more social/geo/promo link categories having a correlation measure that is less than a correlation threshold;

wherein at least one second social/geo/promo link category has a separate correlation measure for at least one pair-wise combination of a category identifier associated with the at least one second social/geo/promo link category and a category identifier associated with the first social/geo/promo link category;

wherein said location-based, customized, promotions or offers include or are related to one are selected from the group consisting of location-based advertising, mobile location-based advertising, promotions or offers and marketing impressions, real-time user/consumer data with user's location, impressions for advertisers selected from user's or member's preferences, preferred locations, interests, networking interests or connections, channels; location-based services, location-based promotions, location-based offers, location-based coupons, promotions or offers in connection with an online or mobile news feed, location-based discounts or daily deal ads, location-based advertising, location-based ads, location-based deals and offers, mobile ads, mobile ad network, mobile advertising, mobile location-based advertising and promotions, mobile banking and mobile wallet services, customer loyalty cards, discounts and promotions or offers and online or mobile payment system for coupons, location-based promotions, location-based offers, location-based coupons, promotions or offers in connection with an online or mobile news feed and online or mobile coupons and promotions or offers for products or services, location-based geo-targeted or geo-tagged advertisements, location-based promotions, location-based offers, location-based coupons, promotions or offers in connection with an online or mobile news feed, location-based advertising, location-based deals and offers, position-based services, ad links, location-based promotions, location-based offers, location-based coupons, promotions or offers in connection with an online or mobile news feed, discount ad impressions, merchant ad impressions, email coupon impressions, online coupons, position-based services, ad links, location-based promotions, location-based offers, location-based coupons, promotions or offers in connection with an online or mobile news feed, location-based advertising, mobile location-based advertising, geo-targeted or geo-tagged advertisements, processing, analyzing and filtering impressions based upon people, places and things, content, audience, geographical area, delivery modes, data sets and ad markers; distribution of location-based promotions, location-based offers, location-based coupons, promotions or offers in connection with an online or mobile news feed, position-based services, advertisements or mobile coupons, mobile grocery coupons, mobile social networking impressions, location-based mobile ads, mobile ad network, mobile advertising for mobile publishers and advertisers and mobile commerce, mobile location-based advertising and promotions or offers associated with location or maps, location-based mobile coupons, targeted mobile ad impressions, mobile user's location, location-based deals and offers, daily deal coupons, last minute deals, free or discounted printable coupons, business directories, SMS marketing.

A number of implementations have been described. Nevertheless, it can be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for providing social shopping in combination with 2D and 3D mapping interactive displays and social networking, said method comprising:

electronically providing an integrated social networking and 2D and 3D geospatial mapping interactive website that provides geospatial mapping interactive displays interactive with social networking, where the geospatial interactive displays provide a multi-dimensional and scalable geospatial mapping functional tool, and where the educational-related social networking provides educational-related interactive emailing, instant messaging, texting, online auctions, social networking communities, online communications, user profiles, social plugins, social applications, entertainment shopping, bidding, advertisements, promotions, online coupons, mobile services, products, goods and services;

and wherein the social networking is provided as one selected from social shopping, social networking interactions, access to social networking websites or third party websites or applications, social plugins, social or business applications, SSLs, cookie and mobile cookie, browser cookie, advertising cookie, cookie-based targeting, flash cookie, location-based cookie and other third party cookie, and embedded advertisements;

wherein the integrated social networking and geospatial mapping interactive website is provided using the following steps:

(a) collecting and analyzing initial end user or member data via a processor on a computer or mobile device or wireless device to provide initial end user or member data sets, said initial end user or member data sets comprising:
  (1) initial end users' or members' impressions data comprising tracking and analysis of website access of users, target markets, demographic groups or geographic data;
  (2) user or member profile data;
  (3) location information data relating to selected;
    (a) users, members, target markets, demographic groups or geographic data;
    (b) (1) products or services; or (2) service providers; and
    (c) points of interest near to or associated with said: users, members, target markets, demographic groups and geographic data, products, and services; and product service providers;
  (4) 2D and 3D mapping data selected from:
    (a) said user, member, target market and demographic group locations or location interests; and
    (b) (1) said product or service; or (2) said product or service provider; locations or associated locations;
  (5) user or member internet activity data relating to searching, browsing, purchases, location, interactions, and/or interests;
  (6) social networking data of interactions between users or members through networking interests or connections, channels, target markets, and demographics groups; and
  (7) generated marketing and mapping data of relationships between members of a social network or website;

(b) generating, via a processor on a computer system or mobile device or wireless device, first promotional data sets from said initial end user data sets, said first promotional data sets comprising first sets of customized promotions or offers that are provided as 2D or 3D mapping interactive displays, said first sets of location based, customized, promotions or offers relating to products or services of said product or service or service providers, or related products or services, for each of (i) said initial end users or members, (ii) additional end users or members, and (iii) target end user groups;

wherein said generating comprises electronically monitoring, collecting, and analyzing behavior information accessed by the user, said behavior information comprising: (1) data on said initial end users or members; (2) data on said user or member profiles; (3) data on said location information; (4) data on said product or service; or said product or service providers; (5) data on said points of interest; (6) data on said 2D and 3D mapping data; (7) data on said user or member internet activity; and (8) data on said social networking interactions;

(c) electronically displaying to said users, members, target markets, and demographics groups, on said 2D or 3D mapping interactive displays, said first set of location based, customized, promotions or offers that are displayed as ad links, promotion or offer information, or promotional media, wherein said first set is provided as part of a first social/geo/promo link category for a first position of a social/geo/promo link promotional data set; and (d) electronically identifying via a computer processor one or more second social/geo/promo link categories of said location based, customized, promotions or offers using one or more correlation criteria, at least one second social/geo/promo link category having one or more correlation criteria associated with said first social/geo/promo link category, wherein said second social/geo/promo links can be provided to additional 2D or 3D mapping interactive displays provided to one or more of said users, members, target markets, demographics groups or geographic data;

(e) generating, via a processor on a computer system or mobile device or wireless device, second promotional data sets from said first promotional data sets, said second promotional data sets comprising second sets of location based, customized, promotions or offers that are provided as 2D or 3D mapping interactive displays, said second set of customized promotions or offers relating to products or services of said product or service or service providers, or related products or services, for each of (i) said initial end users or members, (ii) additional end users or members, and (iii) target end user groups; and (f) electronically displaying to said users, members, target markets, and demographics groups, on said 2D or 3D mapping interactive display, said second set of location based, customized, promotions or offers that are displayed as ad links, promotion or offer information, or promotional media, wherein said second set is provided as part of said first social/geo/promo link category for said first position of a social/geo/promo link promotional data set.

2. The method of claim 1, wherein said third party is selected from a government agency, a credit reporting agency, a social network, a website, a service provider, an auction site, a company, an educational or financial institution, bank, a lender or mortgage company, an auto company, or a regulatory agency according to applicable laws and regulations.

3. The method of claim 2, wherein said company is selected from the group consisting of a financial services company, a product company, a services company, a social network, a website, a service provider, an auction site, a company, a brand merchant or retailer, a real estate company or related services, an educational or financial institution or bank, an entertainment company, an online penny or online auction, or other type of service company.

4. The method of claim 1, wherein said first promotional data set further comprises statistics of gifts selected from the group consisting of donations, humanitarian aid, and sustainable gifts, made by one selected from the group consisting of said end users, said members, advertisers, brands, organizations, and companies.

5. The method of claim 4, wherein said method further comprises providing said first promotional data sets to one selected from the group consisting of said end users, said members, other end users or members, advertisers, third parties; and wherein said impressions include social impressions.

6. The method of claim 1, wherein said method further comprises: (I) said user designating a portion of a purchase of said product or service as a donation to; or (II) providing said user with website links to: donation related advertisers, brands, organizations or companies that provide donations comprising charitable contributions, humanitarian aid, sustainable gifts or loans.

7. A method of claim 1, wherein said product or service is a brand merchant or retailer for user/consumer, products, e-commerce, retail, media & entertainment, business, government, sports, travel & hospitality, real estate, educational services, sport services, entertainment shopping services, online gambling services, online penny and online auction services, service provider services, business center services, social network, website or affiliate services.

8. The method of claim 1, further comprising: selecting a third social/geo/promo link category for a second position of the social/geo/promo link promotional data set, where the third social/geo/promo link category is different from the one or more identified second social/geo/promo link categories.

9. The method of claim 1, wherein: the social/geo/promo link promotional data set is associated with a web page; and the social/geo/promo link categories are ordered by capturing, processing, analyzing and filtering relevance, social content marketing, social contextual ads and connections among said users, members, or their friends, family, acquaintances, classmates, or business associates; user-contributed information, mood recording impressions & updating, friend communications and blog impressions and focused marketing and those interactions are used to select targeted location-based promotions, location-based offers, location-based coupons, promotions or offers in connection with an online or mobile news feed for the user or member of a social network or website, and connecting them with the brand or advertiser to the web page.

10. The method of claim 1, wherein identifying one or more second social/geo/promo link categories using one or more correlation criteria further comprises: identifying one or more social/geo/promo link categories having a correlation measure that is less than a correlation threshold.

11. The method of claim 10, wherein at least one second social/geo/promo link category has a separate correlation measure for at least one pair-wise combination of a category identifier associated with the at least one second social/geo/promo link category and a category identifier associated with the first social/geo/promo link category.

12. The method of claim 1, wherein said collecting and analyzing initial end user or member data in step (a) is subject to identity verification.

* * * * *